(12) United States Patent
Sluder et al.

(10) Patent No.: US 12,521,107 B2
(45) Date of Patent: Jan. 13, 2026

(54) INSTRUMENTS, SYSTEMS, AND METHODS FOR SECURING ANCHORS, ELASTOMERIC DEVICES, AND OTHER ELEMENTS IN BONE

(71) Applicant: INTERNATIONAL LIFE SCIENCES, LLC, Marietta, GA (US)

(72) Inventors: Justin C. Sluder, Dallas, GA (US); L. Chase Thornburg, Cumming, GA (US); Aaron C. Smith, Marietta, GA (US); Jantzen Cole, Marietta, GA (US); Mark E. Wiltshire, Fort Collins, CO (US)

(73) Assignee: INTERNATIONAL LIFE SCIENCES, LLC, Marietta, GA (US)

( * ) Notice: Subject to any disclaimer, the term of this patent is extended or adjusted under 35 U.S.C. 154(b) by 276 days.

(21) Appl. No.: 18/376,096

(22) Filed: Oct. 3, 2023

(65) Prior Publication Data
US 2024/0115253 A1 Apr. 11, 2024

Related U.S. Application Data

(60) Provisional application No. 63/378,679, filed on Oct. 6, 2022.

(51) Int. Cl.
*A61B 17/04* (2006.01)
*A61B 17/06* (2006.01)
(Continued)

(52) U.S. Cl.
CPC .... *A61B 17/0401* (2013.01); *A61B 17/06066* (2013.01); *A61F 2/0805* (2013.01);
(Continued)

(58) Field of Classification Search
CPC .......... A61B 17/0401; A61B 17/06066; A61B 2017/00367; A61B 2017/0409;
(Continued)

(56) References Cited

U.S. PATENT DOCUMENTS 10,888,312 B2 * 1/2021 Balboa ................ A61F 2/0811
11,864,750 B2 * 1/2024 Patel .................. A61B 17/0485
(Continued)

OTHER PUBLICATIONS

"International Search Report and Written Opinion", issued by the European Patent Office as International Searching Authority on Mar. 21, 2024 for PCT/US2023/034371, 19 pages.
(Continued)

*Primary Examiner* — Phong Son H Dang
(74) *Attorney, Agent, or Firm* — Foley & Lardner LLP

(57) ABSTRACT

Instruments, systems, and methods for securing anchors, elastomeric devices, and other elements in bone. In one example, an instrument includes a collar movable between a locked configuration that prevents an insertion shaft of the instrument from translating relative to a drive shaft of the instrument and an unlocked configuration that does not prevent the insertion shaft from translating relative to the drive shaft. In another example, an instrument for securing an elastomeric device to bone includes a lock movable between locked and unlocked configurations (e.g. similar to or the same as the collar in the previous example) that facilitates insertion of the elastomeric device into a bone opening when the lock is in the locked configuration, and subsequent insertion of a bone implant into the bone opening when the lock is in the unlocked configuration.

13 Claims, 61 Drawing Sheets

(51) Int. Cl.
*A61F 2/08* (2006.01)
*A61B 17/00* (2006.01)
*A61F 2/00* (2006.01)

(52) U.S. Cl.
CPC .............. *A61B 2017/00367* (2013.01); *A61B 2017/0409* (2013.01); *A61B 2017/0414* (2013.01); *A61B 2017/0445* (2013.01); *A61F 2002/0081* (2013.01); *A61F 2002/0852* (2013.01); *A61F 2002/0858* (2013.01); *A61F 2002/0888* (2013.01); *A61F 2210/0057* (2013.01); *A61F 2250/0012* (2013.01)

(58) Field of Classification Search
CPC ..... A61B 2017/0414; A61B 2017/0445; A61F 2/0805; A61F 2002/0081; A61F 2002/0852; A61F 2002/0858; A61F 2002/0888; A61F 2210/0057; A61F 2210/0012
See application file for complete search history.

(56) References Cited

U.S. PATENT DOCUMENTS

| | | |
|---|---|---|
| 2006/0100640 A1 | 5/2006 | Bolduc |
| 2017/0135688 A1 | 5/2017 | Branthover et al. |
| 2017/0150960 A1* | 6/2017 | Dougherty ............ A61F 2/0811 |
| 2017/0172560 A1* | 6/2017 | Patel .................. A61B 17/0401 |
| 2017/0209139 A1 | 7/2017 | Burkhart et al. |
| 2018/0125472 A1* | 5/2018 | Dreyfuss ............ A61B 17/0401 |
| 2019/0053888 A1* | 2/2019 | Dougherty ......... A61B 17/0483 |
| 2020/0253598 A1* | 8/2020 | Holmes, Jr. ........ A61B 17/0401 |
| 2021/0338223 A1 | 11/2021 | Patel et al. |

OTHER PUBLICATIONS

"Invitation to Pay Additional Fees and, Where Applicable, Protest Fee", issued by the European Patent Office as International Searching Authority on Jan. 30, 2024 for PCT/US2023/034371, 5 pages.

* cited by examiner

INSTRUMENTS, SYSTEMS, AND METHODS FOR SECURING ANCHORS, ELASTOMERIC DEVICES, AND OTHER ELEMENTS IN BONE

RELATED APPLICATIONS

This application claims priority to and the benefit of the filing date of U.S. provisional patent application Ser. No. 63/378,679 filed Oct. 6, 2022 for "INSTRUMENTS, SYSTEMS, AND METHODS FOR SECURING ANCHORS, ELASTOMERIC DEVICES, AND OTHER ELEMENTS IN BONE," the entire contents of which are hereby incorporated by this reference.

RELATED FIELDS

Instruments, systems, and methods for securing anchors, elastomeric devices, and other elements in bone.

BACKGROUND

Instruments, systems, and methods for securing anchors in bone are known, including systems in which an anchor is threaded into a bone hole to secure an end of a suture in the hole. There remains much room for improvement, however, as many of the instruments in current use are cumbersome, inefficient, and otherwise difficult to use.

SUMMARY

We have developed significantly improved instruments, systems, and methods for securing anchors, elastomeric devices, and other elements in bone.

In one example, a surgical instrument configured to secure an anchor having a fixation member and an insertion member in bone, with the surgical instrument including: (i) a handle; (ii) a cannulated drive shaft extending from the handle, the cannulated drive shaft configured to drive the fixation member of the anchor; (iii) an insertion shaft extending from the handle and through the cannulation of the drive shaft, the insertion shaft configured for the insertion member to be mounted thereon; and (iv) a collar proximate a distal end of the handle and extending about the handle, the collar movable between a locked configuration and an unlocked configuration, in which, when the collar is in the locked configuration, the collar prevents the insertion shaft from translating relative to the drive shaft, and in which, when the collar is the unlocked configuration, the collar does not prevent the insertion shaft from translating relative to the drive shaft.

The surgical instrument may further include a detent, such that, when the collar is in the locked configuration, the detent fixedly engages the insertion shaft, and such that, when the collar is in the unlocked configuration, the detent resiliently engages the insertion shaft.

The surgical instrument may further include a resilient member, such that, when the collar is in the unlocked configuration, the resilient member biases the detent to engage the insertion shaft.

The surgical instrument may be configured such that, when the collar is in the locked configuration, the collar prevents the detent from moving relative to the insertion shaft.

The surgical instrument may be configured such that, when the collar is in the locked configuration, the resilient member is spaced from the detent.

The collar may be a rotatable collar, such that rotating the collar partially about the handle moves the collar between the locked and unlocked configurations.

The surgical instrument may further include a resilient member and a detent, the detent configured to engage the insertion shaft, such that rotating the collar to the unlocked configuration brings the resilient member into contact with the detent.

The surgical instrument may further include a stop rotatable with the collar, such that, when the collar is in the locked configuration, the stop limits translation of the insertion shaft relative to the drive shaft; and such that, when the collar is in the unlocked configuration, the stop does not limit translation of the insertion shaft relative to the drive shaft.

The surgical instrument may be configured such that, when the collar is in the locked configuration, the stop is positioned to block a proximal end of the insertion shaft.

The collar may be a slidable collar, such that translating the collar along a portion of the handle moves the collar between the locked and unlocked configurations.

The collar may be biased away from a body of the handle, such that translating the collar towards the body of the handle moves the collar from the locked configuration to the unlocked configuration.

The surgical instrument may be configured such that translating the collar towards the body of the handle lifts a lock member to an unlocked position.

The surgical instrument may be configured such that translating the collar towards the body of the handle brings a resilient member into contact with a detent.

The collar may be biased toward a body of the handle such that translating the collar away from the body of the handle moves the collar from the locked configuration to the unlocked configuration.

The collar may extend entirely around a portion of the handle.

In some instances, the instrument does not include a resilient member configured to bias the collar in the locked configuration.

In another example, a system for securing an elastomeric device to bone includes: (a) an elastomeric device comprising an elongated, elastomeric, porous matrix material; an instrument comprising an outer cannulated shaft, an inner shaft received in the outer cannulated shaft in a sliding fashion, and a lock movable between a locked configuration and an unlocked configuration, wherein the locked configuration prevents the inner shaft from sliding relative to the outer shaft, wherein the unlocked configuration permits the inner shaft to slide relative to the outer shaft; and (c) a bone implant, the bone implant including a distal component and a proximal fixation component, the distal component mounted on the inner shaft and configured to receive the elastomeric device such that the elastomeric device wraps around a portion of the distal component, the proximal component including one or more bone engaging features extending from an outer surface of the proximal component; the system configured such that, when the lock is in the locked configuration, the distal component mounted on the inner shaft is spaced apart from the proximal component, and such that when the lock is in the unlocked configuration, the inner shaft is permitted to slide relative to the outer shaft to move the proximal component towards the distal component.

The elastomeric device may be a tissue scaffold.

The distal component may be an eyelet mounted on a distal end of the inner shaft, the eyelet configured to receive the elastomeric device such that the elastomeric device extends through an opening of the eyelet.

The distal component may be a plug, the plug configured to receive the elastomeric device such that the elastomeric device wraps around a distal end of the plug.

The system may further include a suture, with the plug configured to receive the suture such that the suture wraps around a portion of the plug.

The plug may be configured to receive the suture such that the suture wraps around the distal end of the plug.

The plug may be configured to receive the suture such that the suture extends through a transverse slot or opening in the plug.

The inner shaft may be a spear shaft configured to extend through the distal component and to penetrate the elastomeric device.

A distal portion of the spear shaft may have a wider portion configured to resist disengagement of the elastomeric device from the spear shaft.

The spear shaft may include a thinner portion adjacent and proximal to the wider portion, the thinner portion configured to receive the elastomeric device.

The system may further include a suture wrapped around the outer cannulated shaft.

The system may be configured such that the suture wraps around the outer cannulated shaft in a first direction, and with the proximal fixation component including threading extending around the proximal fixation component in a second direction opposite to the first direction.

In another example, a method for securing an elastomeric device to bone includes: (a) positioning an elastomeric device over a bone opening by piercing the elastomeric device with an elongated member extending out of the bone opening; (b) pushing a portion of the elastomeric device into the bone opening such that at least one end of the elastomeric device extends out of the bone opening; and (c) inserting a fixation component into the bone opening to secure the elastomeric device in the bone opening.

The elastomeric device may be an elongated, elastomeric, porous matrix material.

Pushing the portion of the elastomeric device into the bone opening may comprise the elastomeric device to slide distally along the elongated member.

Pushing the portion of the elastomeric device into the bone opening may comprise sliding a cannulated instrument distally over the elongated member.

The cannulated instrument may include a plug such that pushing the portion of the elastomeric device into the bone opening further comprises pushing the plug into the bone opening over and along the elongated member.

The plug may be proximal to the pierced location of the elastomeric device.

After insertion of the fixation component, the fixation component may be proximal to the plug, the plug may be proximal to the pierced location of the elastomeric device, and the at least one end of the elastomeric device may extend proximally from the pierced location past the plug and the fixation component and out of the bone opening.

The elongated member may be a guide pin such that the method includes inserting the guide pin into the bone and using the guide pin to guide a cutter to form the bone opening.

The guide pin may have two tips configured to pierce the elastomeric device and to penetrate bone.

The method may also include evaluating a tension of the elastomeric device prior to pushing the portion of the elastomeric device into the bone opening; and adjusting the tension of the elastomeric device by removing the elastomeric device from the elongated member and re-piercing the elastomeric device with the elongated member at a second pierced location on the elongated member.

The tension may be evaluated after at least one of the ends of the elastomeric device is secured to a tissue.

The method may also include wrapping a suture around the elongated member prior to pushing the elastomeric device into the bone opening; and pushing the suture into the bone opening along with the portion of the elastomeric device such that at least one end of the suture extends out of the bone opening.

DETAILED DESCRIPTION

Two Step Insertion Instrument, System, and Method

Figure 1:
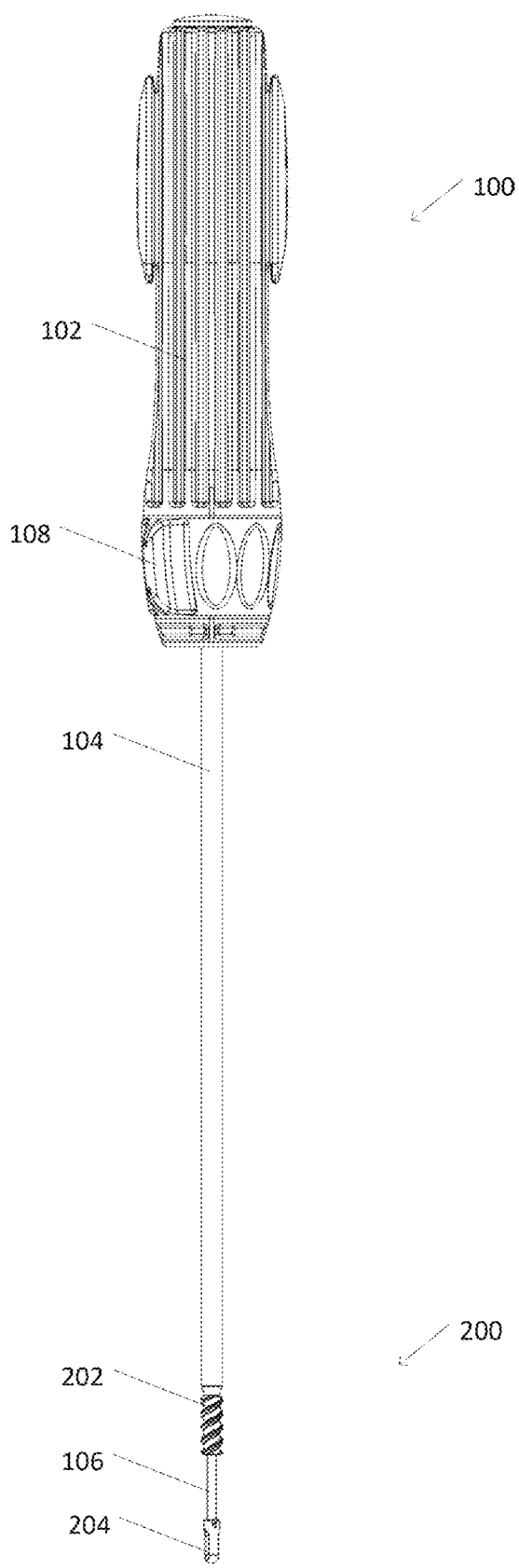
FIG. 1 shows an example of a surgical instrument for securing an anchor in bone.

FIG. 1 shows one example of a surgical instrument 100 for securing an anchor 200 in bone. The instrument 100 shown in this example includes a handle 102, a cannulated driver shaft 104 extending from the handle 102, an insertion shaft 106 extending from the handle 102 and through the cannulation of the driver shaft 104, and a collar 108 proximate a distal end of the handle 102 and extending about the handle 102.

The anchor 200 shown in this example includes a fixation member 202 and an insertion member 204. The drive shaft 104 is configured to drive the fixation member 202 and the insertion shaft 106 is configured for the insertion member 204 to be mounted thereon.

The collar 108 of the instrument 100 is movable between a locked configuration and an unlocked configuration. When the collar 108 is in the locked configuration, the instrument 100 prevents the insertion shaft 106 from translating relative to the drive shaft 104. When the collar 108 is in the unlocked configuration, the instrument 100 does not prevent the insertion shaft 106 from translating relative to the drive shaft 104.

The surgical instrument 100 is designed for one handed operation. The surgical instrument 100 can be used to insert the insertion member 204 into an opening in bone, move the collar 108 from the locked to the unlocked configuration, and drive the fixation member 202 into the bone opening, all with a single hand.

Figure 2:
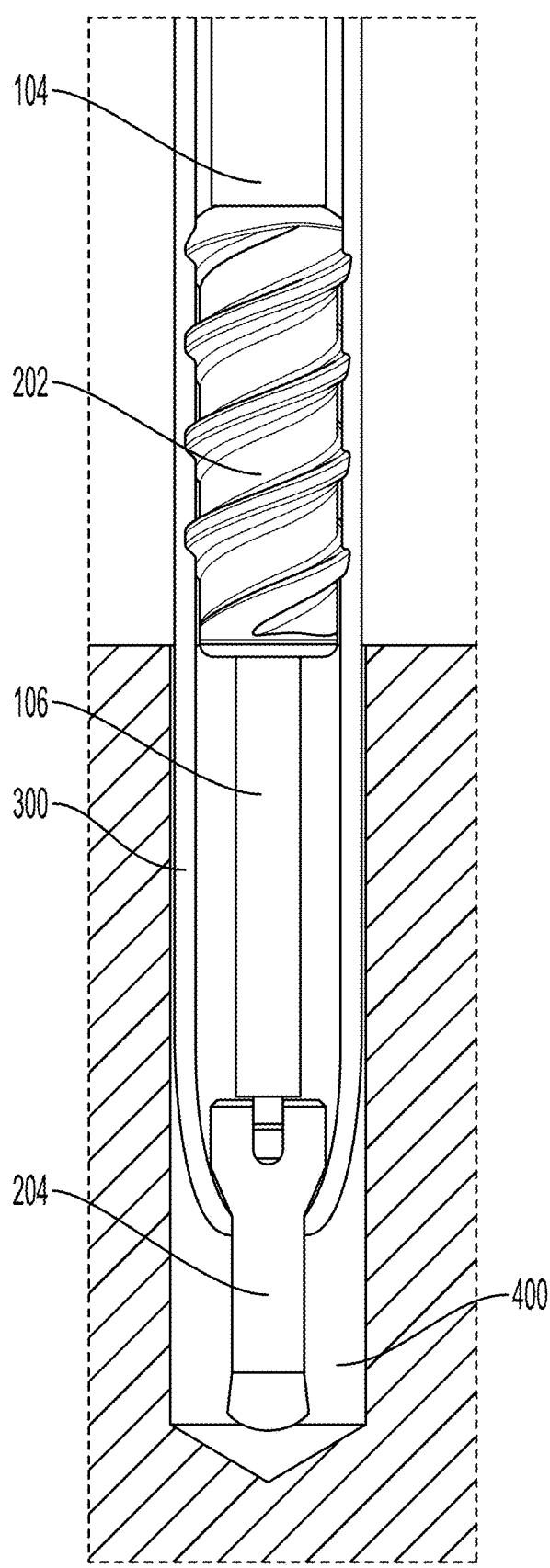
FIGS. 2-4 show an example method of securing an anchor in bone.
Figure 3:
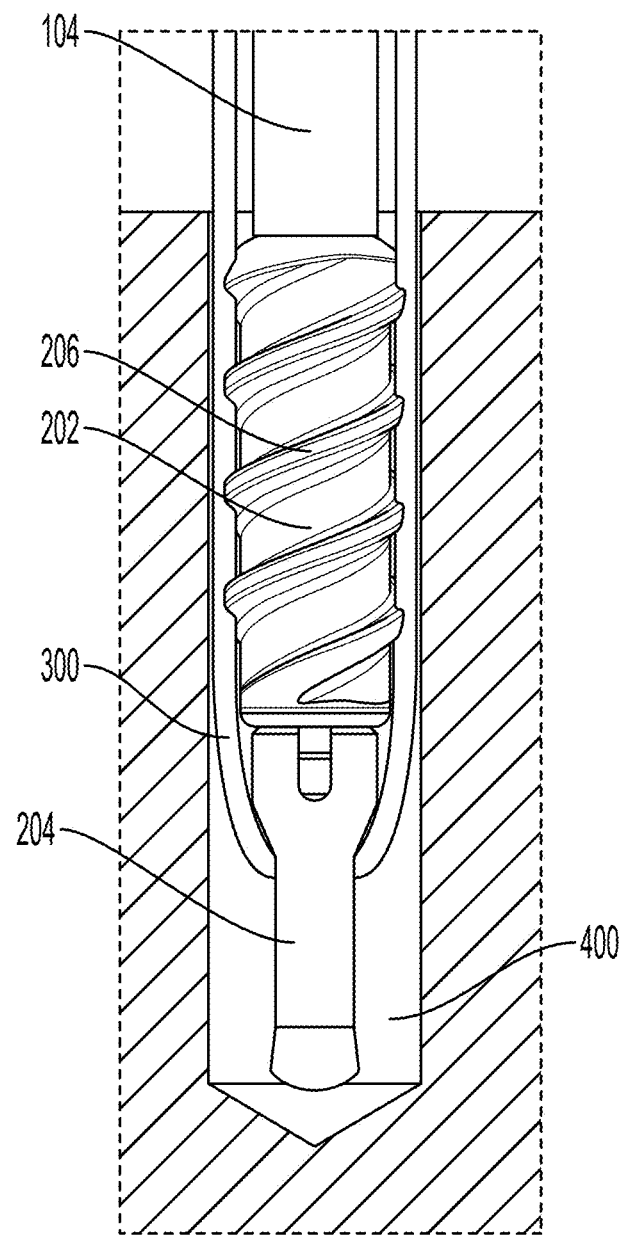
Figure 4:
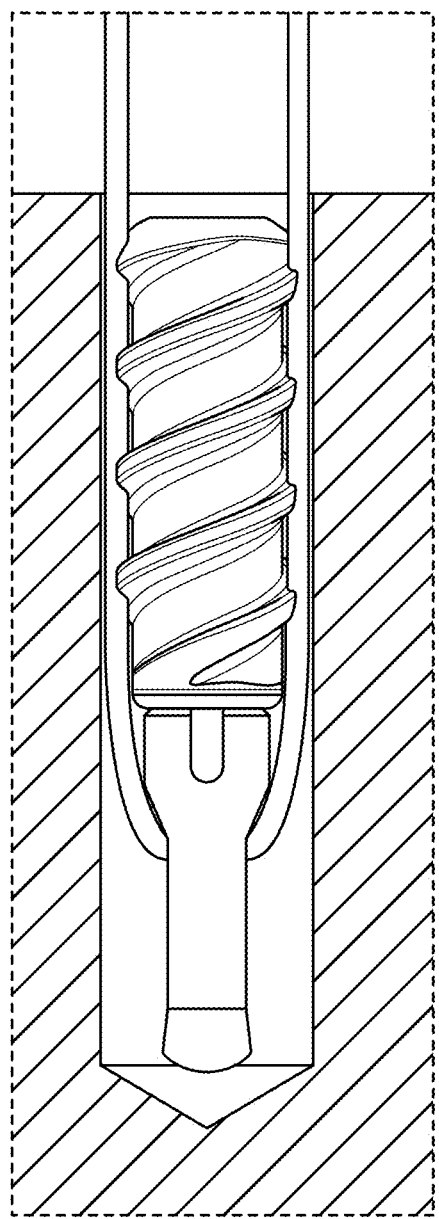
Figure 5:
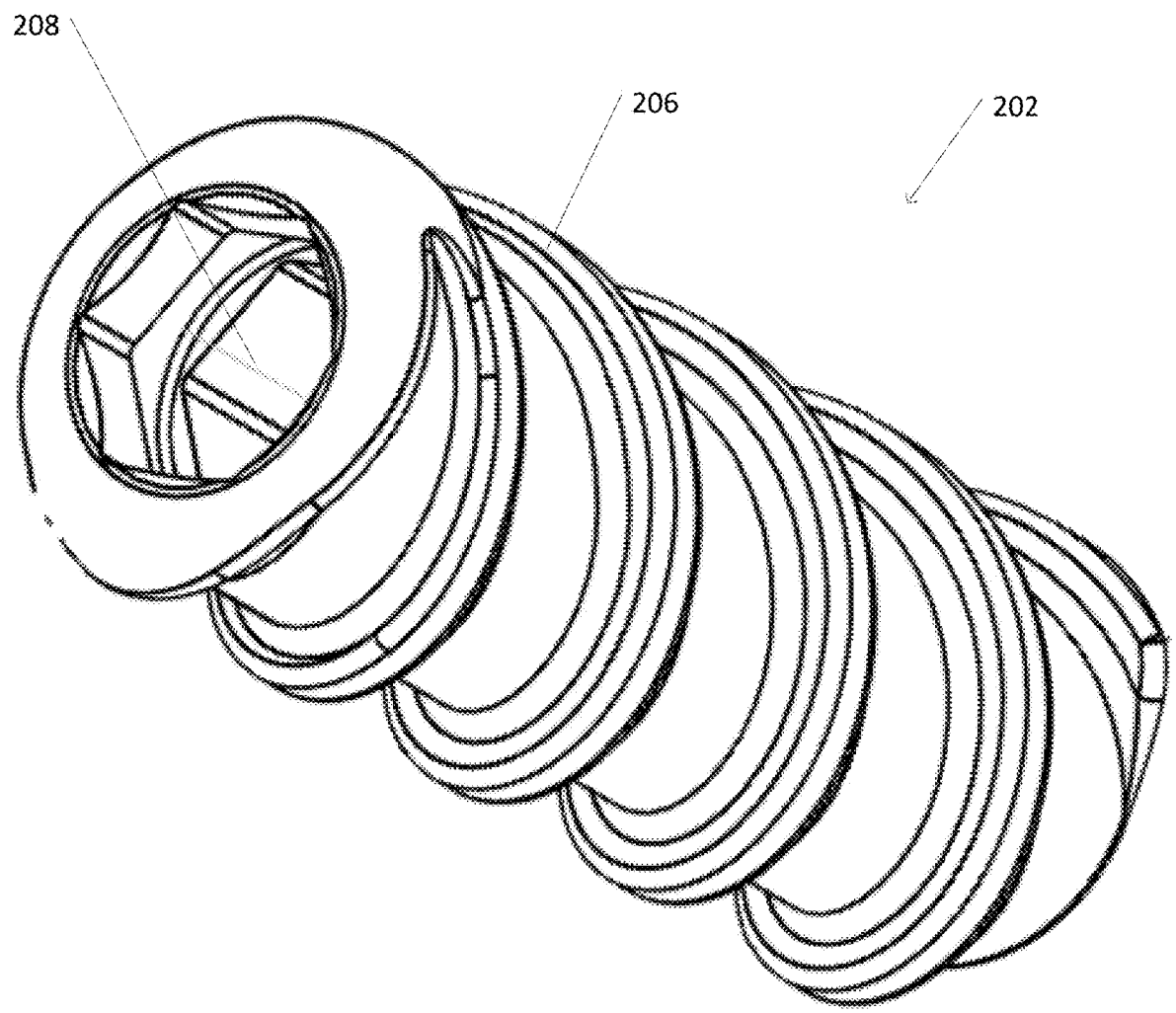
FIGS. 5-8 show an example fixation member of an anchor.

FIGS. 2-4 show an example method of using the instrument 100 and anchor 200 of FIG. 1 to secure an elastomeric device 300 in an opening 400 in bone. In this example, the elastomeric device 300 being secured is a soft tissue augmentation/joint stabilization device (examples of which are discussed further below). In other examples, the instruments, anchors, and systems described herein may additionally or alternatively be used to secure sutures and/or soft tissues in the bone opening. In the example shown in FIGS. 2-4, the opening 400 in the bone is a blind hole. In other examples, the instruments, anchors, and systems described herein may additionally or alternatively be used in thru holes or other types of bone tunnels.

As shown in FIG. 2, the instrument is initially used to insert the insertion member 204 and the elastomeric device 300 extending therethrough into the opening 400. During insertion, the instrument is in a locked configuration such that the insertion shaft 106 is prevented from translating relative to the drive shaft 104 and the fixation member 202 remains spaced apart from the insertion member 204. The elastomeric device 300 extends through an eyelet of the insertion member 204 (discussed further below) with two free ends extend up and out of the opening 400.

Next, as shown in FIG. 3, the instrument is then used to drive the fixation member 202 into the opening 400, securing the elastomeric device 300 in the opening. To drive the fixation member 202 into the opening 400, the instrument's collar 108 (shown in FIG. 1) is moved from the locked configuration to an unlocked configuration such that the drive shaft 104 can translate downwardly over the insertion shaft 106, driving the fixation member 202 into the opening 400 such that the distal end of the fixation member 202 comes into contact with the proximate end of the insertion member 204. In this particular example, the fixation member 202 includes external helical threads 206, and the drive shaft 104 is rotated to drive the fixation member 202 into the bone. In other examples, instead of helical threading 206, the fixation member 202 includes circumferential ribbing or other exterior features to facilitate anchoring in the bone, which is pressed or tapped into the bone. Next, as shown in FIG. 4, the drive shaft 104 and insertion shaft 106 are disconnected from the fixation member 202 and insertion member 204 respectively.

FIGS. 2-4 show an example in which an elastomeric device 300 is secured in bone. The same instrumentation and method may also be used to secure in bone suture (round or flat) in addition to or instead of the elastomeric device 300. The anchored suture may be used to attach additional elastomeric devices, soft tissue (tendon/ligament), or a graft to the anchor site. In another use example, prior to securing an elastomeric device and/or suture into the bone opening, a length of tendon may be inserted into the opening, followed by insertion of the elastomeric device and/or suture into the opening, followed by driving the fixation member into the opening to secure the length of tendon and the elastomeric device/suture in the opening. As with the previous example, the anchored suture may be used to attach additional elastomeric devices, soft tissue (tendon/ligament), or a graft to the anchor site. In still another use example, a length of tendon may be inserted into the opening followed by driving the fixation member into the opening to secure the length of tendon in the opening, without the use of an insertion member, an elastomeric device, or a suture.

FIGS. 2-4 shown an example in which an elastomeric device 300 is secured into one bone opening. The same or similar instrumentation and method may be used to secure the same elastomeric device 300 into a second bone opening after securing it into the first bone opening.

Figure 6:
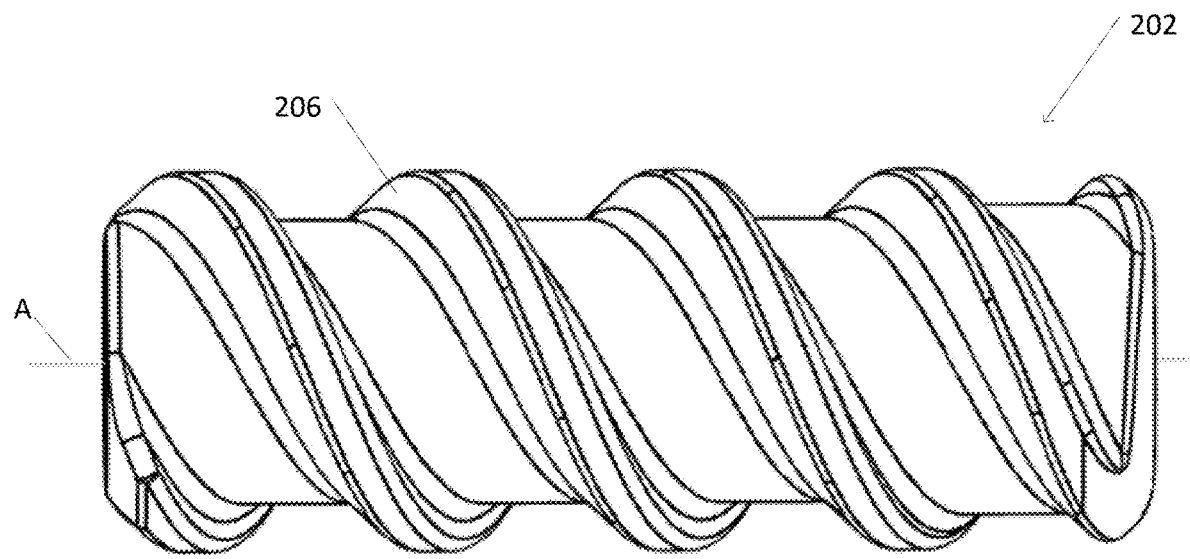
Figure 7:
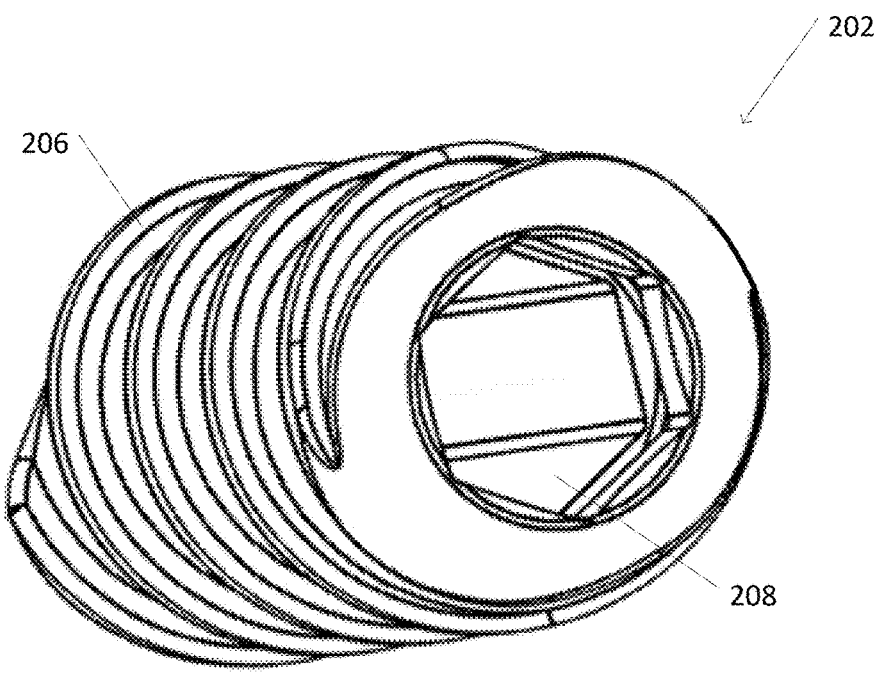
Figure 8:
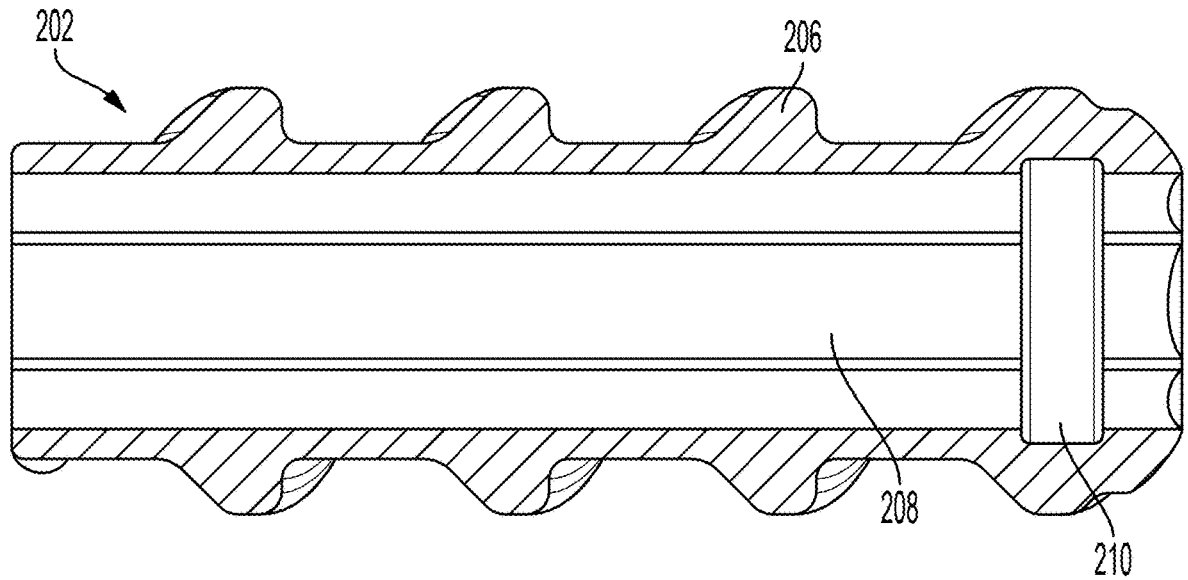

FIGS. 5-8 show additional views of the fixation member 202. The fixation member 202 in this example has a cannulated cylindrical body, with helical threading 206 on its exterior and a hexagonal interior geometry 208 configured to engage a corresponding drive interface 110 on the distal end of the drive shaft 104 (see FIG. 15) such that rotation of the drive shaft 104 will drive rotation of the fixation member 202 mounted thereon. As shown in FIG. 6, the hexagonal interior geometry 208 includes axis A. As shown in FIG. 8, the interior of the fixation member 202 also includes a circumferential groove 210.

Figure 63:
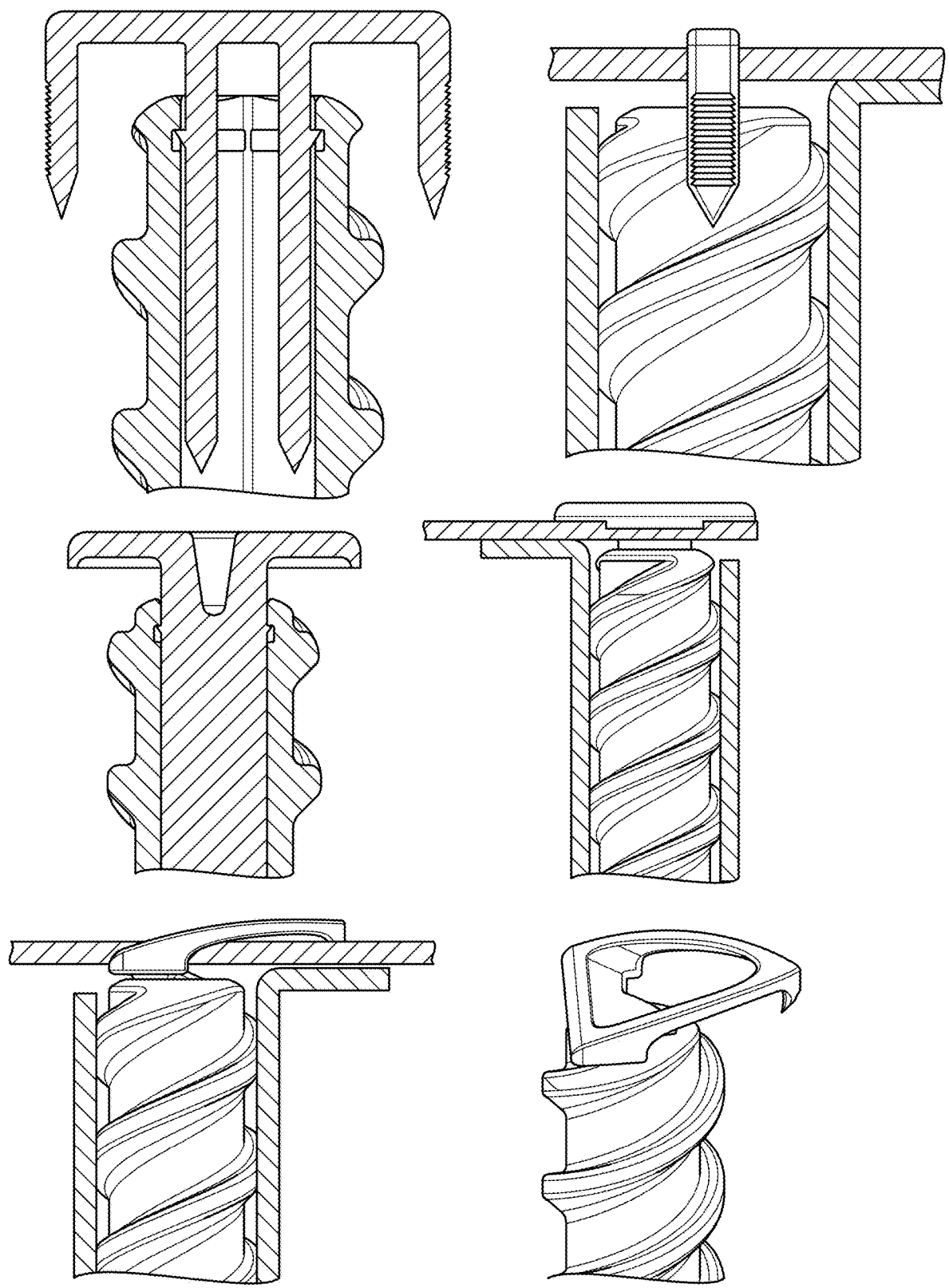
FIG. 63 shows examples of snap-in elements secured to a fixation member.

The circumferential groove 210 may be used to connect an additional element to the fixation member 202. FIG. 63 shows various views of examples of snap-in elements attached to a fixation member using an internal circumferential groove in the fixation member. In one example, the snap-in element may be used to secure additional suture and/or elastomeric devices to the fixation member and/or further secure sutures, elastomeric devices, and/or the fixation member itself to the bony anatomy.

Figure 64:
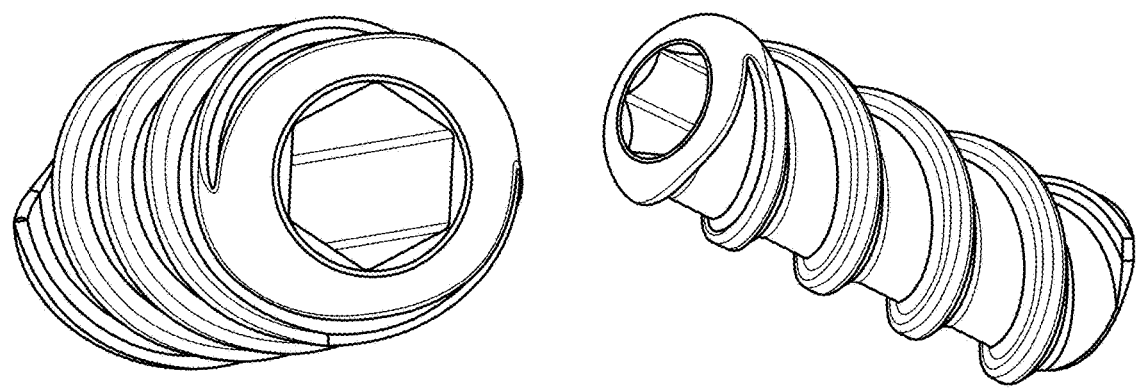
FIG. 64 shows various views of a fixation member.
Figure 64:
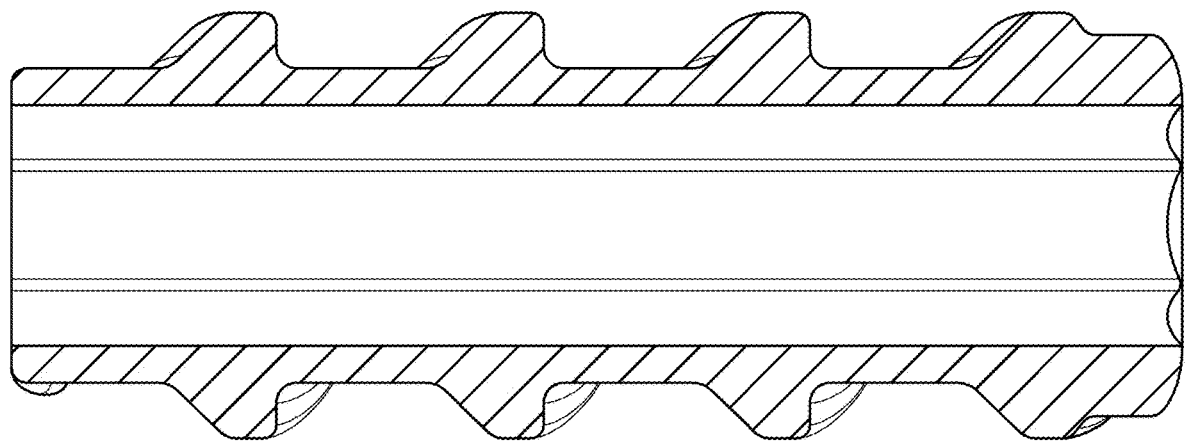

In still other implementations, the circumferential groove 210 is unnecessary. FIG. 64 shows views of a fixation member like the one shown in FIGS. 5-8, but without a circumferential groove in the interior.

Figure 9:
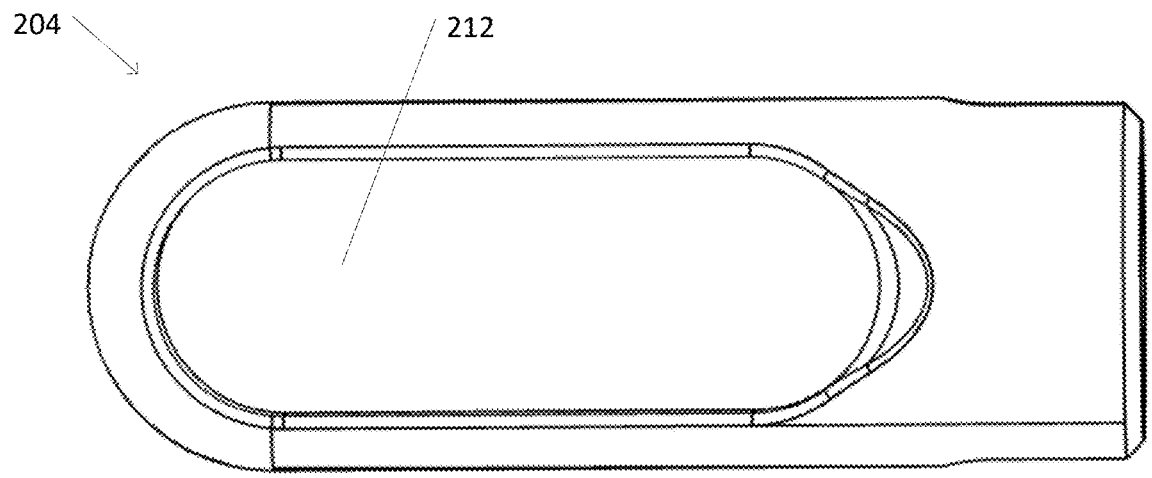
FIGS. 9-10 show an example insertion member of an anchor.
Figure 10:
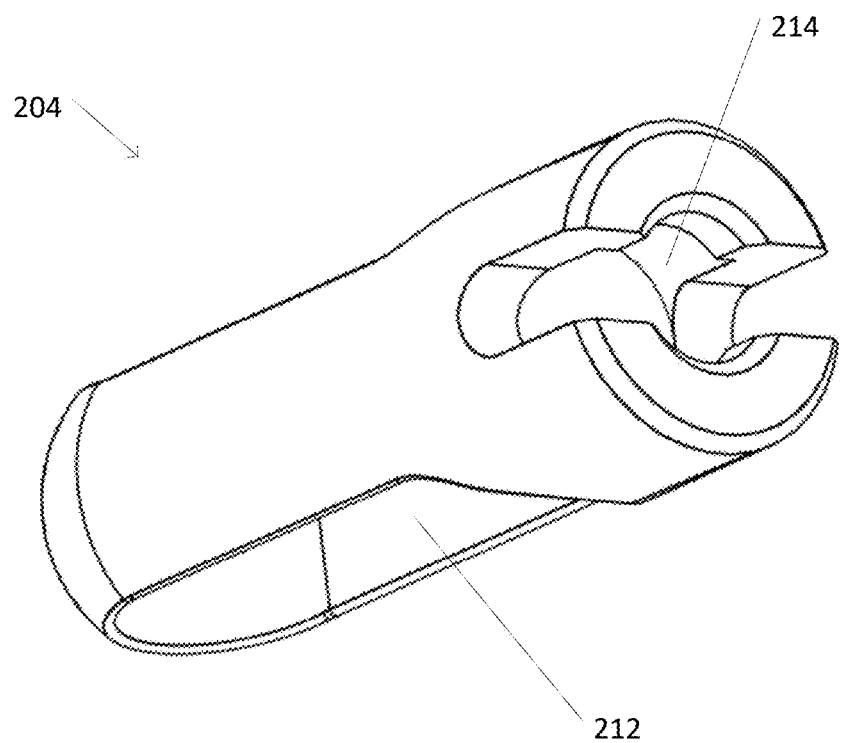

FIGS. 9 and 10 show additional views of the insertion member 204. The insertion member 204 in this example has a closed eyelet 212 sized and configured to receive through it an elastomeric device 300 (such as the soft tissue augmentation/joint stabilization device described below), a tissue (e.g. an end of a ligament or tendon to be secured to bone), and/or one or more sutures. In one implementation, the eyelet 212 has a length in the range of 2.5 mm-7.5 mm and a width in the range of 0.5-2.5 mm. The insertion member 202 in this example has an undercut 214 at its proximal end that is configured to detachably secure to a distal end of the insertion shaft 106 and connection feature 112 (see FIG. 14). The transverse groove in the proximal end of the insertion member 204 allows some elastic deflection during connection and removal of the insertion member 204 from the insertion shaft 106.

Figure 11:
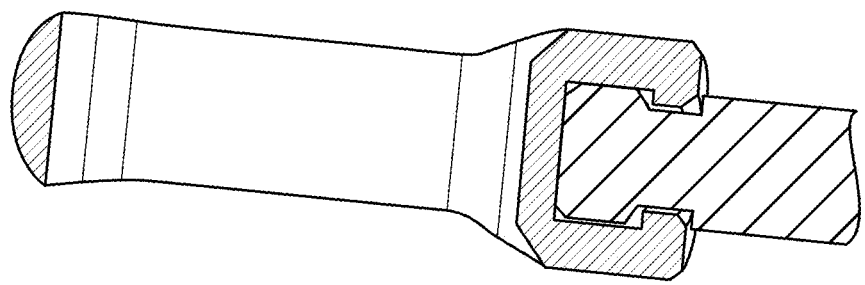
FIGS. 11-13 show other examples of insertion members of an anchor.
Figure 12:
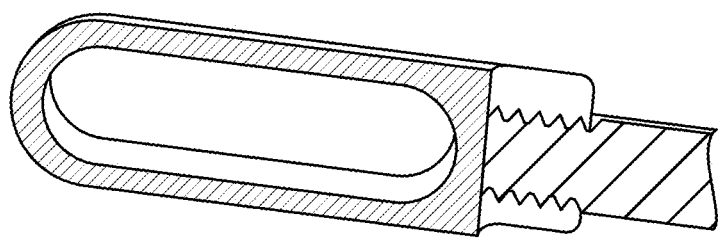
Figure 13:
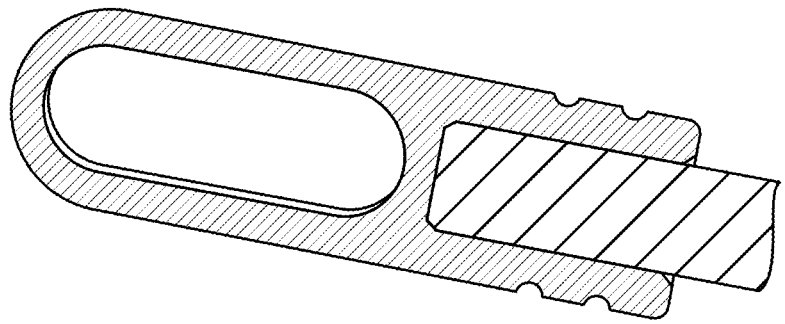

FIGS. 11-13 show additional examples of insertion members with different mechanisms for attaching to an insertion shaft. FIG. 11 shows a snap fit connection. FIG. 12 shows a threaded connection. FIG. 13 shows a press fit connection.

Figure 14:
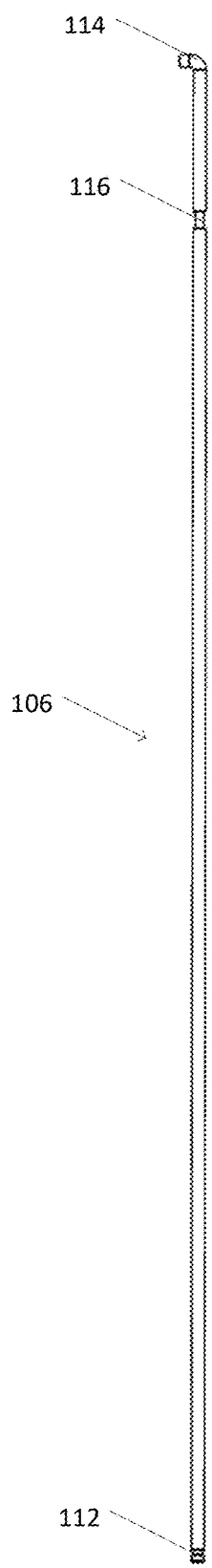
FIG. 14 shows an insertion shaft of the FIG. 1 surgical instrument.
Figure 15:
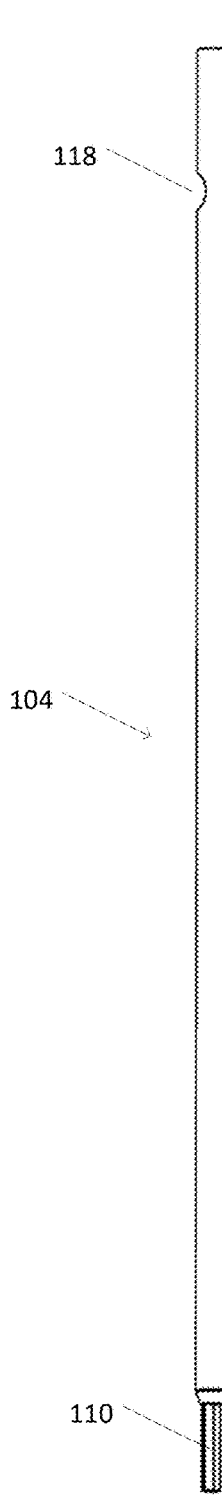
FIG. 15 shows a drive shaft of the FIG. 1 surgical instrument.
Figure 16:
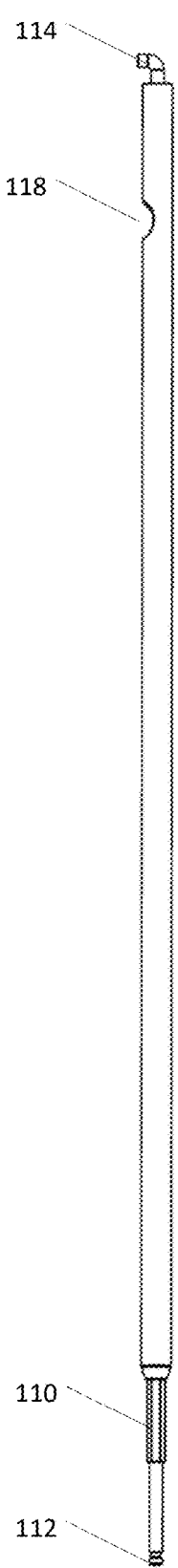
FIG. 16 shows the insertion shaft of FIG. 14 inserted into the drive shaft of FIG. 15.

FIGS. 14-16 show the drive shaft 104 and insertion shaft 106 removed from the instrument of FIG. 1, with FIG. 14 showing the insertion shaft 106, FIG. 15 showing the drive shaft 104, and FIG. 16 showing the insertion shaft 106 inserted in the drive shaft 104.

Figure 19:
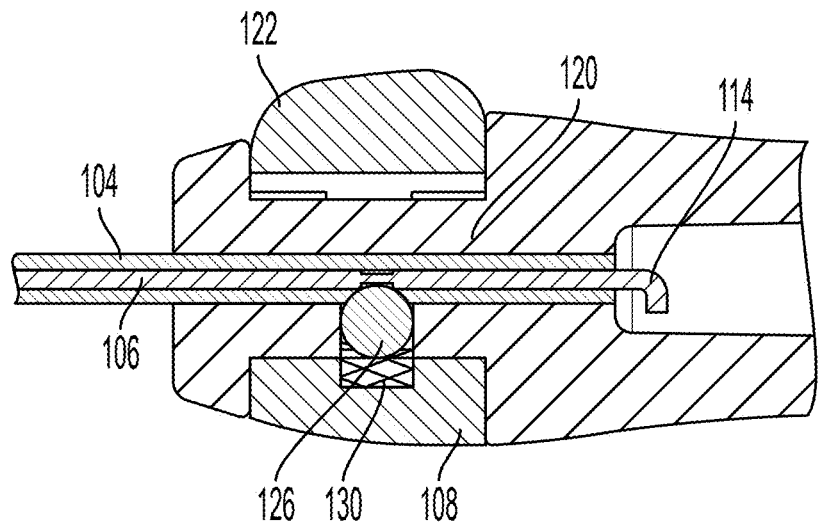
FIGS. 19 and 20 show cross-sections of the FIG. 1 surgical instrument in an unlocked configuration.
Figure 68:
FIGS. 68 and 69 show an example of an insertion shaft with an unbent proximal end.
Figure 69:
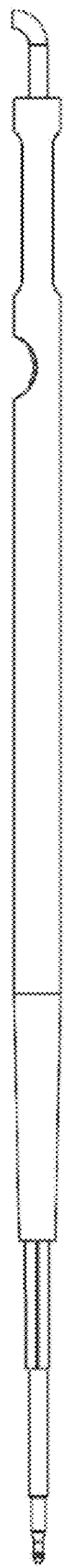

The insertion shaft 106 in this example has an elongated, cylindrical shape, with a connection feature 112 at its distal end for connecting an insertion member 204 as described above, and a bend 114 at its proximal end that prevents the insertion shaft 106 from completely sliding out of the drive shaft 104 when the instrument 100 is in an unlocked configuration and the insertion shaft 106 is able to translate in the drive shaft 104 (see also FIG. 19). In other implementations, an insertion shaft may have an un-bent proximal end such that it can be removed from the drive shaft and instrument. FIG. 68 shows an example of an insertion shaft with an un-bent proximal end, and FIG. 69 shows an example of the insertion shaft of FIG. 68 installed in a drive shaft.

In FIGS. 14-16, the insertion shaft 106 also includes a recess 116 part of the way down its shaft, which is configured to interact with a detent or other type of locking mechanism as discussed further below.

The drive shaft 104 in this example has an elongated, cylindrical shape with a cylindrical cannulation extending its entire length and open at both ends. The cylindrical cannulation of the drive shaft 104 is sized and configured to receive the insertion shaft 106 therein, such that the insertion shaft 106 can translate relative to the drive shaft 104 in a sliding fashion, and such that the drive shaft 104 can rotate about the insertion shaft 106. The drive shaft includes a drive interface 110 at its distal end configured to engage the interior geometry of the fixation member 202 as discussed above. The drive shaft 104 also includes a transverse opening 118 that is positioned to align with the recess 116 of the insertion shaft 106 when the insertion shaft 106 is in an extended position relative to the distal end of the drive shaft 104 as shown in FIG. 16.

Locking/Unlocking—FIGS. 17-20

As discussed above, the collar 108 of the surgical instrument 100 shown in FIG. 1 is movable between a locked configuration and an unlocked configuration in which the locked configuration prevents the insertion shaft 106 from translating relative to the driver shaft 104 and in which the unlocked configuration does not prevent the insertion shaft 106 from translating relative to the driver shaft 104.

FIGS. 17-20 show the collar 108 and adjacent portions of the surgical instrument 100 of FIG. 1 in more detail. As shown best in FIGS. 18 and 20, the collar 108 in this example is a ring shaped structure encircling a hub 120 of the handle 102. The collar 108 is mounted on the hub 120 in a rotating fashion. The collar 108 includes a raised prominence 122 and additional undulating geometry 124 that allow a surgeon to easily rotate the collar 108 from its locked to its unlocked configuration using just his or her thumb or another finger. The raised prominence 122 may also provide a visual indication of the current configuration of the collar 108 (locked versus unlocked) in conjunction with indicia or other features applied to the handle 102.

In this particular example, the collar 108 interacts with a ball detent 126 that is located in a cavity of the handle 102 and controls whether or not the insertion shaft 106 can translate relative to the drive shaft 108. Ball detent 126 is positioned so that a portion of it can extend through the opening 118 in drive shaft 104 (see FIG. 15) and engage the recess 116 in insertion shaft 106 (see FIG. 14) and thereby prevent translation of the insertion shaft 106.

Figure 17:
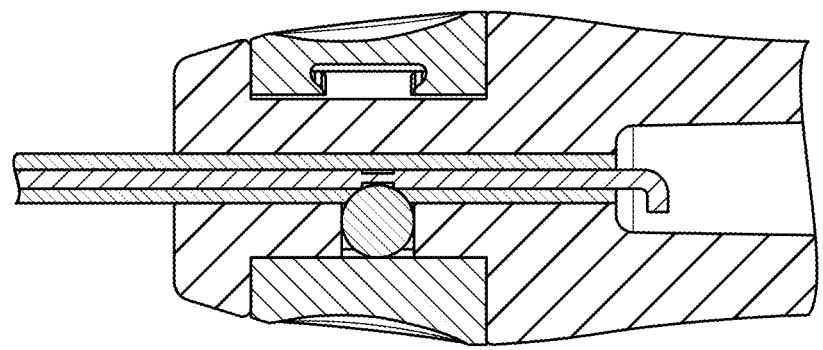
FIGS. 17 and 18 show cross-sections of the FIG. 1 surgical instrument in a locked configuration.
Figure 18:
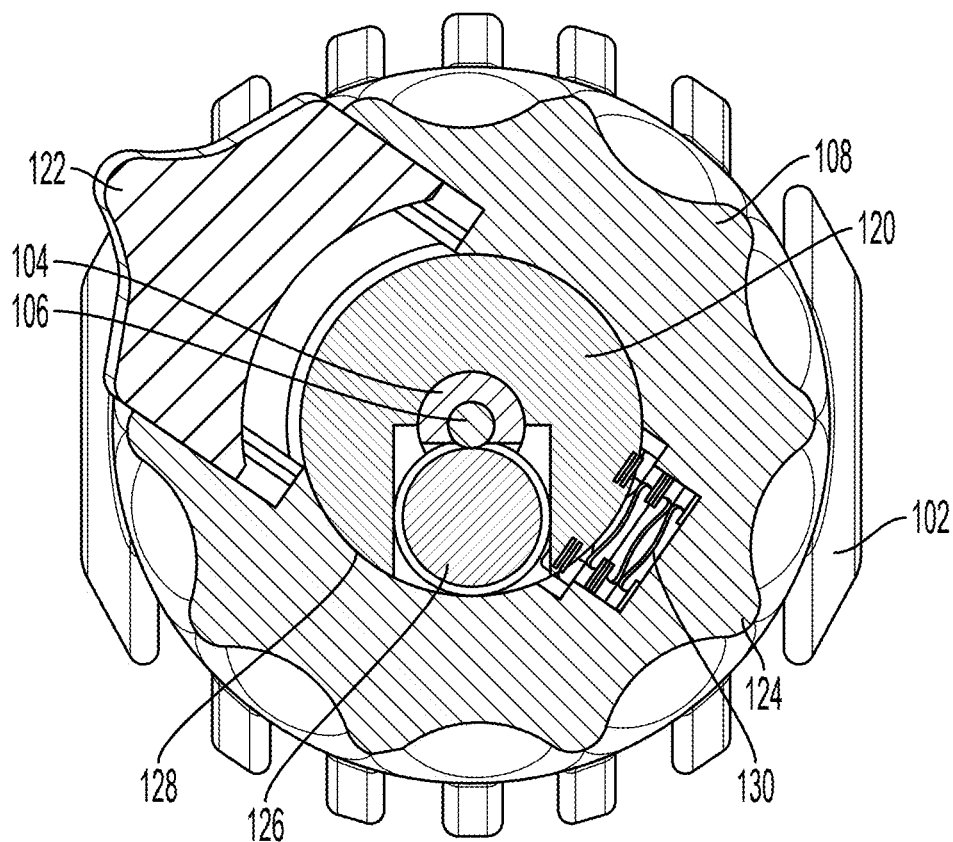

When the collar 108 is in the locked configuration shown in FIGS. 17 and 18, the detent fixedly engages the insertion shaft. When the collar 108 is in the locked configuration shown in FIGS. 17 and 18, an interior surface 128 of collar 108 retains the ball detent 126 in the insertion shaft recess 116 and prevents translation. When in this configuration, the ball detent 126 is unable to lift out of the recess 116 or otherwise move relative to the insertion shaft 106. When in this configuration, the resilient member 130 shown in FIGS. 17-20 (and discussed further in the next paragraph) is spaced apart from the ball detent 126.

Figure 20:
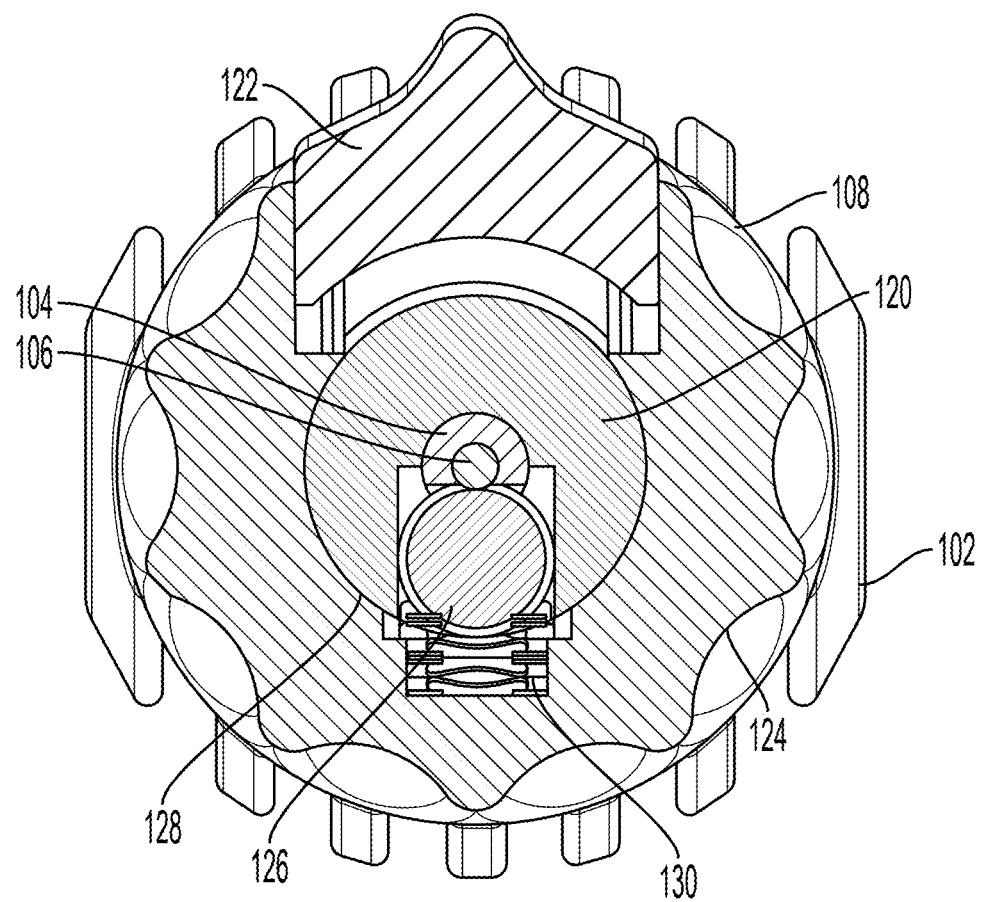
Figure 21:
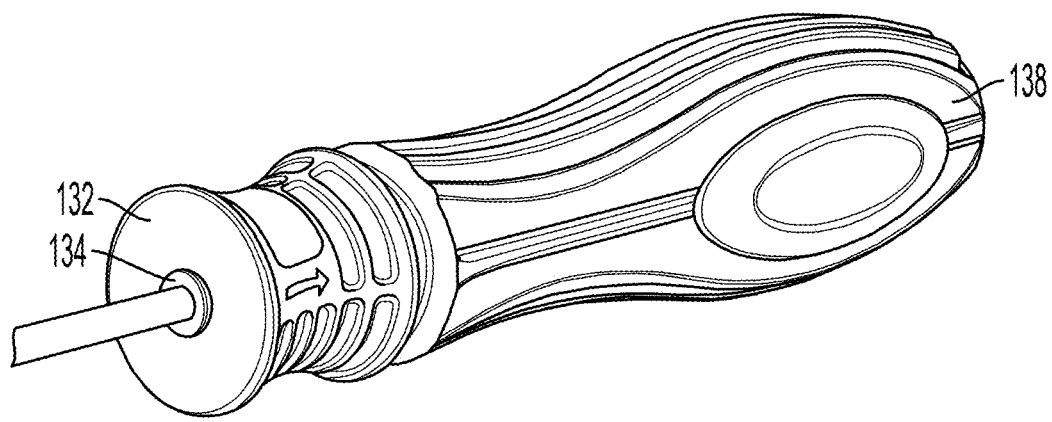
FIGS. 21-24 show another example of a surgical instrument.

When the collar 108 is in the unlocked configuration shown in FIGS. 19 and 20, the detent resiliently engages the insertion shaft. When the collar 108 is rotated to the unlocked configuration shown in FIGS. 19 and 20, the interior surface 128 of collar 108 no longer contacts the ball detent 126. Instead, a resilient member 130 (e.g. a spring) mounted in a recessed cavity of the collar 108 is brought into contact with ball detent 126. The resilient member 130 biases the ball detent 126 into the recess 116 of insertion shaft 106 and thus will continue to engage and prevent the insertion shaft 106 from translating unless a sufficient force is applied to dislodge the ball detent 126 from the recess and overcome the force applied on the ball detent 126 by the resilient member 130. Once sufficient force is applied however (e.g. a sufficient downward force applied by the surgeon on the handle 102), the ball detent 126 will force the resilient member 130 to compress such that the ball detent 126 will dislodge from the recess 116, thereby allowing the insertion shaft 106 to translate relative to the drive shaft 104.

In some implementations, the ball detent will continue to provide some resistance to translation about the entire range of motion of the inner shaft, since the resilient member 130 will be urging the ball detent against the outer surface of the inner shaft throughout translation.

In other implementations, the resilient member 130 is unnecessary and may be omitted.

The collar 108 is positioned on the surgical instrument 100 and configured for operation such that it can be easily and reliably operated with one hand, which the inventors have found provides an unexpectedly improved user experience over earlier instruments that either require both hands to carry out a two step anchoring process or use buttons embedded in the handle that are not easy for the surgeon to access and operate during an anchoring procedure. The location of the collar 108 near the distal end of the handle 102, its extension about the handle 102, its rotational operation, and the shape and configuration of the prominence 122 and undulating geometry 124 all contribute to its ease of operation.

Locking/Unlocking—FIGS. 21-24

FIGS. 21-24 show another example of a surgical instrument for securing a multi-component anchor in a bone, such as the examples of fixation and insertion members shown in FIGS. 2-13. In this example, the drive and insertion shafts 104, 106 are the same as in the previous example, but the collar 132 is configured differently and uses a different mechanism to lock and unlock the insertion shaft 106 from translating relative to the drive shaft 104 than in the previous example.

In this example, collar 132 is a slidable collar that is translated along a portion of the handle to move the collar 132 between locked and unlocked configurations. In this example, the collar is biased away from the body of the handle, and translating the collar towards to the body of the handle moves the collar from the locked to the unlocked configuration. As discussed in further detail below, translating the collar towards to the body of the handle lifts a lock member to an unlocked position.

Figure 22:
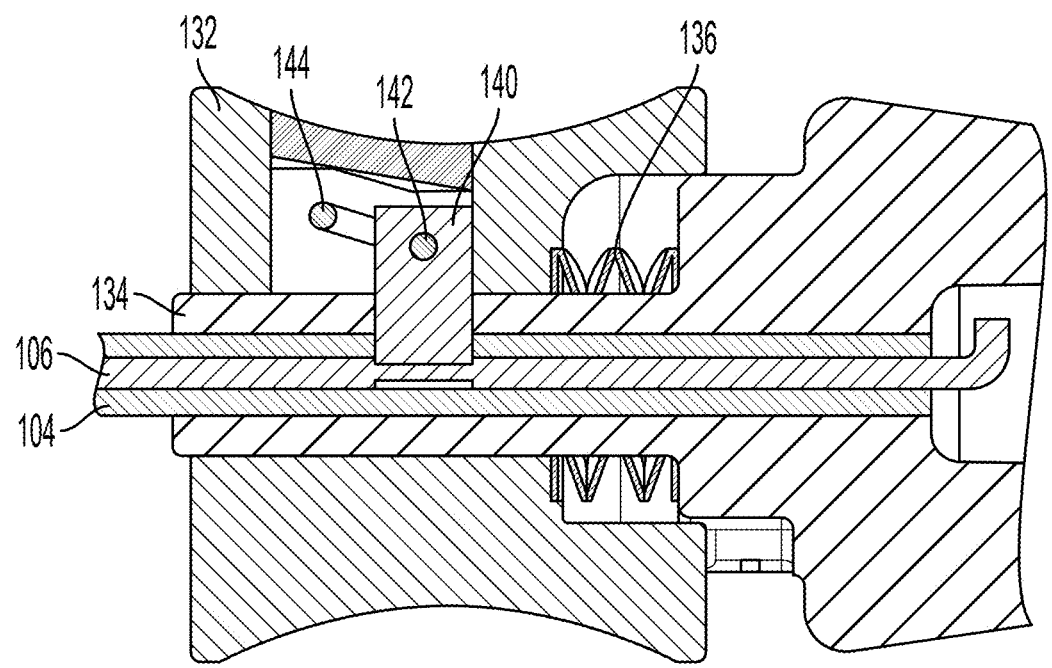
Figure 23:
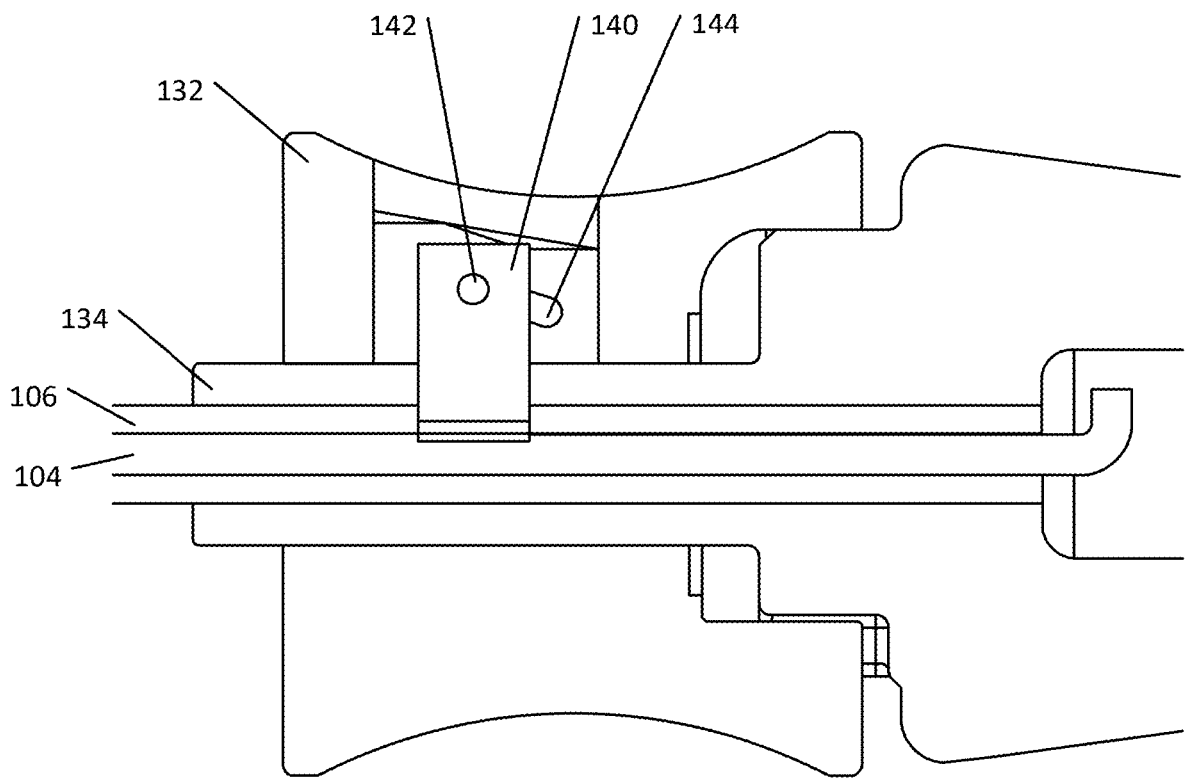
Figure 24:
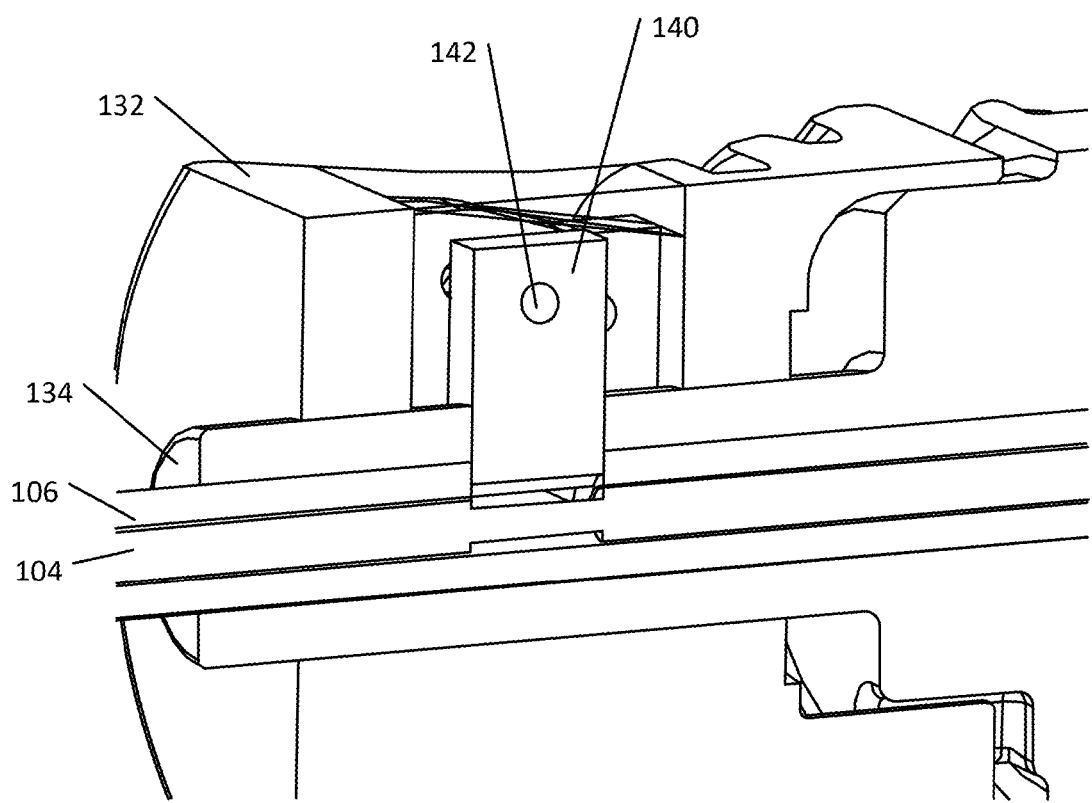

As shown in FIGS. 22-24, the collar 132 is mounted on and extends about a distal, narrower portion of handle 134. The collar 132 slides along the handle portion 134 as it translates from the locked configuration shown in FIGS. 21-22 to the unlocked configuration shown in FIGS. 23-24. Resilient member 136 (e.g. a spring) biases the collar 132 towards the locked configuration, away from the proximal end of handle 138 (see FIG. 21).

In this example, translating the collar 132 towards the body of the handle lifts a lock member 140 from a locked position (shown in FIG. 22) to an unlocked position (shown in FIGS. 23-24). In the locked position, lock member 140 extends through the transverse opening 118 in drive shaft 104 (see FIG. 15) and engages the recess 116 in insertion shaft 106 (see FIG. 14). In the unlocked position, lock member 140 is lifted out of engagement with the recess 116 in insertion shaft 106. Lock member 140 may be operably connected to collar 132 by a pin 142 extending from lock member 140 into an inclined slot 144 formed in the collar 132. The inclination of slot 144 results in the lock member 140 lifting up and out of the recess 116 in insertion shaft 106 when the collar 132 is translated towards the body of the handle.

The collar 132 is positioned on the surgical instrument and configured for operation such that it can be easily and reliably operated with one hand, which the inventors have found provides an unexpectedly improved user experience over earlier instruments that either require both hands to carry out a two step anchoring process or use buttons embedded in the handle that are not easy for the surgeon to access and operate during an anchoring procedure. The location of the collar 132 near the distal end of the handle, its extension about the handle, its bias away from the handle and translational operation by pulling it back towards to the body of the handle all contribute to its ease of operation
Locking/Unlocking—FIGS. 25-27

Figure 25:
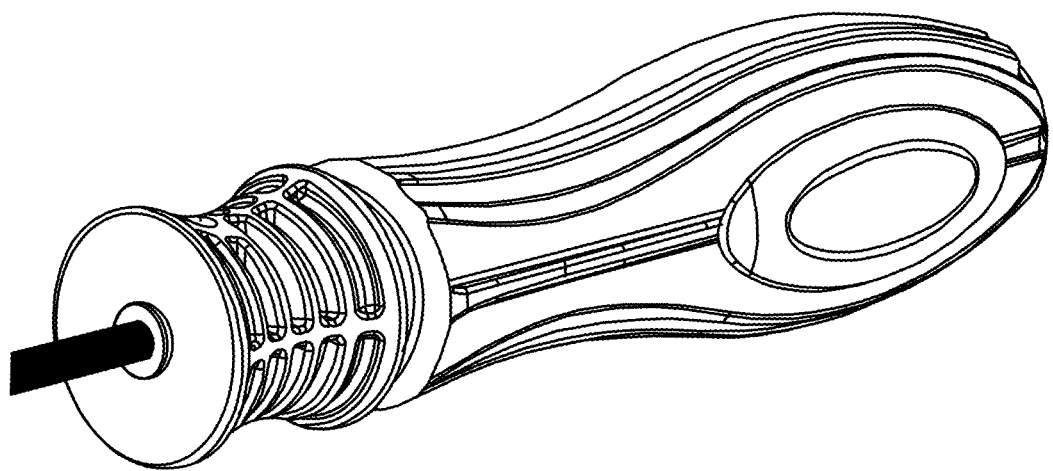
FIGS. 25-27 show another example of a surgical instrument.
Figure 26:
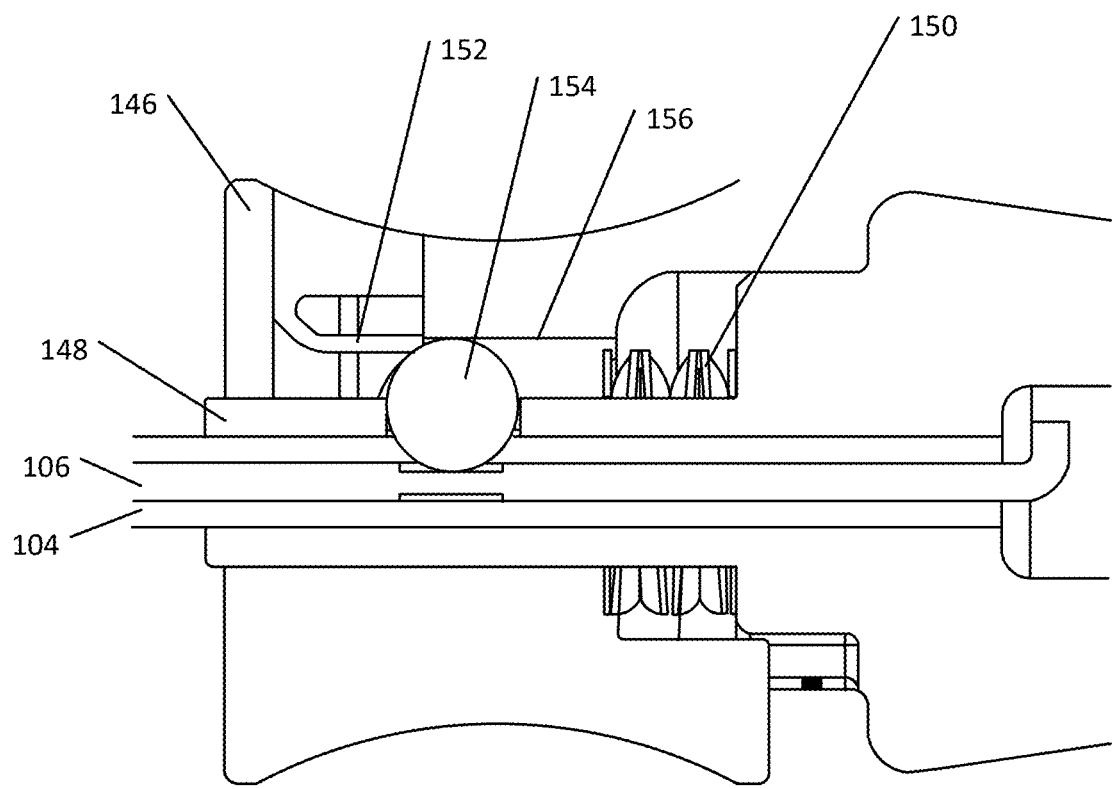
Figure 27:
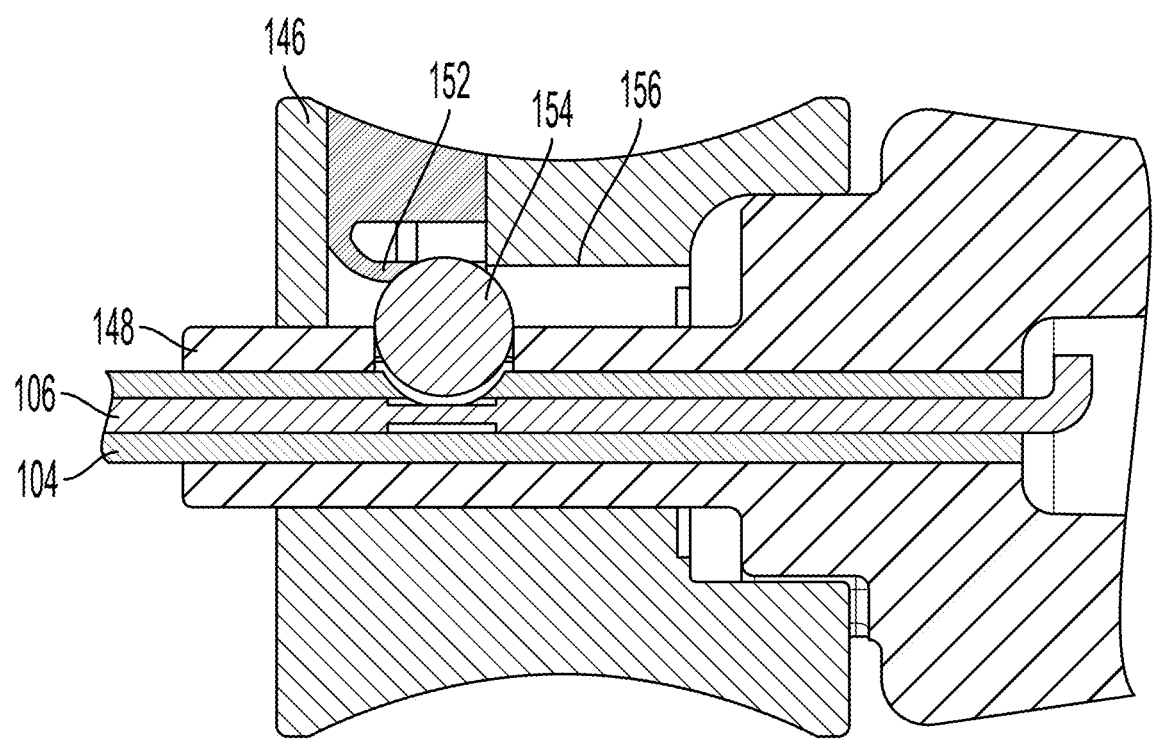
Figure 28:
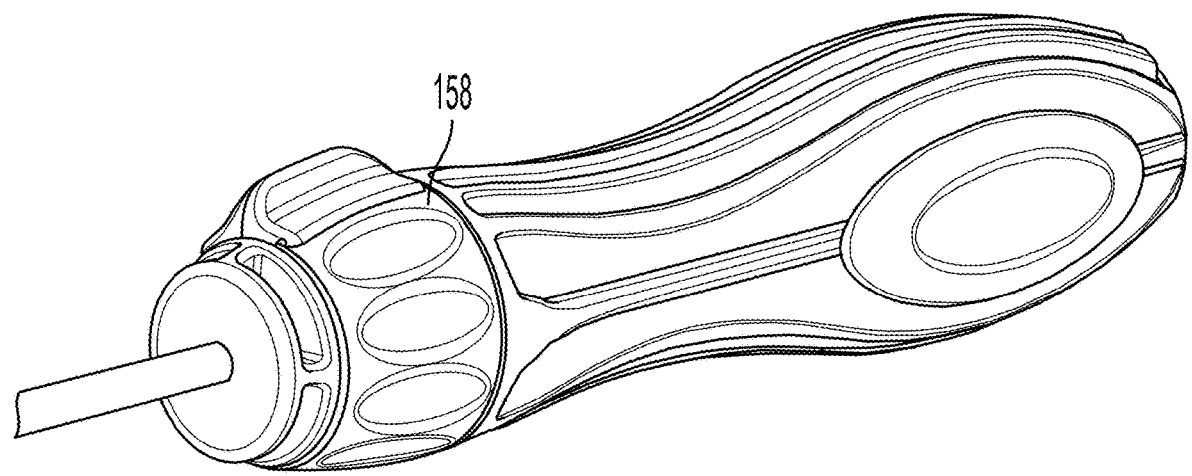
FIGS. 28-32 show another example of a surgical instrument.

FIGS. 25-27 show another example of a surgical instrument for securing a multi-component anchor in a bone, such as the examples of fixation and insertion members shown in FIGS. 2-13. In this example, the drive and insertion shafts 104, 106 are the same as in the previous examples, but the collar 146 is configured differently and uses a different mechanism to lock and unlock the insertion shaft 106 from translating relative to the drive shaft 104 than in the previous examples.

In this example, collar 146 is a slidable collar that is translated along a portion of the handle to move the collar 146 between locked and unlocked configurations. In this example, the collar is biased away from the body of the handle, and translating the collar towards to the body of the handle moves the collar from the locked to the unlocked configuration. As discussed in further detail below, translating the collar 146 towards to the body of the handle brings a resilient member into contact with a detent.

As shown in FIGS. 26-27, the collar 146 is mounted on and extends about a distal, narrower portion of handle 148. The collar 146 slides along the handle portion 148 as it translates from the locked configuration shown in FIGS. 25-26 to the unlocked configuration shown in FIG. 27. Resilient member 150 (e.g. a spring) biases the collar 146 towards the locked configuration, away from the proximal end of handle.

In this example, when in the locked configuration shown in FIG. 26, a ball detent 154 is fixedly held in the recess 116 in insertion shaft 106, preventing translation of the insertion shaft 106 relative to the drive shaft 104. In this configuration, an interior surface 156 of collar 146 prevents the ball detent 154 from lifting out of the recess 116. Translating the collar 146 towards the body of the handle brings a resilient member 152 into contact with a ball detent 154. When the collar 146 is in the unlocked configuration shown in FIG. 27, the ball detent 154 resiliently engages the insertion shaft 106 and the interior surface 156 of collar 146 no longer limits the movement of ball detent 154. The resilient member 152 still biases the ball detent 154 into the recess 116 of insertion shaft 106 and thus will continue to engage and prevent the insertion shaft 106 from translating unless a sufficient force is applied to dislodge the ball detent 154 from the recess and overcome the force applied on the ball detent 154 by the resilient member 152. Once sufficient force is applied however (e.g. a sufficient downward force applied by the surgeon on the handle 102), the ball detent 154 will force the resilient member 152 to deflect such that the ball detent 154 will dislodge from the recess 116, thereby allowing the insertion shaft 106 to translate relative to the drive shaft 104.

The collar 146 is positioned on the surgical instrument and configured for operation such that it can be easily and reliably operated with one hand, which the inventors have found provides an unexpectedly improved user experience over earlier instruments that either require both hands to carry out a two step anchoring process or use buttons embedded in the handle that are not easy for the surgeon to access and operate during an anchoring procedure. The location of the collar 146 near the distal end of the handle, its extension about the handle, its bias away from the handle and translational operation by pulling it back towards to the body of the handle all contribute to its ease of operation.
Locking/Unlocking—FIGS. 28-32

FIGS. 28-32 show another example of a surgical instrument for securing a multi-component anchor in a bone, such as the examples of fixation and insertion members shown in FIGS. 2-13.

In this example, the collar 158 is exteriorly configured and operated similarly to the collar 108 shown in FIGS. 1 and 17-20, but its internal mechanism is different. Like the instrument shown in FIGS. 1 and 17-20, the collar 158 is proximate a distal end of the handle and extends about the handle, and is movable between a locked configuration that prevents the insertion shaft 106 from translating relative to the drive shaft 104 and an unlocked configuration that does not prevent the insertion shaft 106 from translating relative to the drive shaft 104. Like the collar 108 shown in FIGS. 1 and 17-20, the collar 158 is rotatable such that rotation partially about the handle moves the collar between the locked and unlocked configurations.

Figure 29:
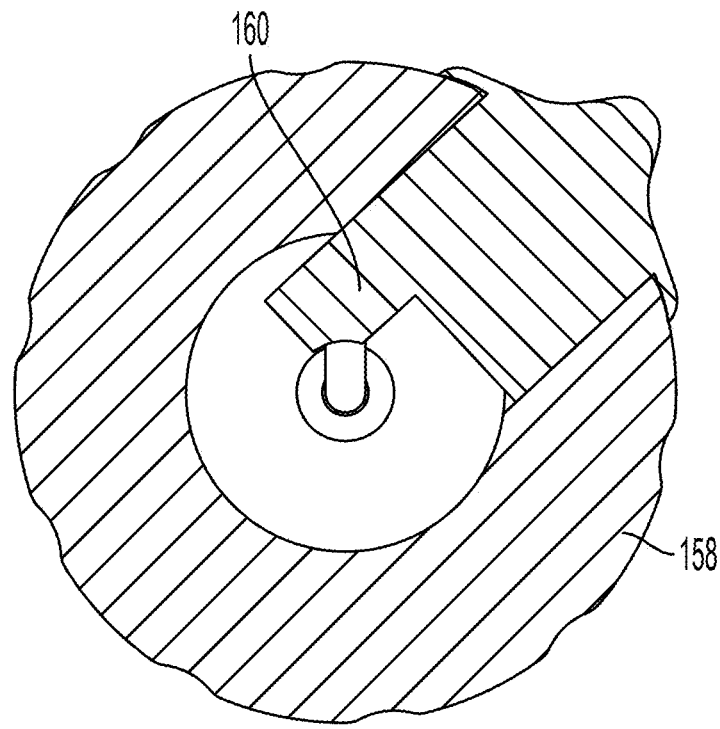
Figure 30:
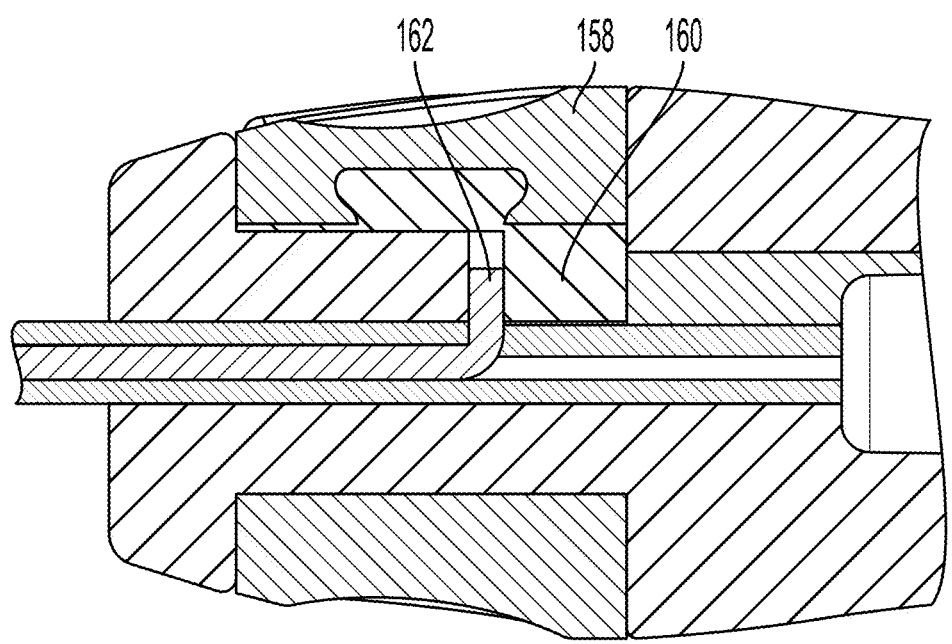
Figure 31:
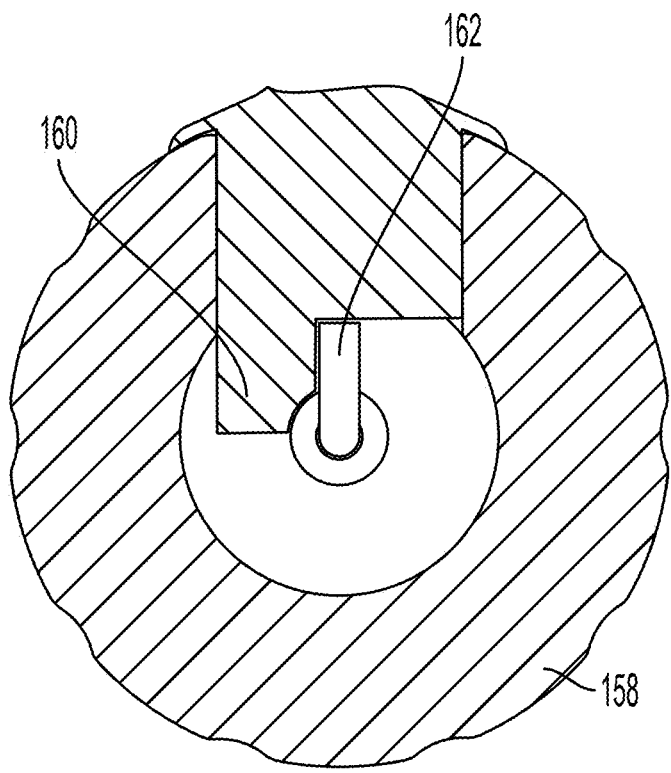
Figure 32:
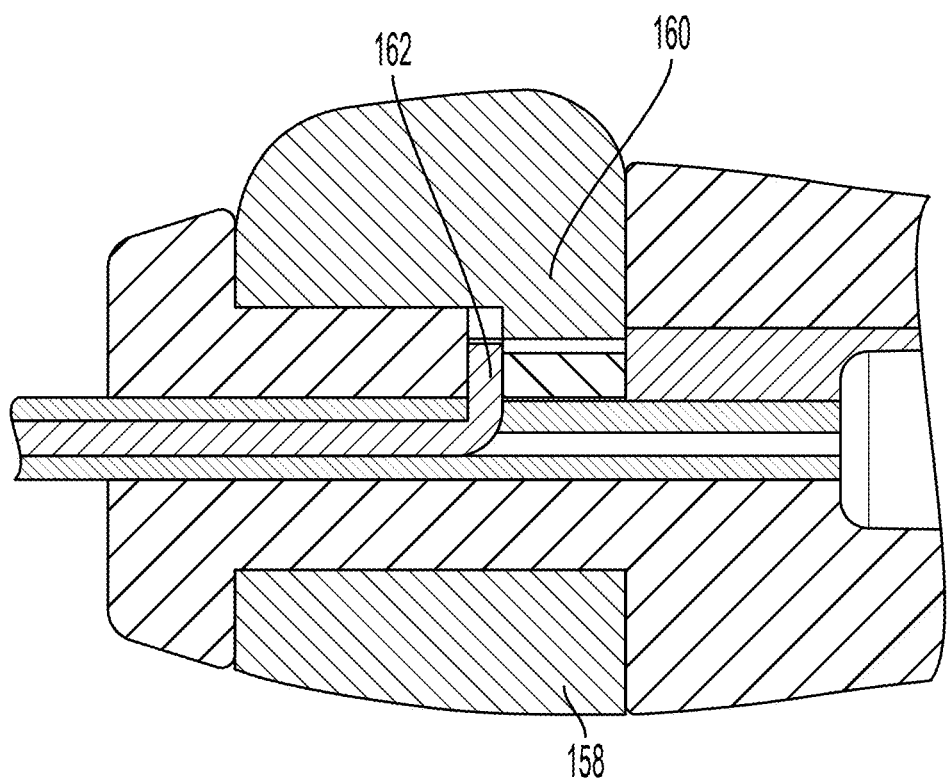

Unlike the collar 108 shown in FIGS. 1 and 17-20, the collar 158 in this example is associated with a stop 160 that is rotatable with the collar 158. In this example, when the collar 158 is in the locked configuration shown in FIGS. 29 and 30, the stop 160 limits translation of the insertion shaft 106 relative to the drive shaft 104. As shown in FIGS. 29 and 30, when the collar 158 is in the locked configuration, the stop 160 is positioned to block a proximal end 162 of the insertion shaft 106 (in this particular example, the bent end of insertion shaft 106). When the collar 158 is in the unlocked configuration shown in FIGS. 31 and 32, the stop 160 does not limit translation of the insertion shaft 106 relative to the drive shaft 104.

The collar 158 is positioned on the surgical instrument and configured for operation such that it can be easily and reliably operated with one hand, which the inventors have found provides an unexpectedly improved user experience over earlier instruments that either require both hands to carry out a two step anchoring process or use buttons embedded in the handle that are not easy for the surgeon to access and operate during an anchoring procedure. The location of the collar 158 near the distal end of the handle, its extension about the handle, and its rotational operation all contribute to its ease of operation.

Alternative Two-Step System, Method, and Instruments—FIGS. 33-43

Figure 33:
FIGS. 33-43 show examples of components for another example of a surgical system for securing an anchor in a bone.
Figure 34:

FIGS. 33-43 show additional examples of components of a system for securing an elastomeric device to bone. FIG. 33 shows an inner shaft 502 of an instrument. FIG. 34 shows the inner shaft 502 received in an outer cannulated shaft 504. The inner shaft 502 is received by the outer cannulated shaft 504 in a sliding fashion. A lock movable between a locked configuration and an unlocked configuration may be used to control sliding of the inner shaft 502 relative to the outer shaft 504. The lock is not shown in this example, but may be, for example, any of the collars and associated mechanisms described above.

Figures 35, 36:
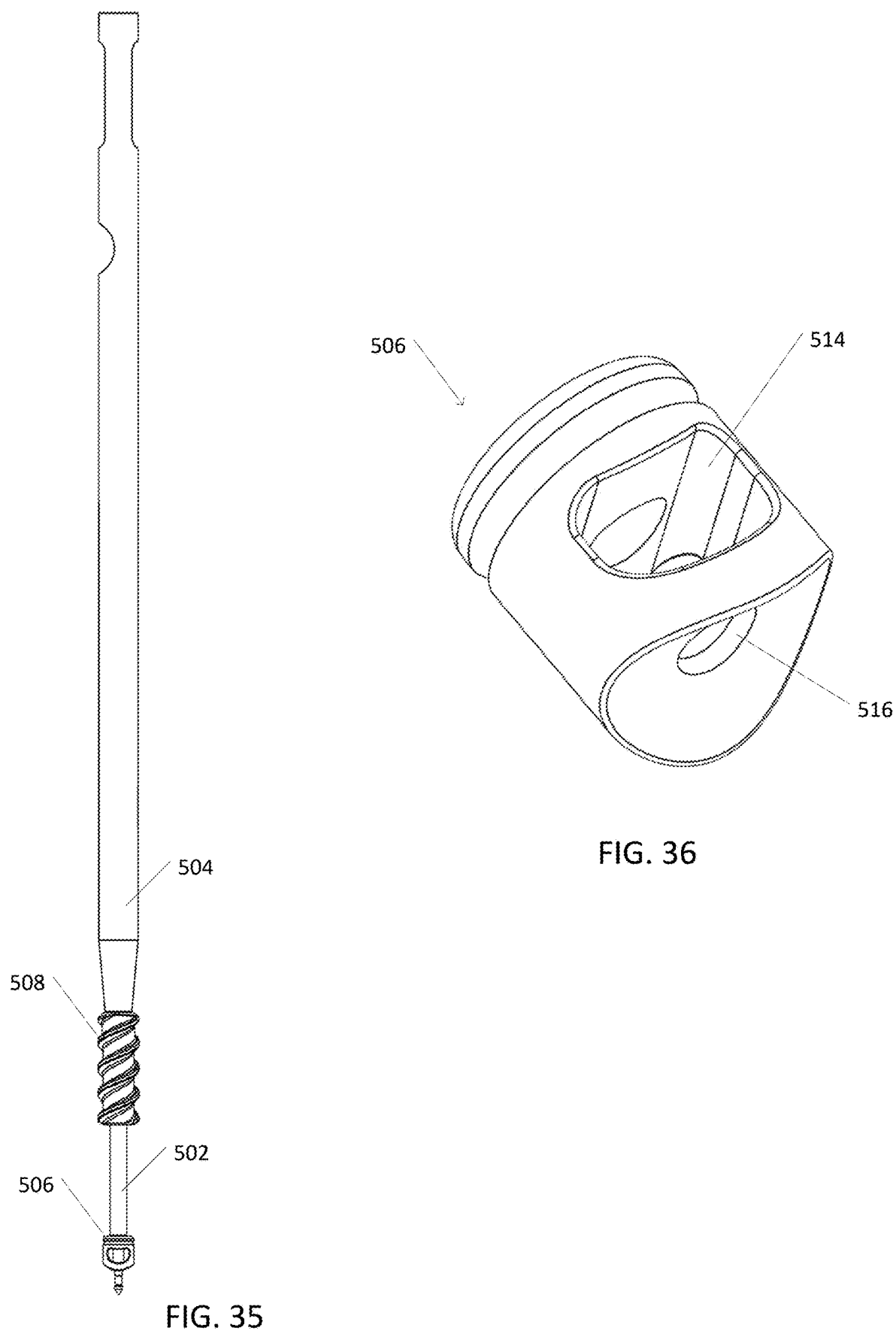

FIG. 35 shows a bone implant associated with the inner and outer shafts 502, 504. The bone implant includes a distal component 506 mounted on the inner shaft. The distal component 506 is configured to receive an elastomeric device as discussed further below. The bone implant also includes a proximal fixation component 508. The proximal fixation component 508 includes bone engaging features extending from an outer surface (e.g. threads) and may be the same as or similar to the fixation member 202 described in earlier examples.

As shown in FIG. 35, the distal component 506 mounted on the inner shaft 502 is spaced apart from the proximal fixation component 508. When the lock is moved to the unlocked configuration, the inner shaft 502 is permitted to slide relative to the outer shaft 504 to move the proximal component 508 towards the distal component 506.

Figure 37:
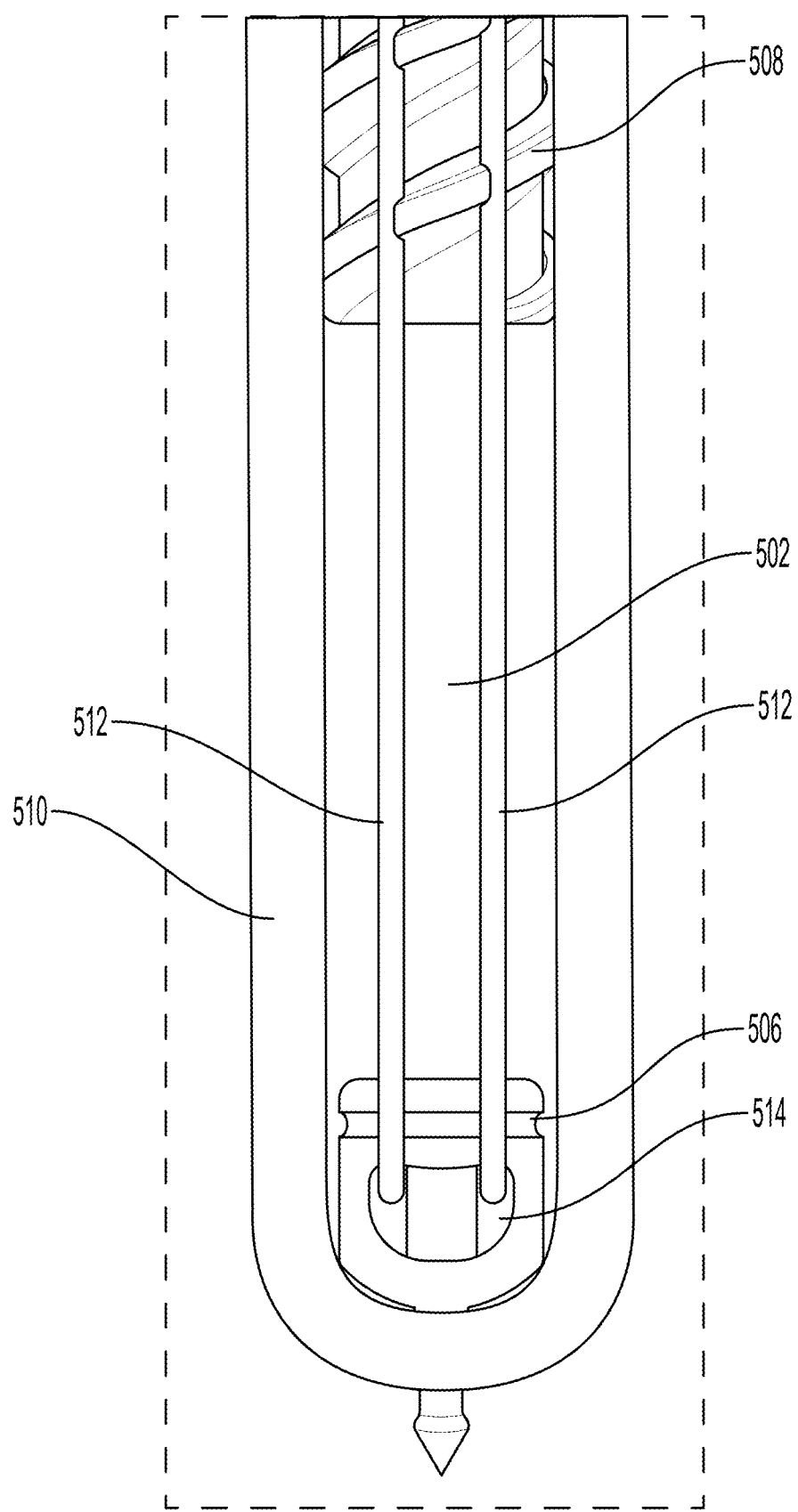
Figure 38:
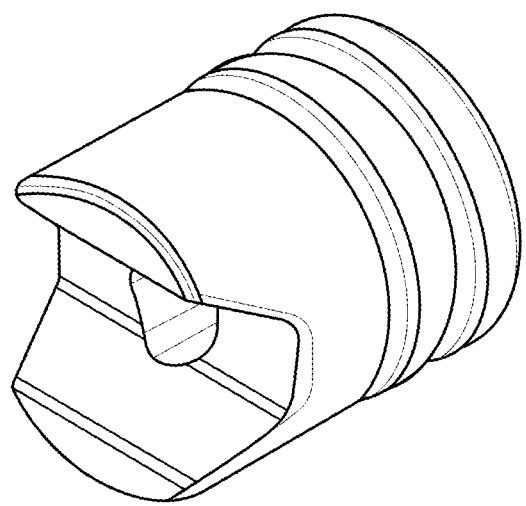

FIG. 36 shows the distal component 506 in more detail. The distal component 506 is configured to receive an elastomeric device such that the elastomeric device wraps around a portion of the distal component 506. In this particular example the distal component 506 is a plug, and, as shown in FIG. 37, the elastomeric device 510 wraps around a distal end of the plug. As also shown in FIG. 37, the plug 506 may also be configured to receive one or more strands of suture 512. The suture may be wrapped around the distal end of the plug or (as shown in FIG. 37) passed through a transverse opening 514 extending through the plug.

Figure 41:
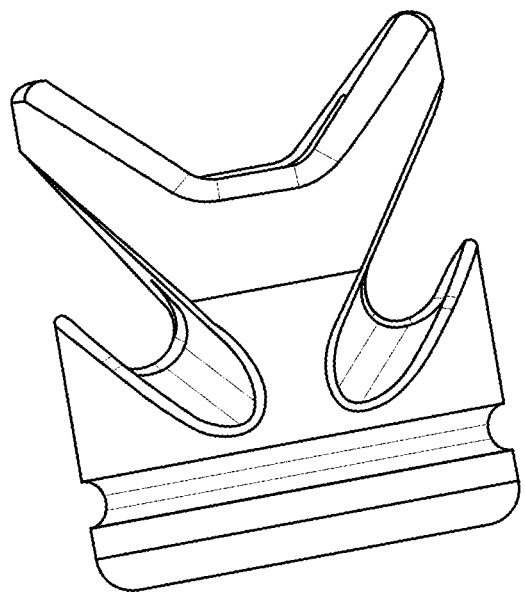
Figure 39:
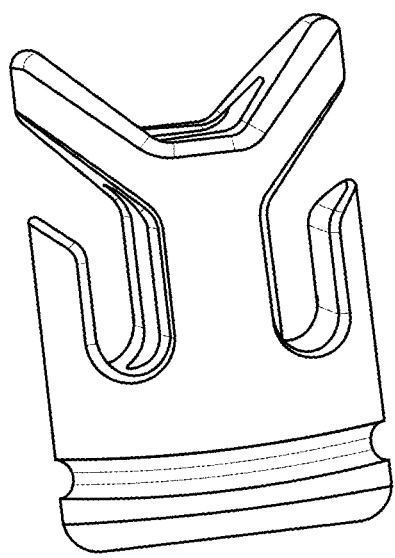
Figure 42:
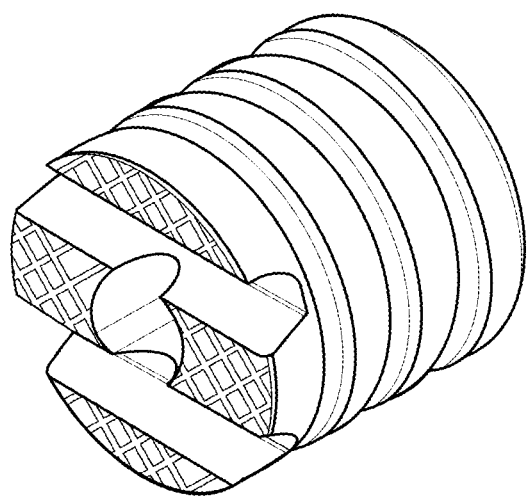
Figure 40:
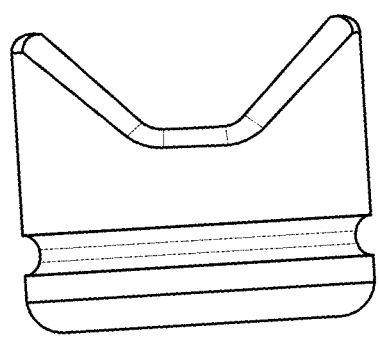

FIGS. 38-42 show several alternative examples of plugs. The plugs may have a recess on its distal end (e.g. as shown in FIGS. 38-41) for receiving the elastomeric device and (optionally) suture. The plugs may have transverse slots around which suture may be wrapped (e.g. as shown in FIGS. 39 and 41). In the example shown in FIG. 42, the plug includes two separate slots on its distal end for receiving suture and a surface texturing. In some implementations, the surface texture may help prevent an elastomeric device from slipping off the end of the plug.

The plugs shown in FIG. 36 and FIGS. 38-42 also include a longitudinal opening (e.g. 516 in FIG. 36) through which a distal end of the inner shaft 502 may pass. As shown in FIG. 37, the distal end of the inner shaft is configured to penetrate the elastomeric device 510 wrapped around the distal end of the plug.

Figure 43:
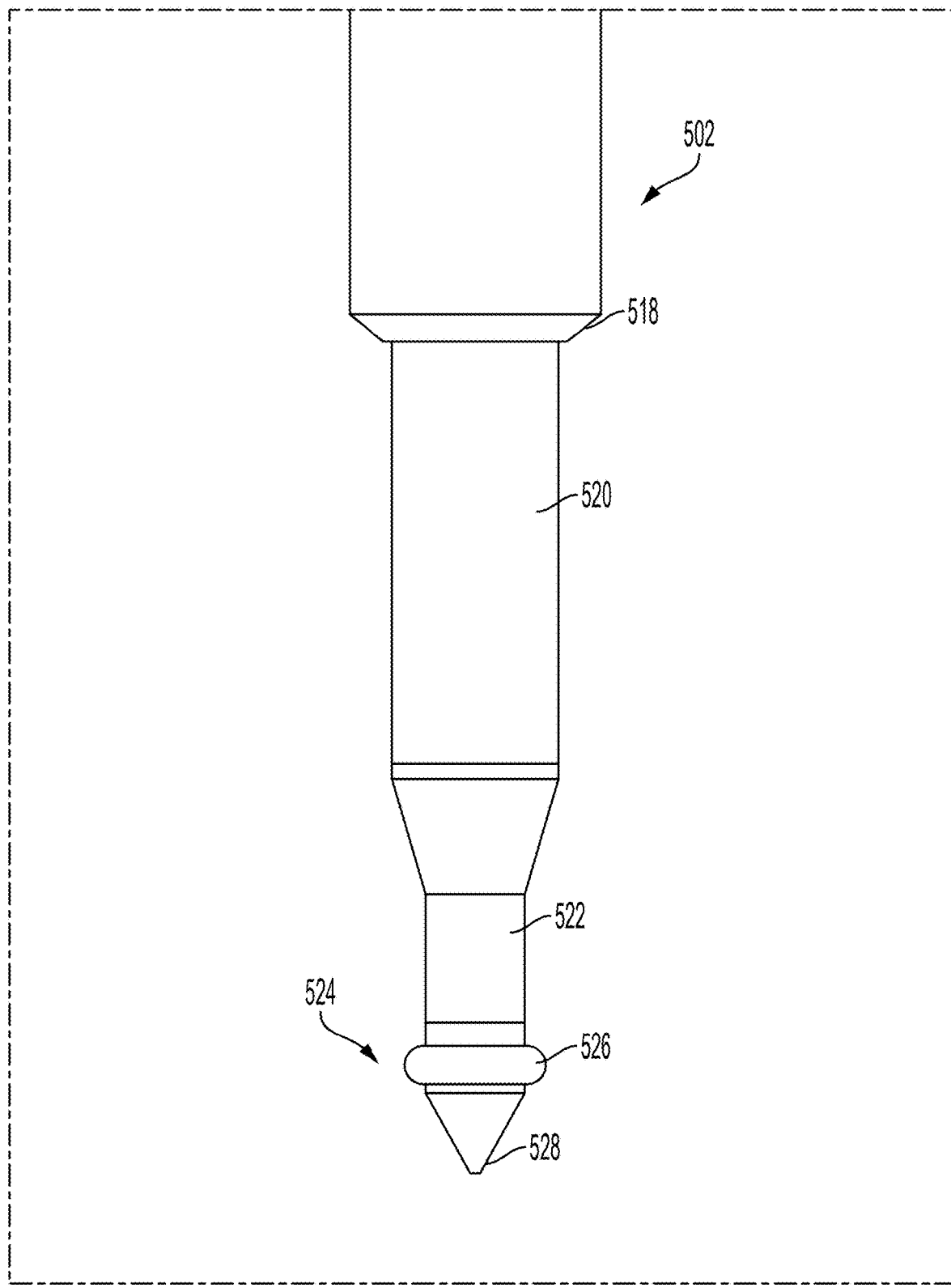

FIG. 43 shows an enlarged view of the distal end of the inner shaft 502. In this example, the distal end of the inner shaft is configured as a spear shaft and includes a shoulder 518, a first length 520 extending distally from the shoulder 518, a second length 522 extending distally from the first length 520, and a distal tip 524. The shoulder 518 is configured to abut a proximal end of the plug when it is mounted thereon, with the first length 520 of the inner shaft 502 extending through the longitudinal opening 516. The second length 522 has a reduced diameter relative to the first length 520, and protrudes from the distal end of the plug when it is mounted on the inner shaft 502. The distal tip 524 includes a wider portion 526 relative to the second length 522 and a sharpened tip 528.

The spear shaft is configured to pierce through an elastomeric device mounted thereon, with the thinner portion of the shaft (first length 520) extending through the elastomeric device and the wider portion 526 configured to resist disengagement of the elastomeric device from the spear shaft. The elastic properties of the elastomeric device may bias the elastomeric device to disengage from the spear shaft, and the wider portion 526 may be sufficiently sized to prevent such a disengagement.

The systems illustrated in FIGS. 33-43 may be used in similar fashions to the earlier-described systems. In one use case, the system can be used to secure an elastomeric device in bone. In another use case, suture (round or flat) in addition to or instead of the elastomeric device may be secured in bone. The anchored suture may be used to attach additional elastomeric devices, soft tissue (tendon/ligament), or a graft to the anchor site. In another use example, prior to securing an elastomeric device and/or suture into the bone opening, a length of tendon may be inserted into the opening, followed by insertion of the elastomeric device and/or suture into the opening, followed by driving the fixation member into the opening to secure the length of tendon and the elastomeric device/suture in the opening. As with the previous example, the anchored suture may be used to attach additional elastomeric devices, soft tissue (tendon/ligament), or a graft to the anchor site. In still another use example, a length of tendon may be inserted into the opening followed by driving the fixation member into the opening to secure the length of tendon in the opening, without the use of a plug, an elastomeric device, or a suture. In this last example, the spear shaft may be fixated in a retracted, unexposed position.

Alternative Two-Step System, Method, and Instruments—FIGS. 44-52

FIGS. 44-52 show another example of a method for securing an elastomeric device 600 to bone 602. In this example, the elastomeric device 600 is positioned over a bone opening 604 by piercing the elastomeric device 600 with an elongated member 606 extending out of the bone opening 604 (see FIG. 46), pushing a portion of the elastomeric device 600 into the bone opening 604 (see FIG. 47) such that at least one free end extends out of the bone opening 604, and inserting a fixation component 608 into the bone opening 604 (see FIG. 48) to secure the elastomeric device 600 in the bone opening 604.

Figure 44:
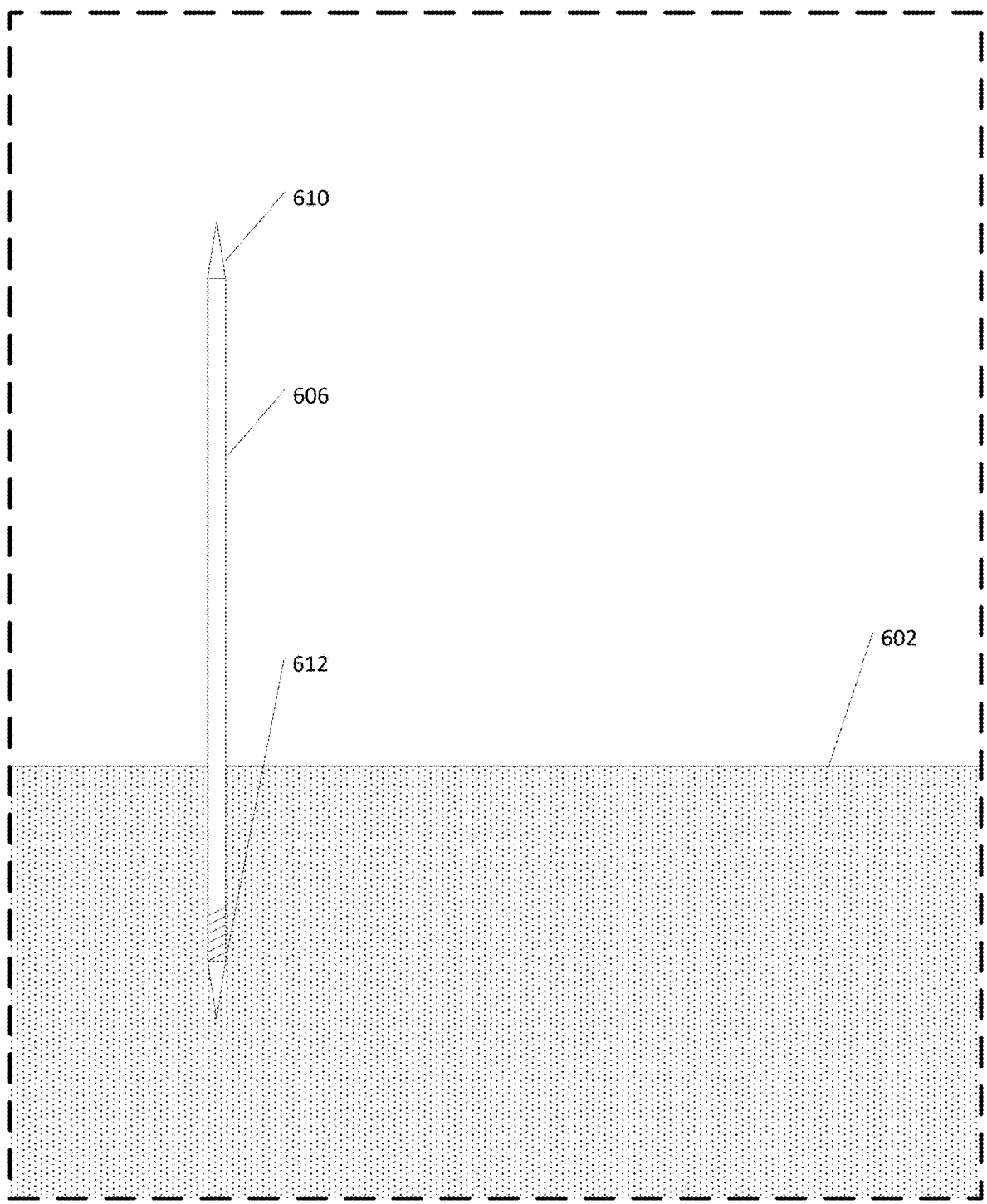
FIGS. 44-52 show another example of a method for securing an elastomeric device to bone.
Figure 65:
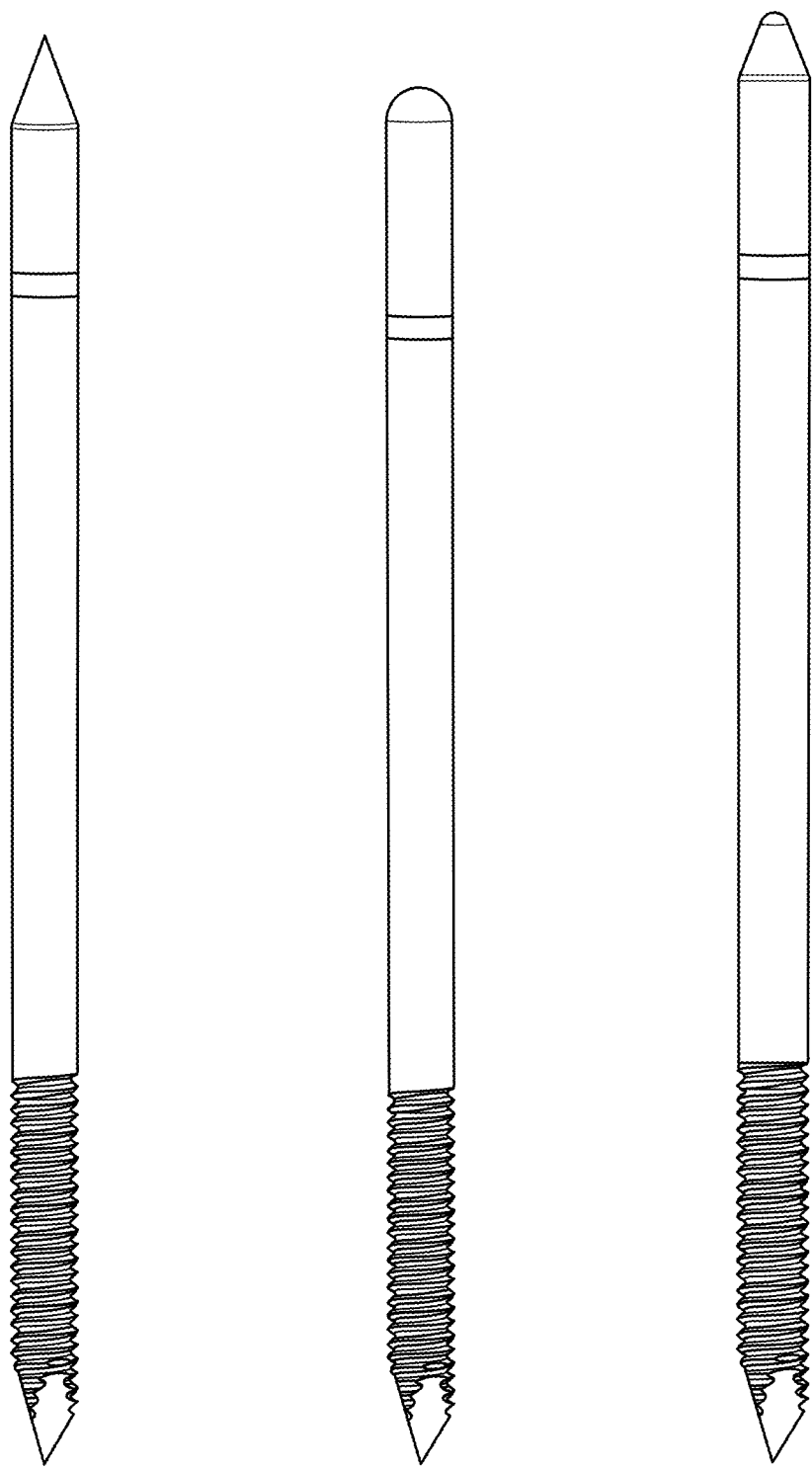
FIG. 65 shows examples of elongated members for use as guide pins.

FIG. 44 shows an initial step of inserting the elongated member 606 into bone. The elongated member 606 may be a guide pin including tips 610, 612 that may be sharpened or otherwise configured for drilling into bone and piercing the elastomeric device 600. FIG. 65 shows additional examples of elongated members that may be used. In all three of these examples, the bone drilling/engaging end includes a helical thread with a trocar/diamond tip drilling point. The other end may include a pointed, rounded, or other geometry as shown.

Figure 45:
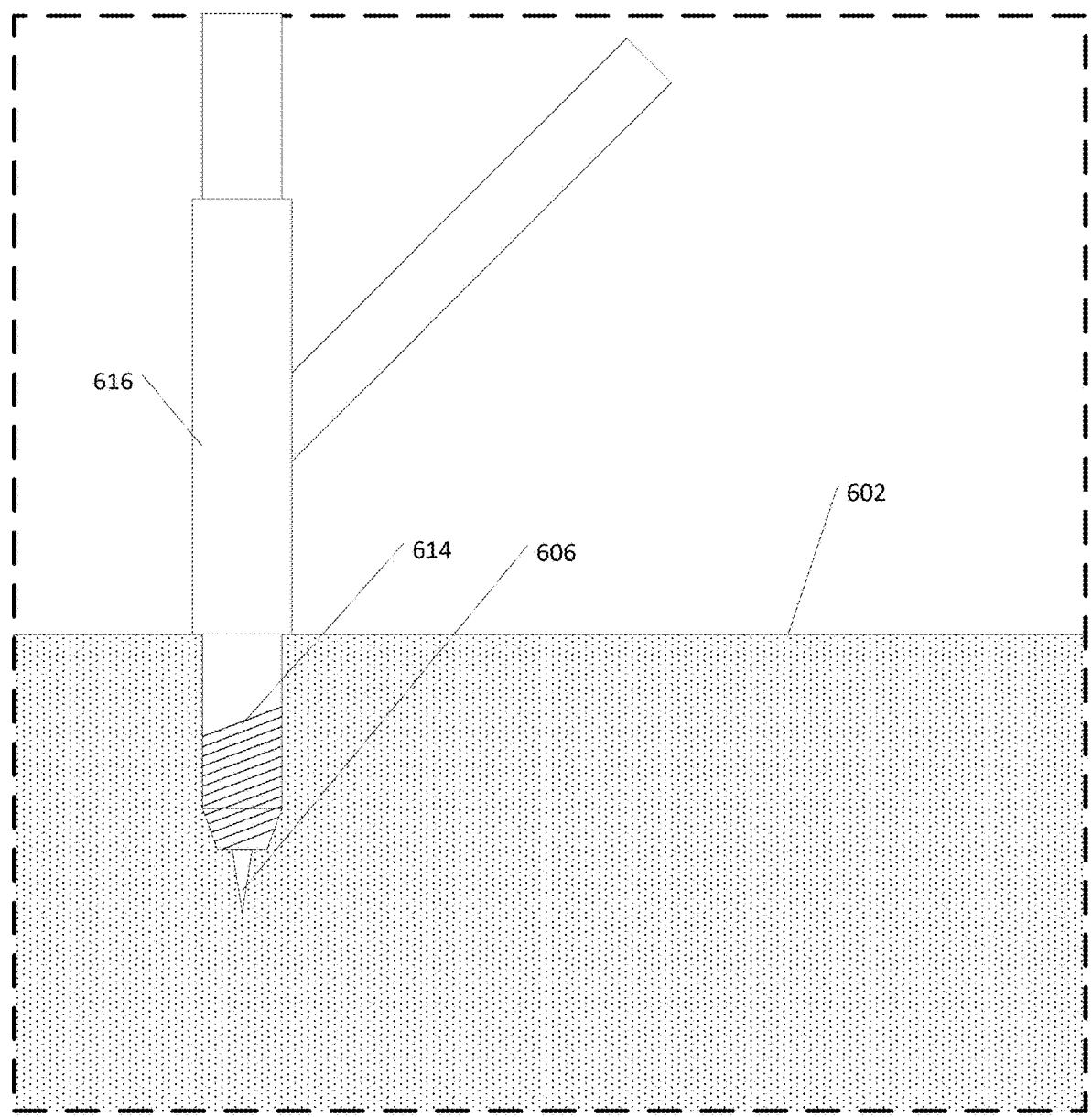

FIG. 45 shows using the elongated member 606 to guide a cutter 614 to form an opening in the bone. In this particular example, the cutter 614 is a cannulated drill bit inserted over the elongated member 606 and through a drill guide 616.

Figure 46:
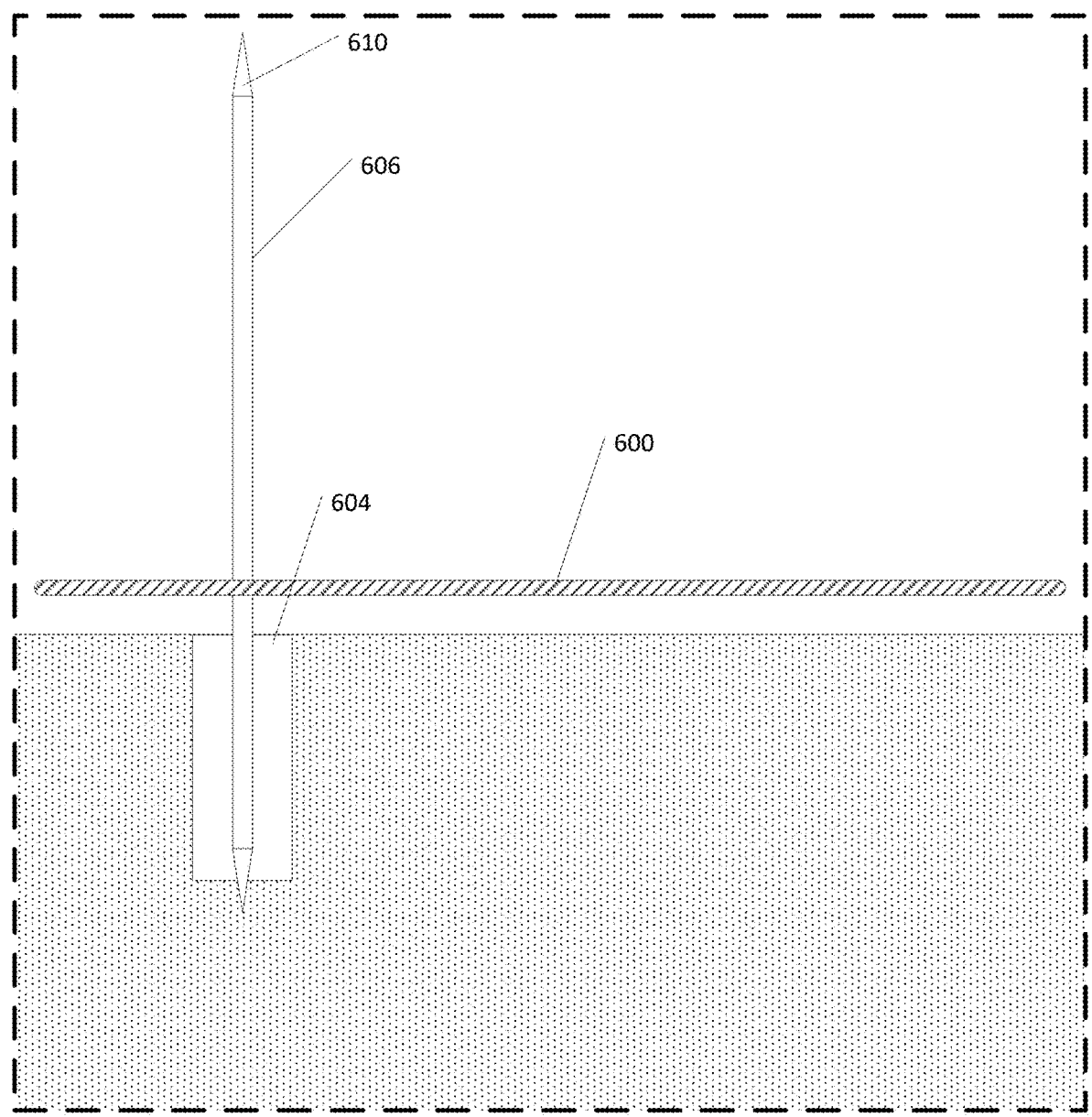

FIG. 46 shows the cannulated drill bit and drill guide removed, leaving bone opening 604 with the elongated member 606 extending out of the bone opening 604. FIG. 46 also shows the elongated member 606 piercing through the elastomeric device 600, positioning the elastomeric device 600 over the bone opening 604.

Figure 47:
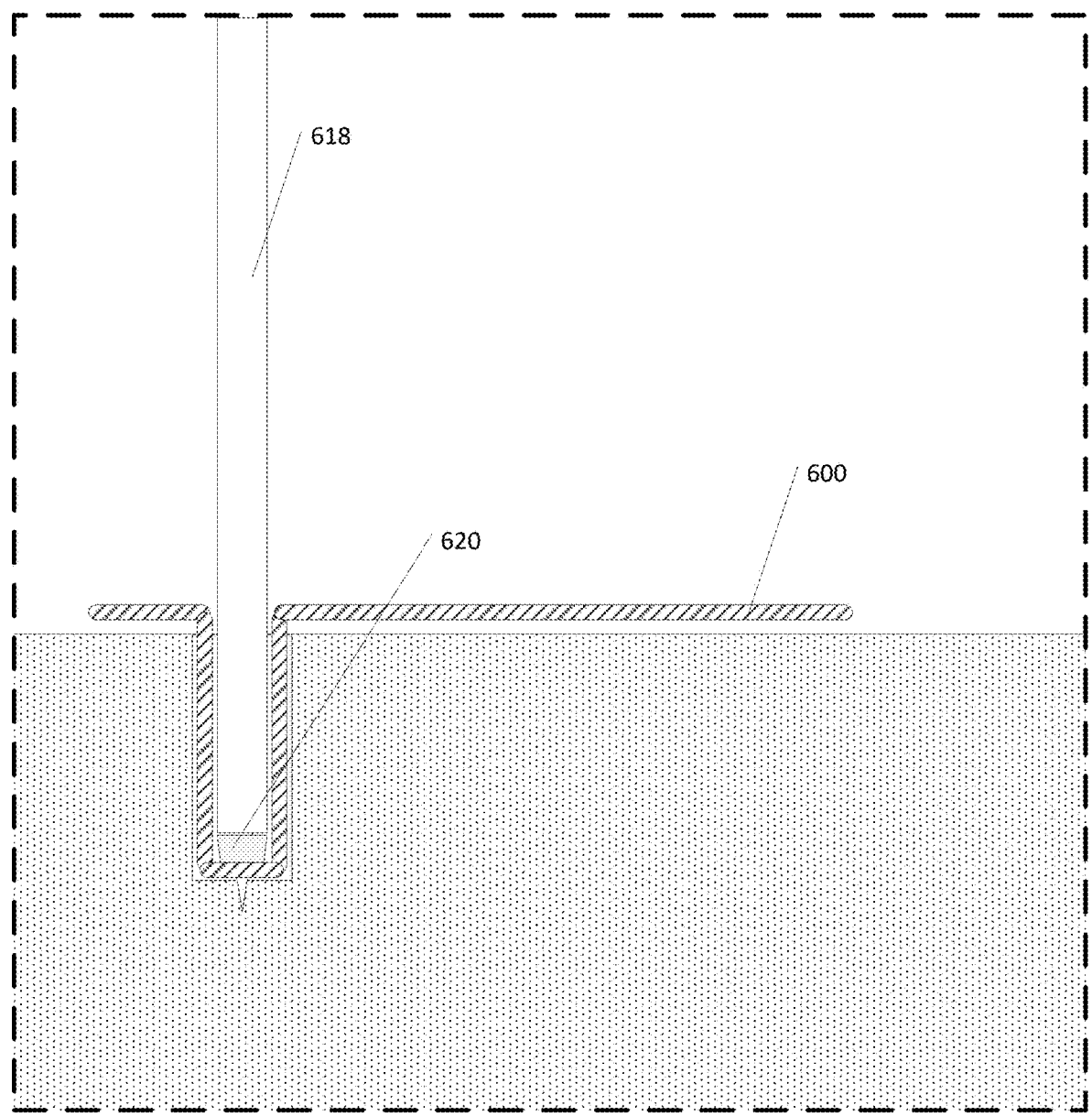

FIG. 47 shows pushing a portion of the elastomeric device 600 into the bone opening 604 using a cannulated instrument 618. The cannulated instrument 618 is slid over the elongated member 606 and down along it, pushing on the elastomeric device 600 and causing it to slide distally along the elongated member 606. In this example, a plug 620 is mounted on a distal end of the instrument 618, which is pushed down the elongated member 606 along with the elastomeric device 600, such that the elastomeric device 600 is wrapped around the plug 620 in the bone opening 604. The plug 620 is proximal to the location where the elongated member 606 pierces the elastomeric device 600. The plug 620 may be configured similarly to the plugs described in earlier examples, or may be configured differently.

Figure 48:
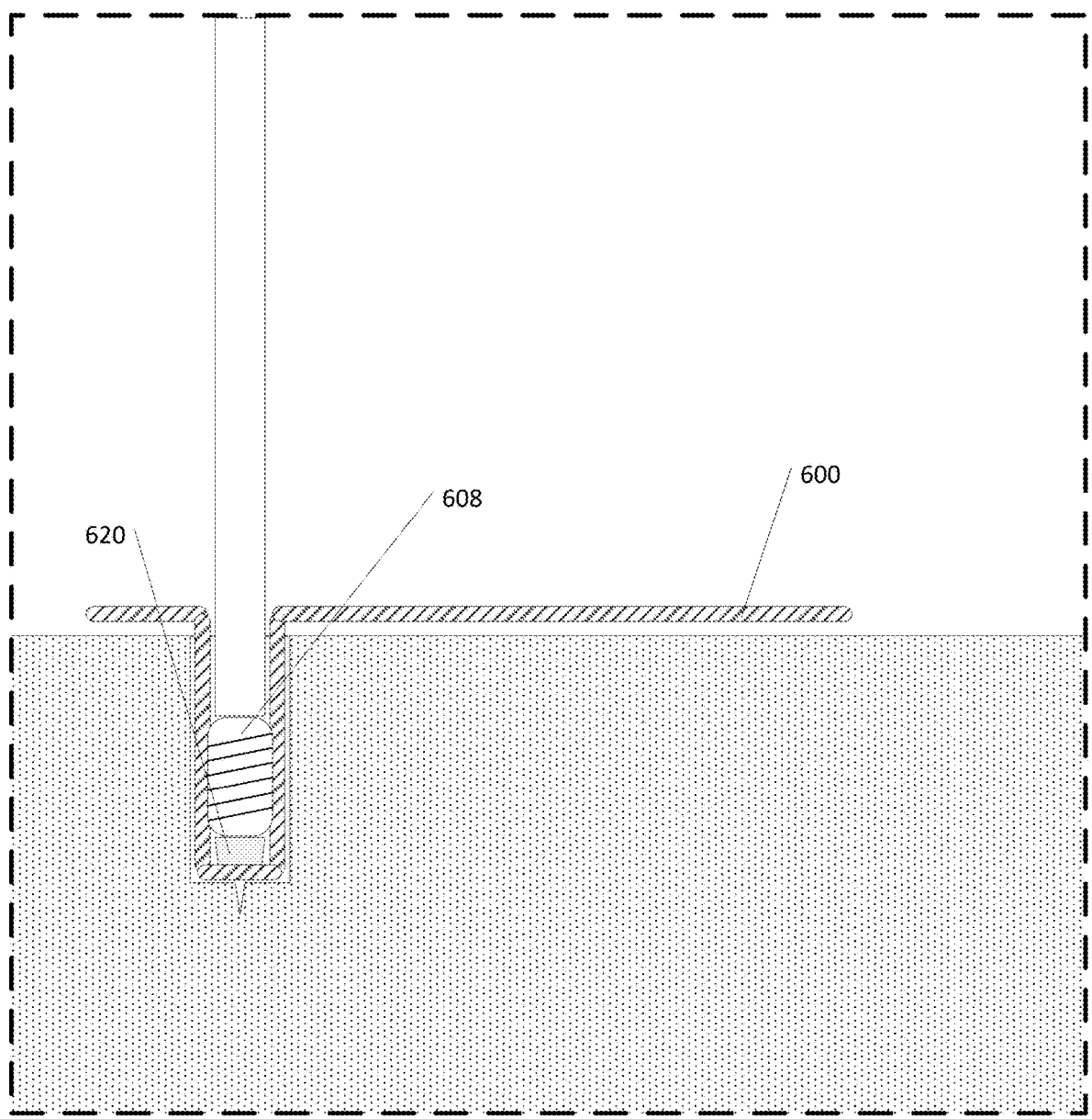
Figure 53:
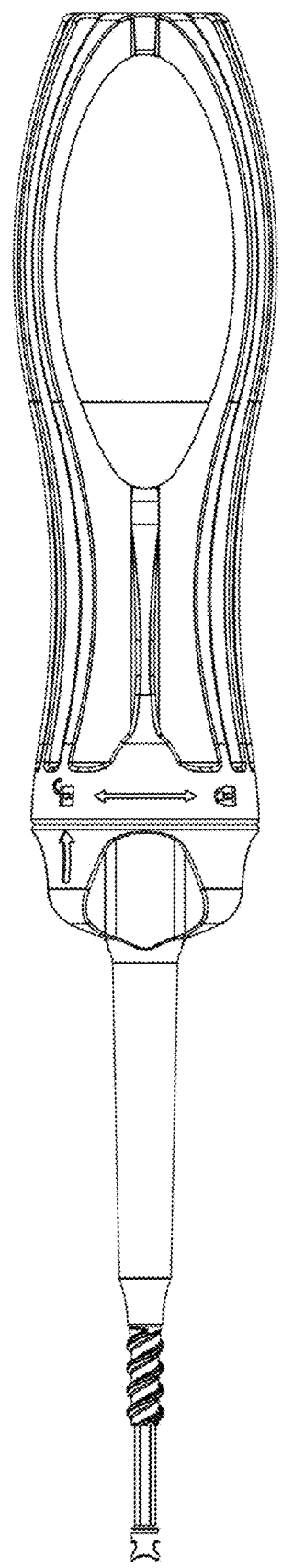
FIG. 53 shows an example of an instrument for performing the method of FIGS. 44-52.
Figure 54:
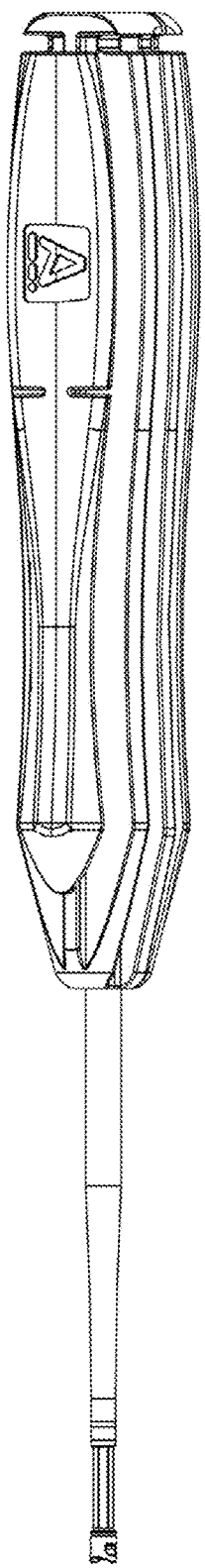
FIGS. 54-55 show examples of alternative instruments for performing the method of FIGS. 44-52.
Figure 55:
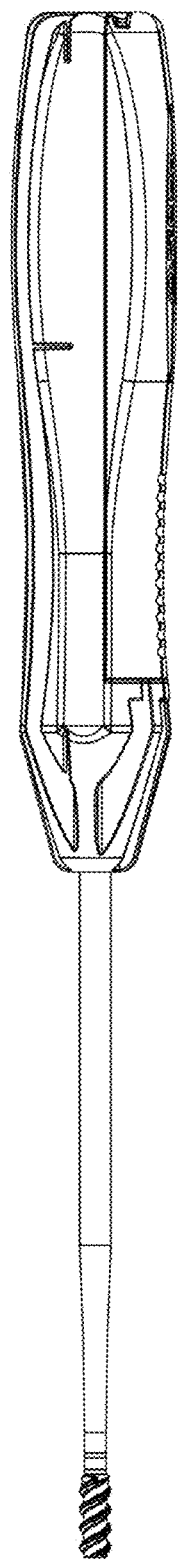

FIG. 48 shows insertion of a fixation component 608 into the bone opening 604. The fixation component 608 may be configured similarly to the fixation members described in earlier examples, or may be configured differently. The plug 620 and fixation component 608 may be inserted using a two-step instrument such as shown in FIG. 53 (which may utilize a two-step locking/unlocking mechanism and otherwise configured similarly to the instruments described above) or may be inserted using two separate instruments such as shown in FIGS. 54 and 55. The instruments shown in FIGS. 53-55 are all cannulated such that they can be slid over or otherwise guided by the elongated member 606.

Figure 49:
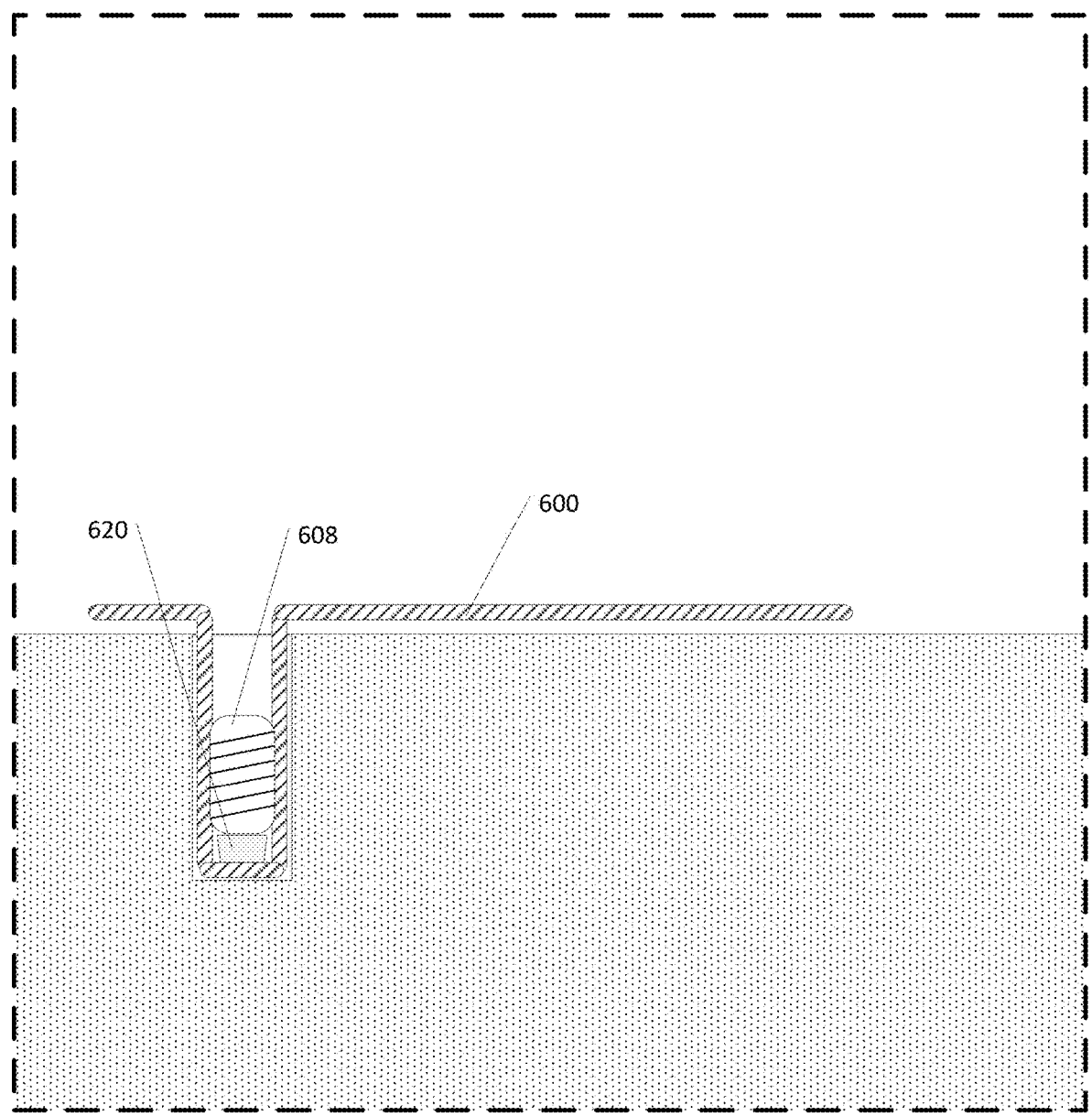

FIG. 49 shows the elongated member 606 and the instrument 618 removed, leaving the elastomeric device 600 secured in the bone opening 604. As shown in FIG. 49, the fixation component 608 is proximal to the plug 620, which is proximal to the portion of the elastomeric device where it had been pierced over the elongated member 606. Two ends of the elastomeric device extend proximally past the plug, past the fixation component, and out of the bone opening.

Figure 50:
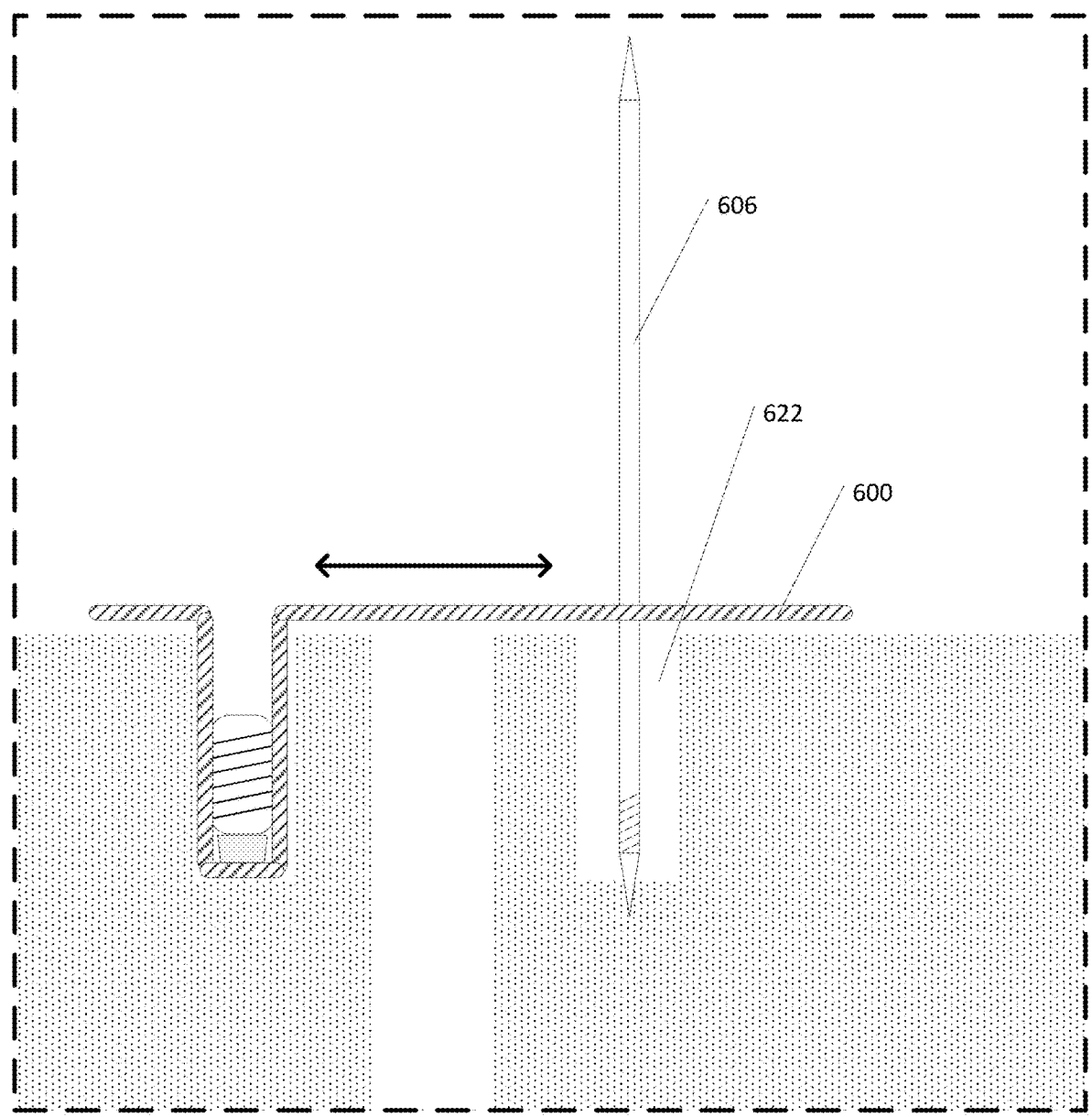
Figure 51:
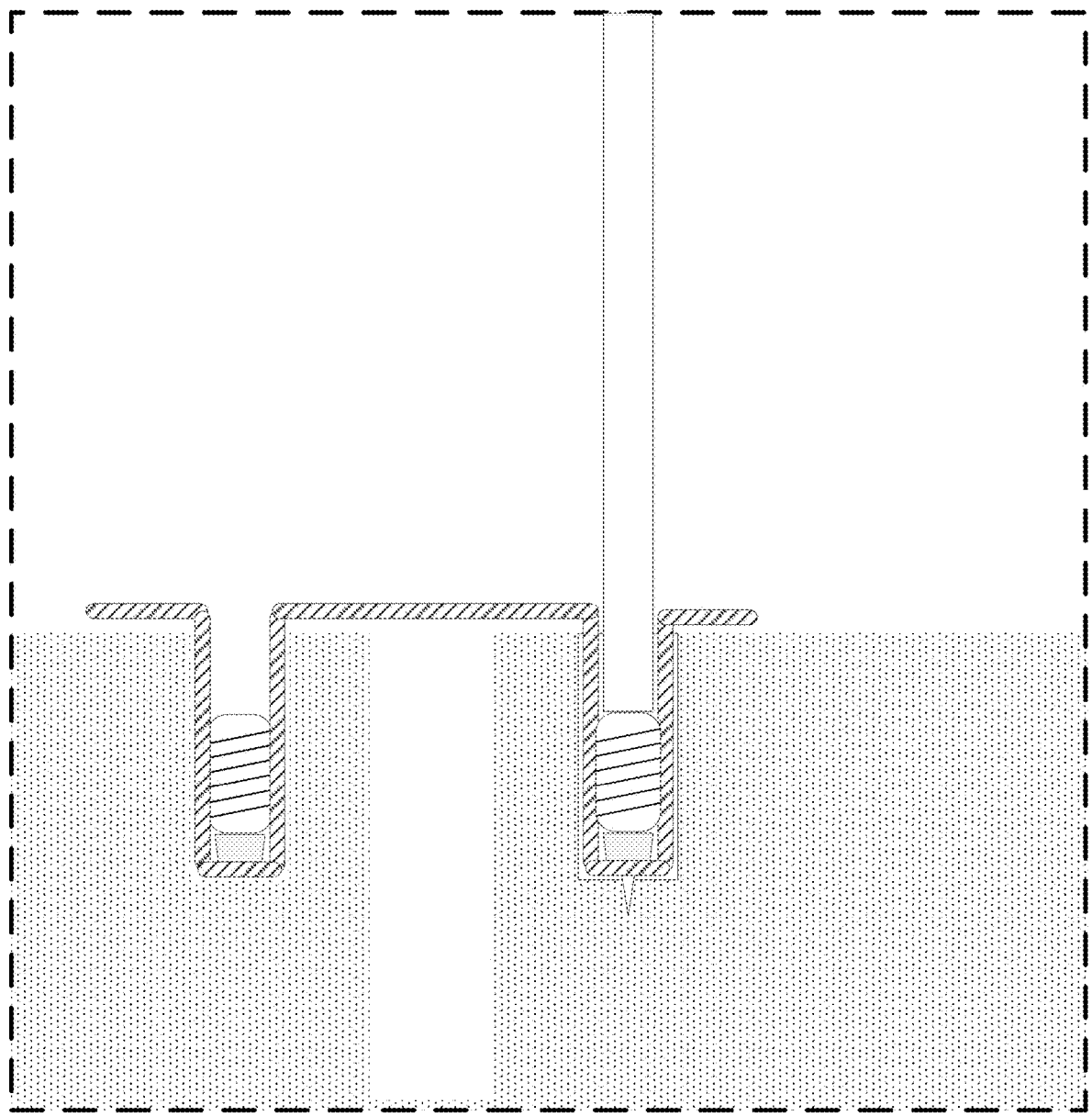
Figure 52:
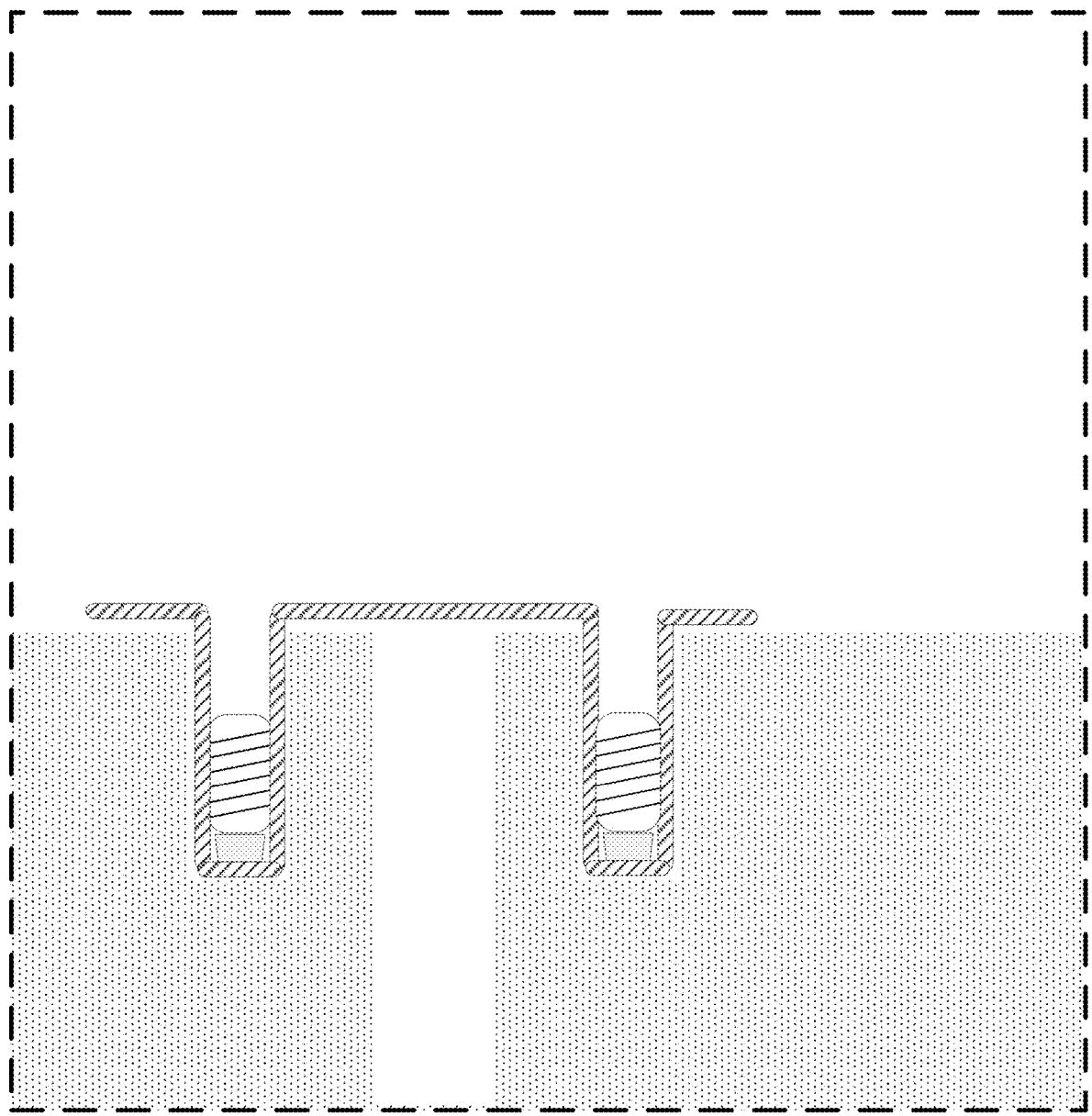

FIGS. 50-52 illustrate that the method shown in FIGS. 44-49 may be repeated to secure the elastomeric device 600 in a second bone opening 622. As shown in FIG. 50, after the elastomeric device 600 is secured in the first bone opening 604 and is pierced over the elongated member 606 extending out of the second bone opening 622, the tension of the elastomeric device 600 may be evaluated prior to pushing, the elastomeric device 600 into the second bone opening 622. If the tension requires adjustment, the elastomeric device 600 may be removed from the elongated member 606 and pierced at another location to either increase or decrease its tension. Once suitable tensioning is achieved, the elastomeric device 600 may be secured in the second bone opening 622 in a similar fashion to how it was secured in the first bone opening, as shown in FIGS. 51-52.

FIGS. 44-52 illustrate a method in which the same type of technique and the same type of instrumentation is used to secure an elastomeric device in both a first bone opening and a second bone opening. In other methods, different types of techniques and/or instrumentation may be used to secure the elastomeric device into different bone openings. For example, the method and instrumentation illustrated in FIGS. 44-49 may be used to secure an elastomeric device in a first bone opening and the method and instrumentation illustrated in FIGS. 2-4 may be used to secure the elastomeric device in a second bone opening. In another example, the method and instrumentation illustrated in FIGS. 44-49 may be used to secure an elastomeric device in a first bone opening and any appropriate combination of the instrumentation and devices illustrated in FIGS. 1-43 and 66-69 may be used to secure the elastomeric device in a second bone opening. In still other examples, the method and instrumentation illustrated in FIGS. 2-4 (or any other appropriate combination of instrumentation and devices illustrated in FIGS. 1-43 and 66-69) may be used to secure an elastomeric device in a first bone opening and the method and instrumentation illustrated in FIGS. 44-49 may be used to secure the elastomeric device in a second bone opening.

In some uses (although not necessarily all), methods using an elongated member like the one shown in FIG. 44 may be particularly useful for difficult to locate implantation sites, as it may provide visual and tactile information to the surgeon about the bone opening location (which may be obscured by soft tissue or other anatomy) and/or about the bone opening orientation (to facilitate proper orientation of the fixation component or other implant relative to the bone opening during insertion). In some uses (although not necessarily all), methods using instrumentation that does not pierce the elastomeric member may be particularly useful for when the elastomeric member is already under tension and reduce likelihood of damaging the elastomeric member's fibers. As such, in some implementations, mixed kits of instrumentation (e.g. including both instrumentation like that illustrated in FIGS. 44-49 and like that illustrated in FIGS. 1-43 and 66-69) may be provided in a single kit.

The methods and instrumentation described herein can be used for securing elastomeric devices and other implants into any number of bone openings. In some instances, the elastomeric device or other implant is secured in a single bone opening. In other instances, the elastomeric device or other implant is secured in two bone openings. In still other instances, the elastomeric device or other implant is secured in three or more bone openings.

Figure 66:
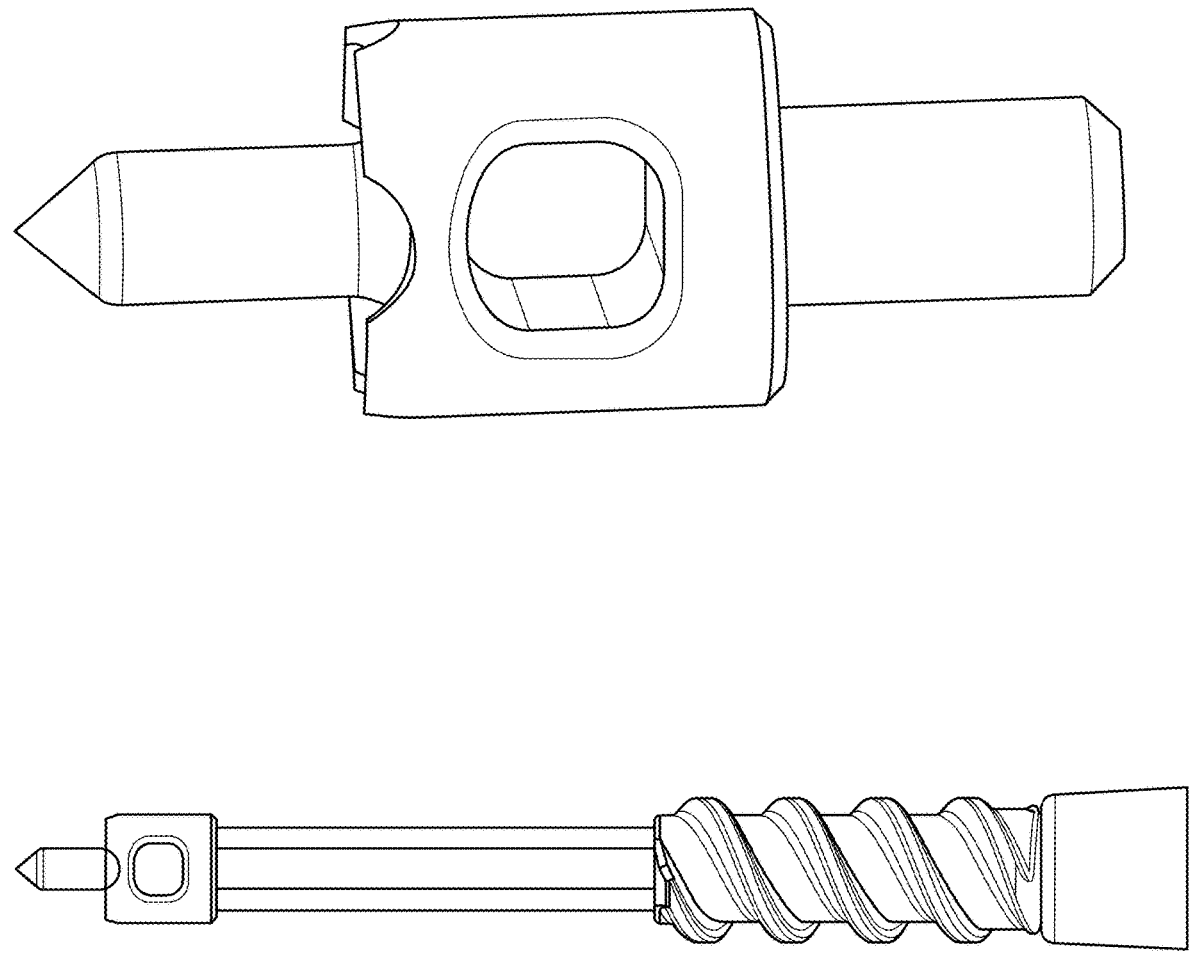
FIGS. 66 and 67 show an example of a system in which a delivery plug includes a piercing portion for engaging an elastomeric device.
Figure 67:
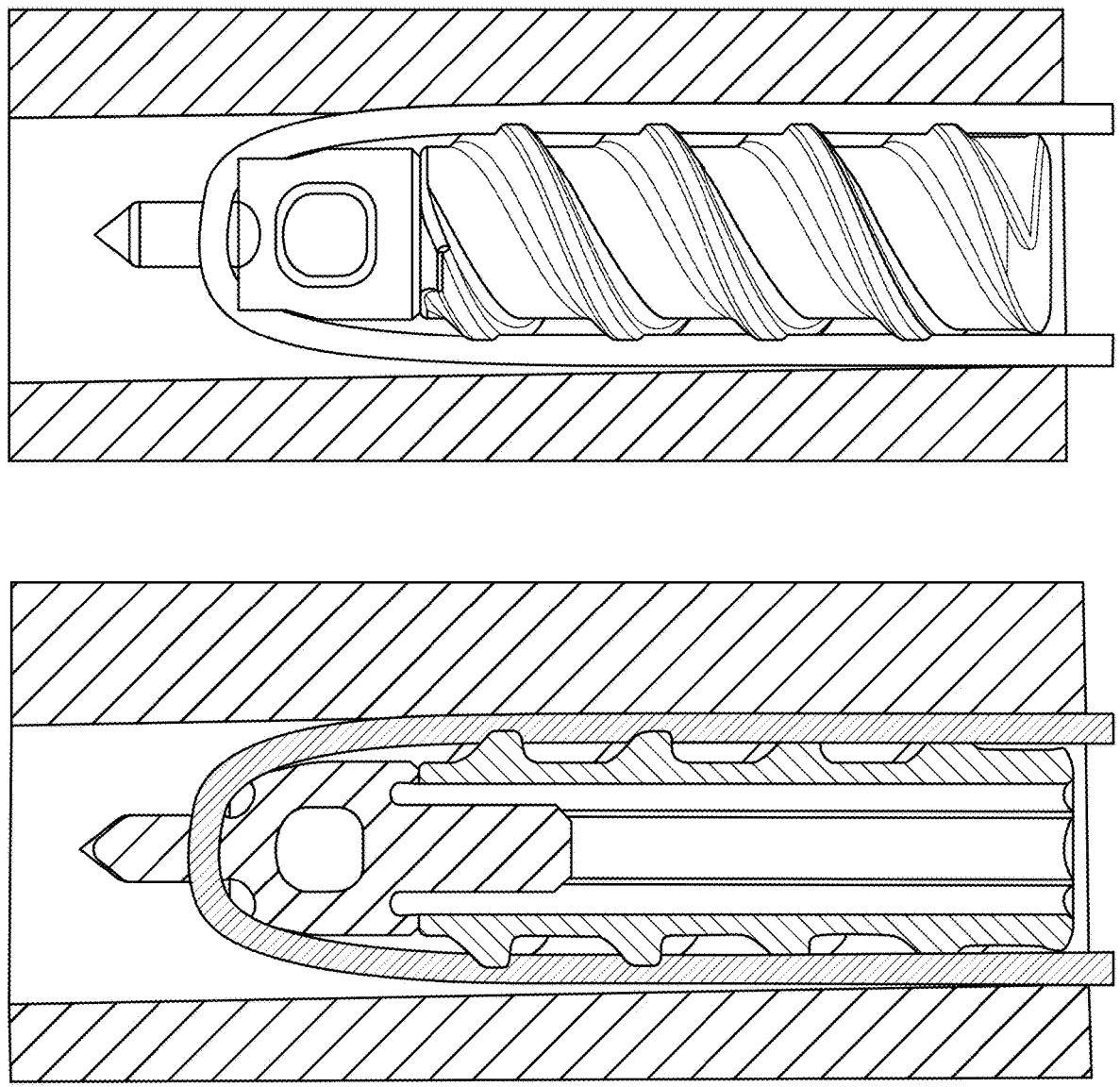

Alternative Two-Step System, Method, and Instruments—FIGS. 66-67

The system, methods, and instruments described above for FIGS. 44-52 include the use of an elongated member 606 that pierces the elastomeric device 600 as it is pushed down into the bone opening 604. In some implementations, elongated member 606 is not necessary. For example, FIGS. 66 and 67 show a system in which the delivery plug includes a piercing portion for engaging an elastomeric device.

Alternative System, Method, and Instruments—FIGS. 70-82

FIGS. 70-82 show another example of a method for securing an elastomeric device 800 to a person's anatomy 802. In this example, a first portion of the elastomeric device 800 is secured to the person's anatomy 802 and a second portion of the elastomeric device 800 is positioned in a bone opening such that the elastomeric device 800 is at a first tension. At this point, the tension of the elastomeric device 800 may be evaluated, and based on the evaluation, the tension of the elastomeric device 800 may be adjusted before inserting a fixation component into the bone opening to secure the elastomeric device 800 in the bone opening.

In the example shown in FIGS. 70-82, the elastomeric device 800 is secured into two bone openings. In other examples, one portion of the elastomeric device may be secured relative to a tendon or ligament of the person and the other portion of the elastomeric device may be secured in a bone opening.

Figure 70:
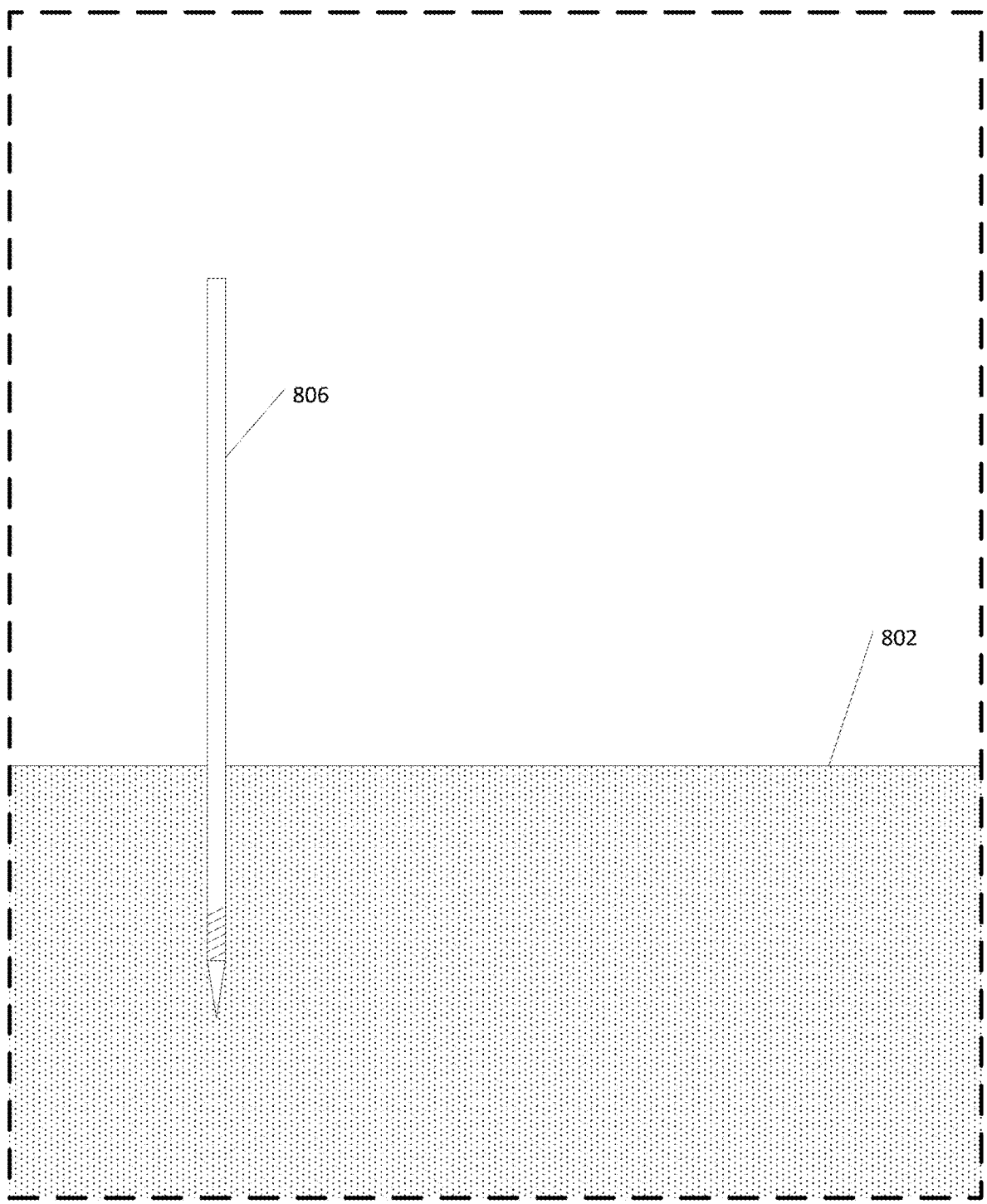
FIGS. 70-82 show another example of a method for securing an elastomeric device to a person's anatomy.

FIGS. 70-82 illustrate steps of this method as follows:

FIG. 70 shows insertion of a guide pin 806 into bone 802.

Figure 71:
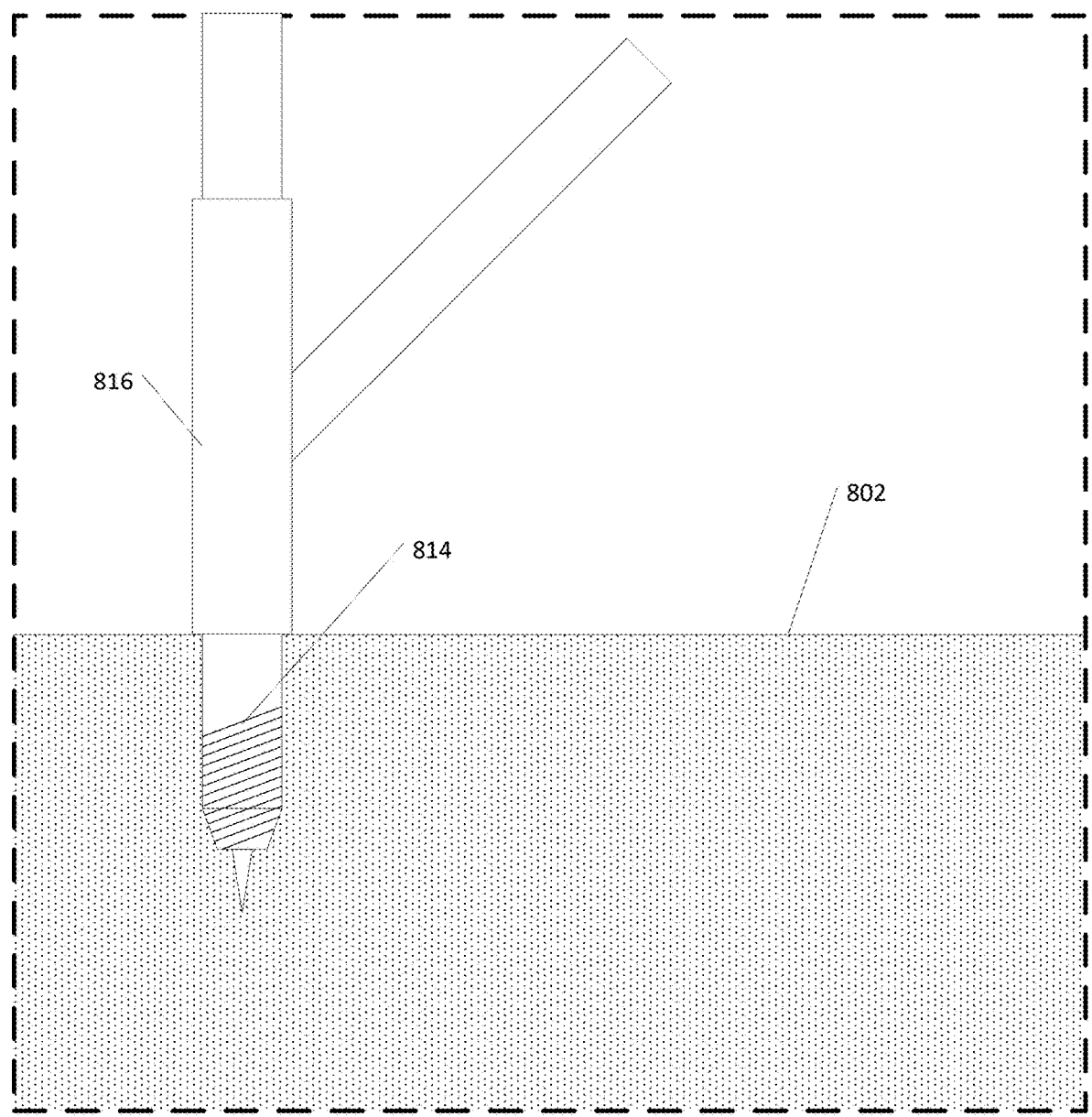

FIG. 71 shows use of a drill guide 816 to guide a cutter 614 to form a bone opening 804 in bone 802.

Figure 72:
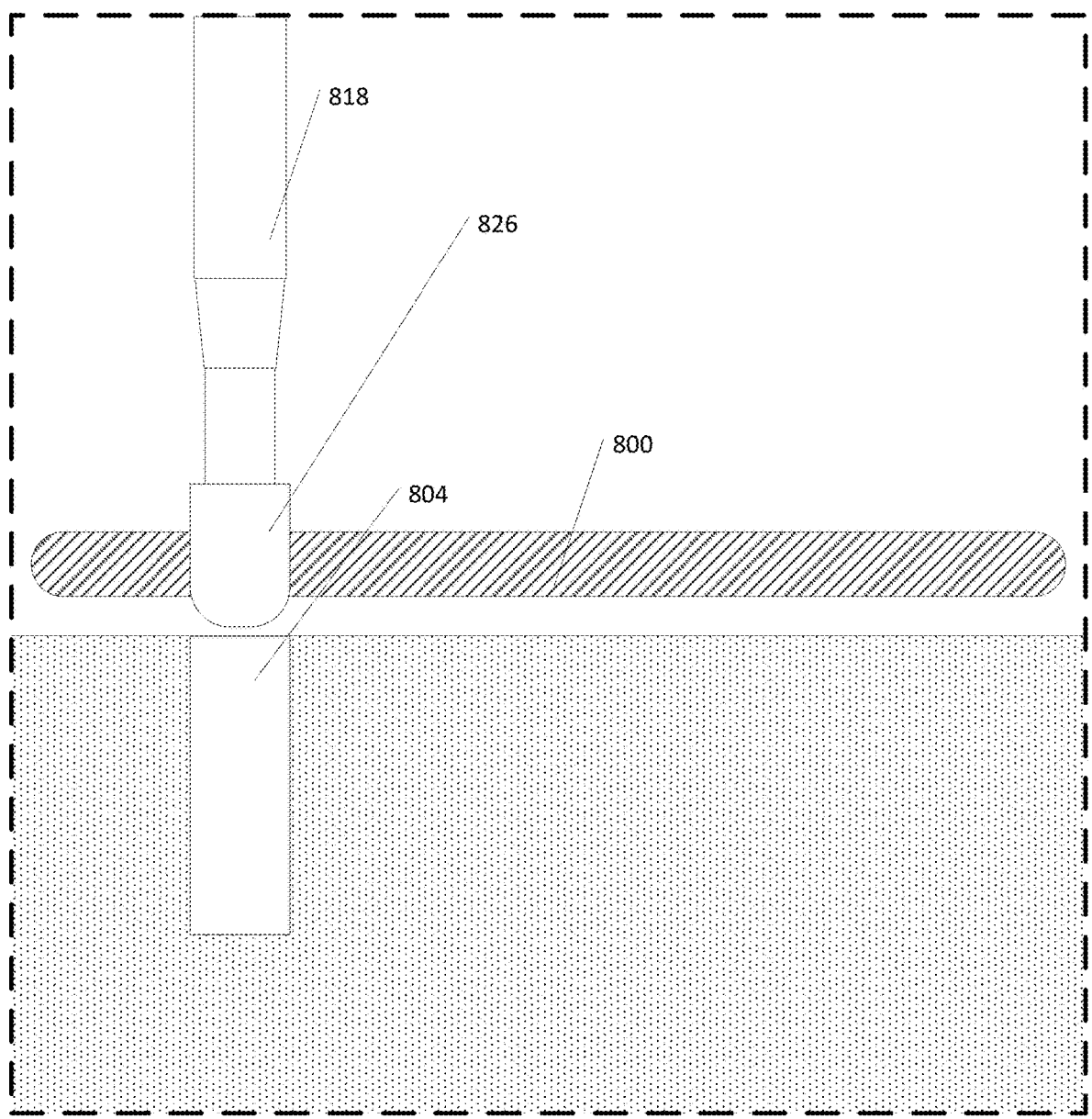

FIG. 72 shows positioning a portion of the elastomeric device 800 over the bone opening 804. In this example, the elastomeric device 800 is associated with an insertion component 826 that is mounted on an insertion instrument 818. The insertion component 826 may be the same or similar to the other insertion members described elsewhere herein, such as an eyelet or a plug component. The insertion instrument 818 may be the same or similar to the other instruments described elsewhere herein, including two-step instruments configured for insertion of both an insertion member and a fixation member or single-step instruments.

Figure 73:
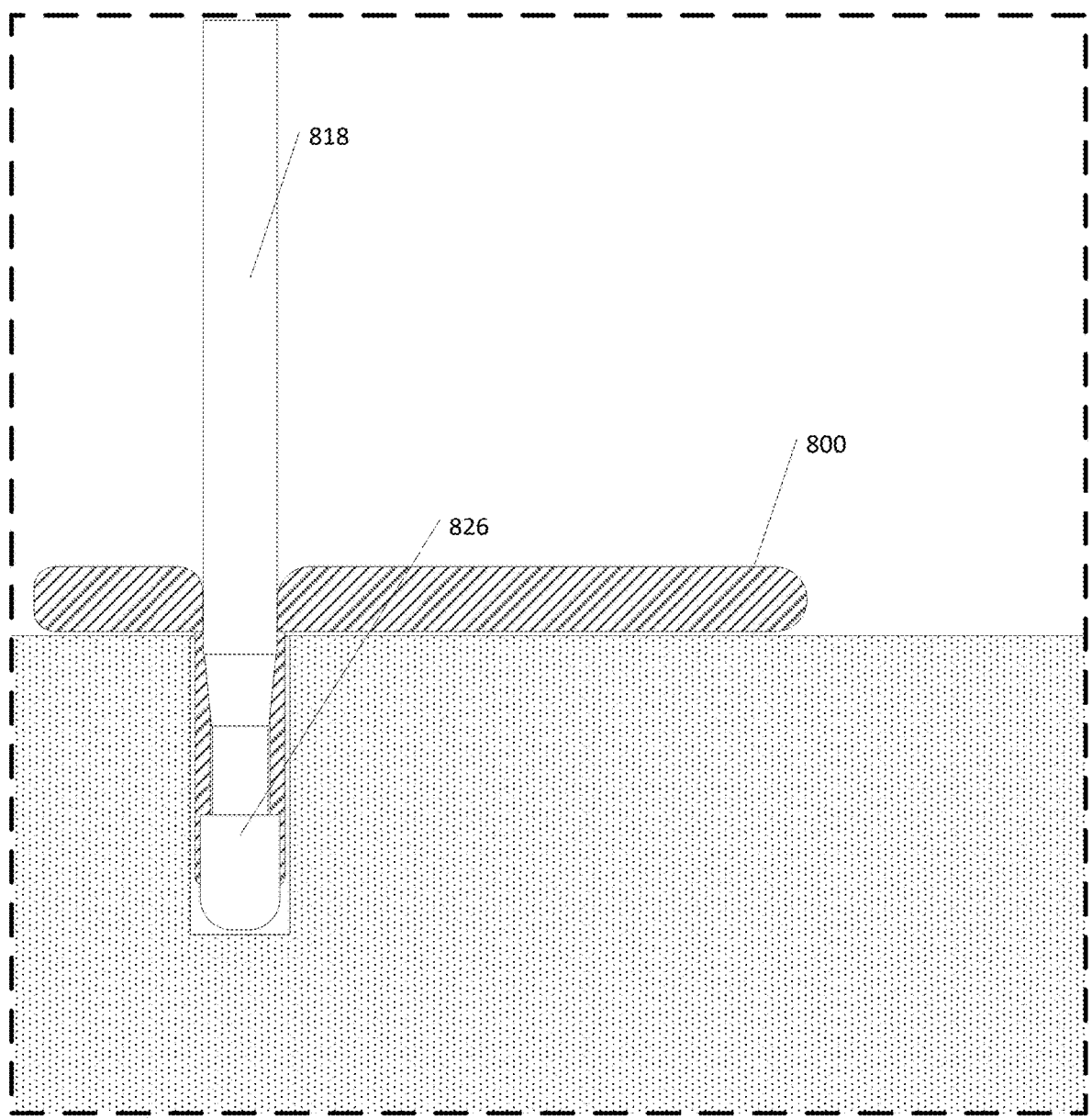
Figure 74:
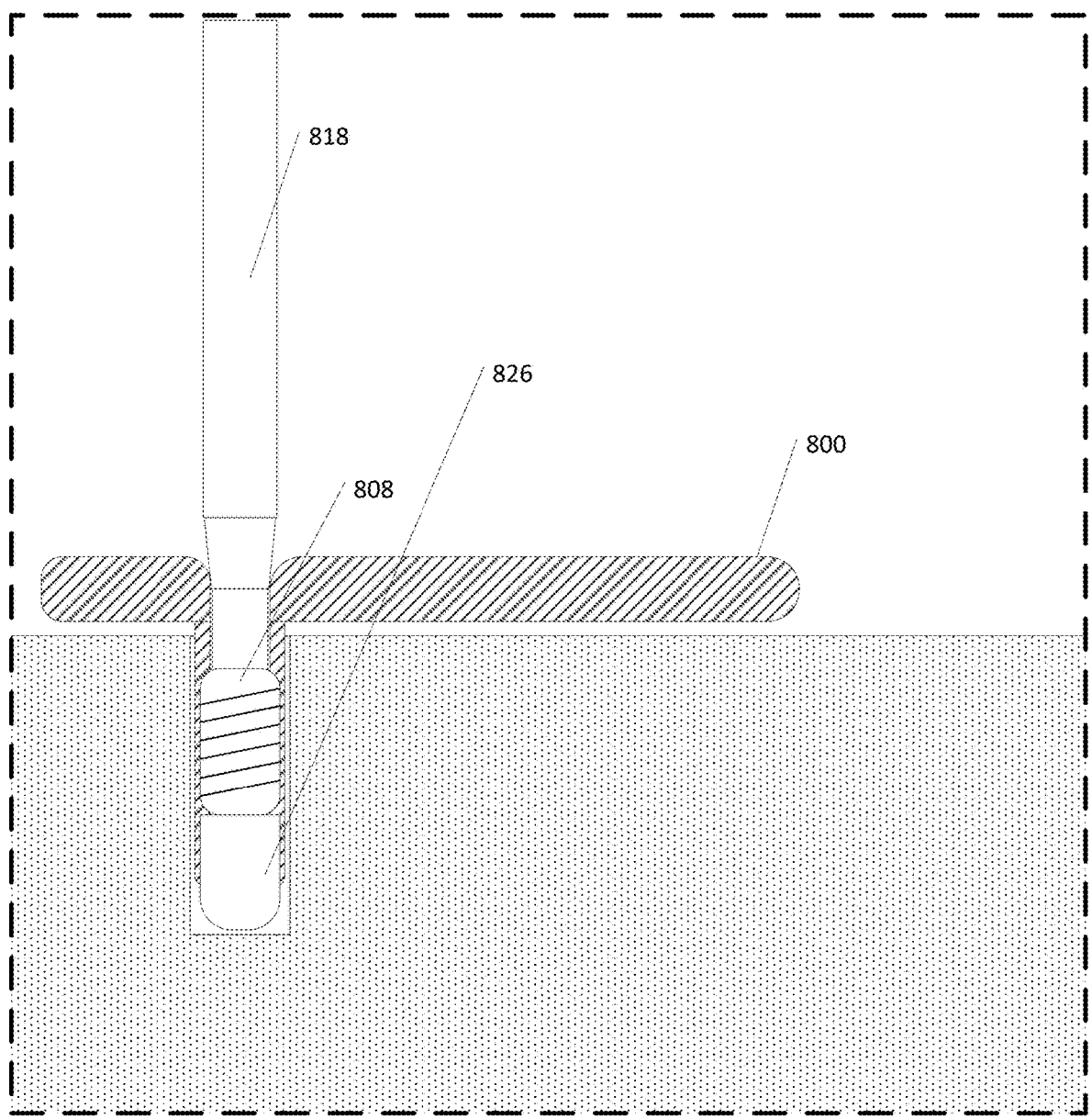

FIG. 73 shows the insertion instrument 818 pushing the insertion component 826 and a portion of the elastomeric device 800 into the bone opening. FIG. 74 shows the same instrument 818 being used to insert a fixation component 808 into the bone opening to fix the portion of the elastomeric device 800 and the insertion component 826 in the bone opening. In some implementations, the instrument 818 may be withdrawn from the bone opening and then a fixation component 808 may be mounted on the instrument for insertion into the bone opening. In other implementations, a different instrument may be used for insertion of the fixation component 808. In still other implementations, a two-step instrument may be used to insert the insertion and fixation components, without requiring removal of the instrument from the bone opening in between insertion of the insertion component and the fixation component.

Figure 75:
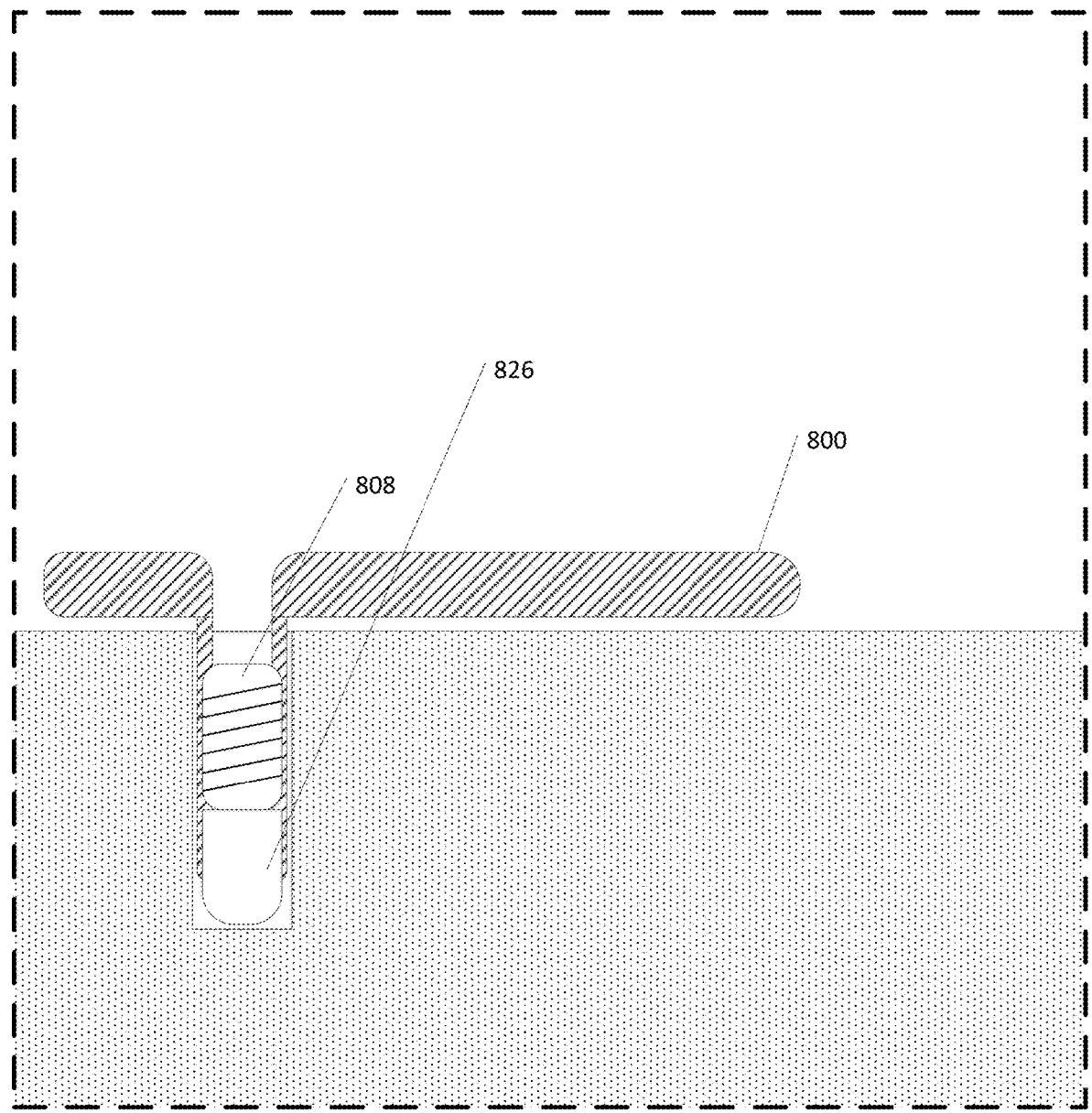

FIG. 75 shows the fixation component 808, insertion component 826, and the portion of the elastomeric device 800 in the bone opening after removal of the instrument.

Figure 76:
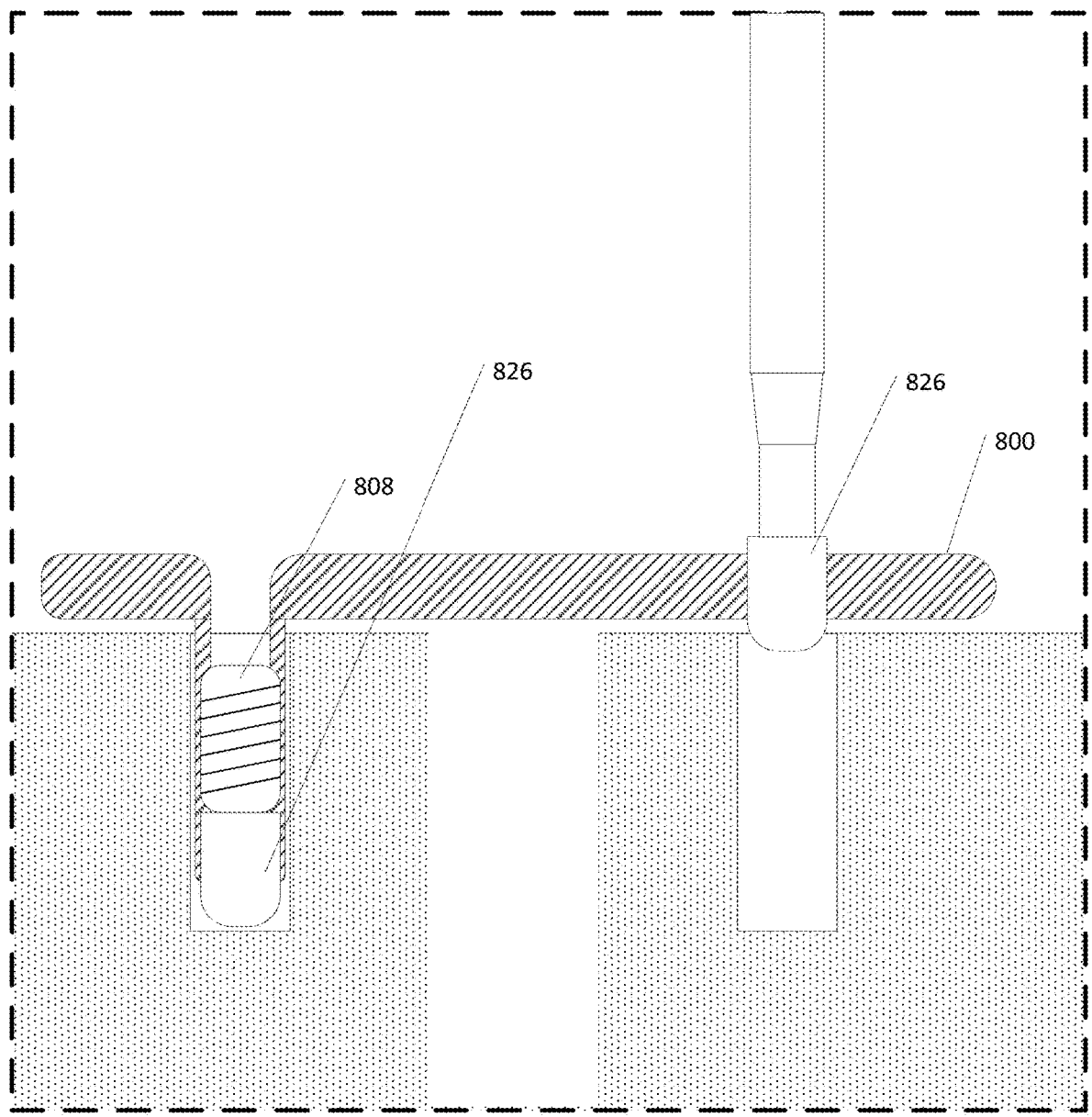
Figure 77:
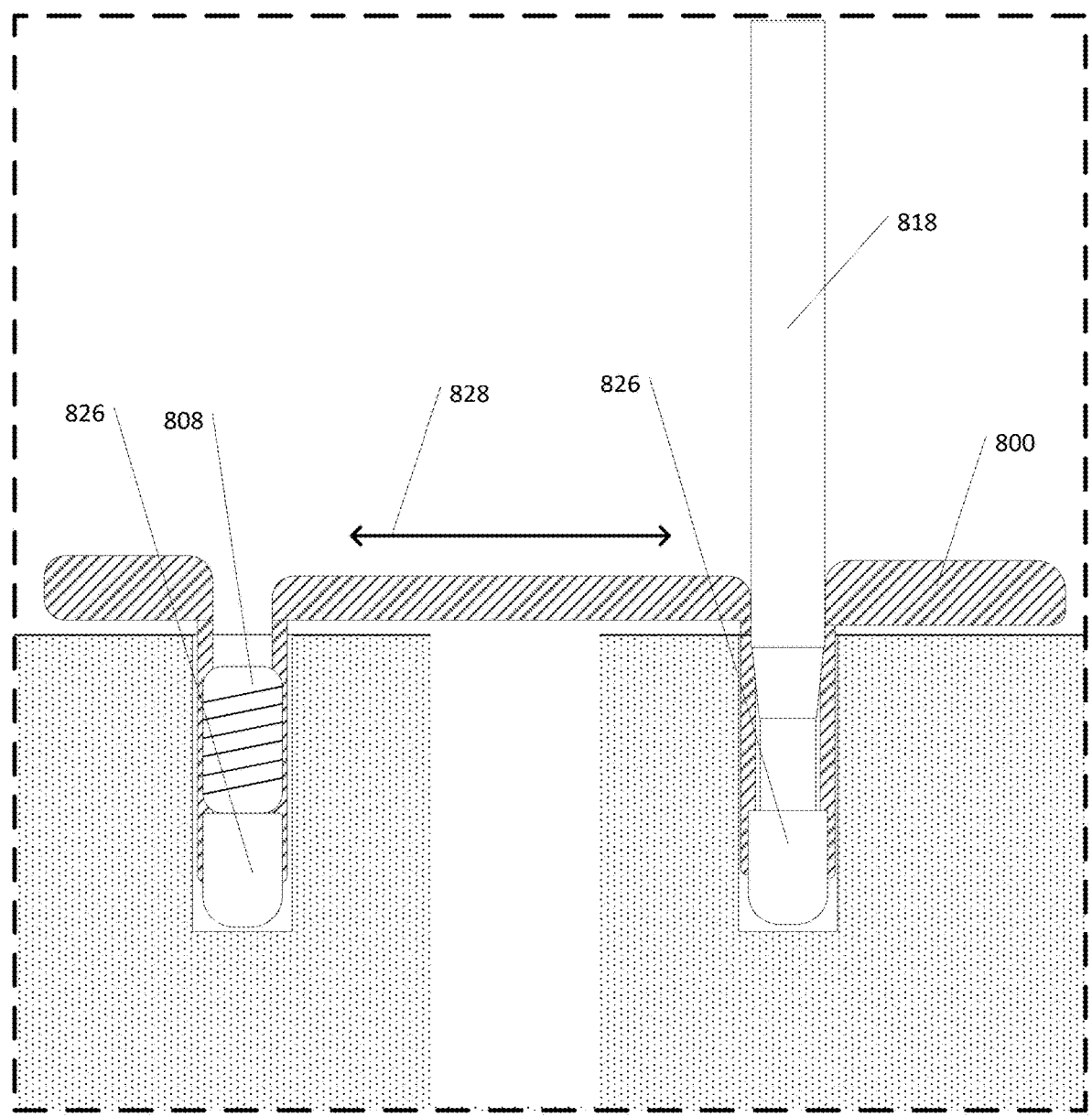

FIGS. 76 and 77 show pushing a second portion of the elastomeric device into a second bone opening using an insertion component 826 mounted on an insertion instrument 818. In this example, as schematically indicated in the figures, the two bone openings are in different bones of the patient.

Figure 78:
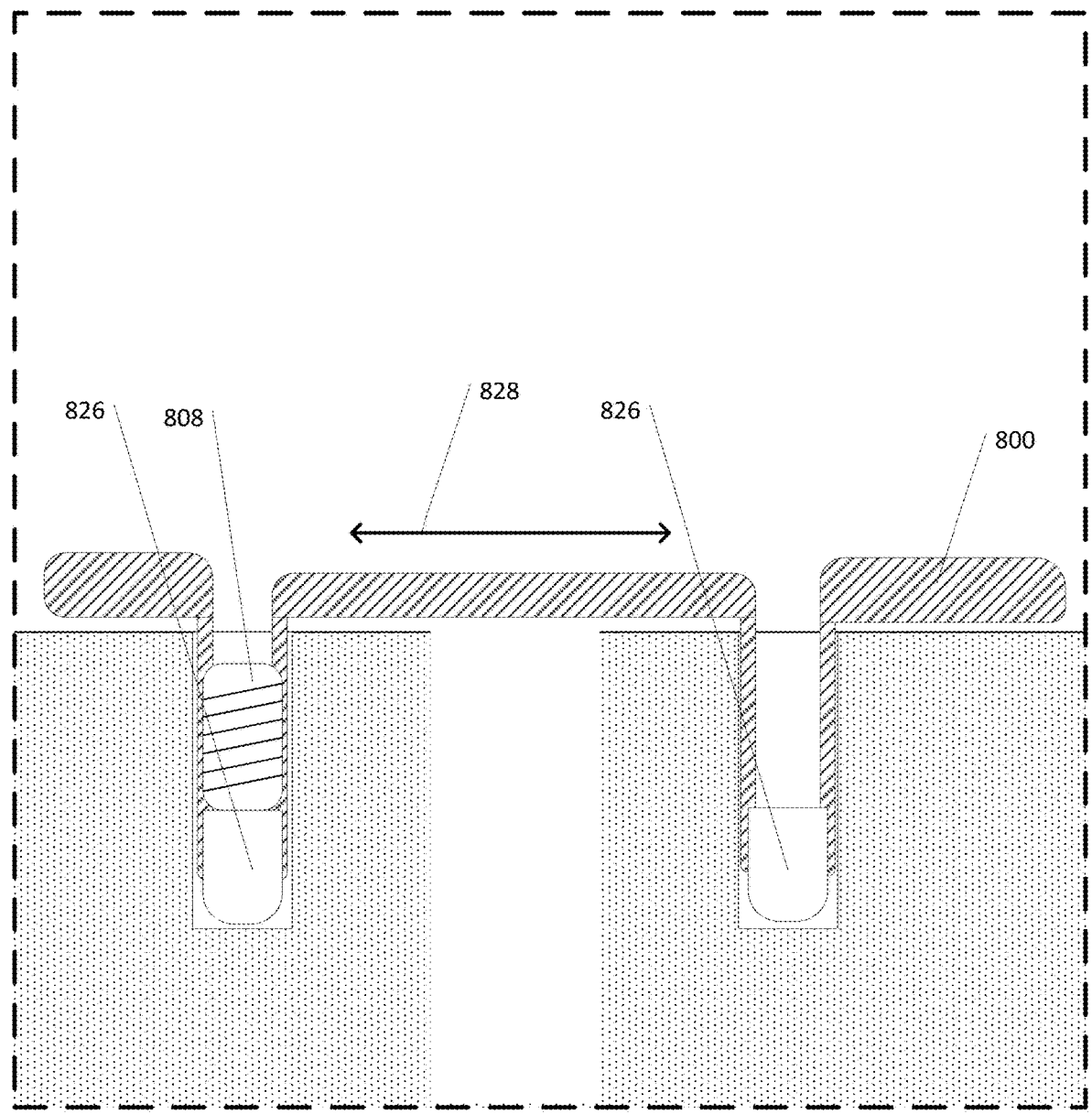

When the elastomeric device 800 is pushed into the second bone opening, the elastomeric device 800 is tensioned to a first tension 828 between the two bone openings. At this point, the surgeon may evaluate the elastomeric device 800 (e.g. evaluate its tension, evaluate range of motion of a joint, evaluate resistance to motion, etc.). For instance, the surgeon may manipulate the elastomeric device 800 directly, or may articulate the patient's anatomy to gauge whether the elastomeric device 800 is at a sufficient tension. The elastomeric device 800 may be evaluated while the instrument 818 remains engaged with the insertion component 826 as shown in FIG. 77 or may be evaluated after removal of the instrument as shown in FIG. 78. In at least some implementations, the portion of the elastomeric device 800 and the insertion component 826 in the second bone opening will sufficiently engage with the bone opening such that they will remain in the opening even while the elastomeric device 800 is being manipulated to assess its tension.

Figure 81:
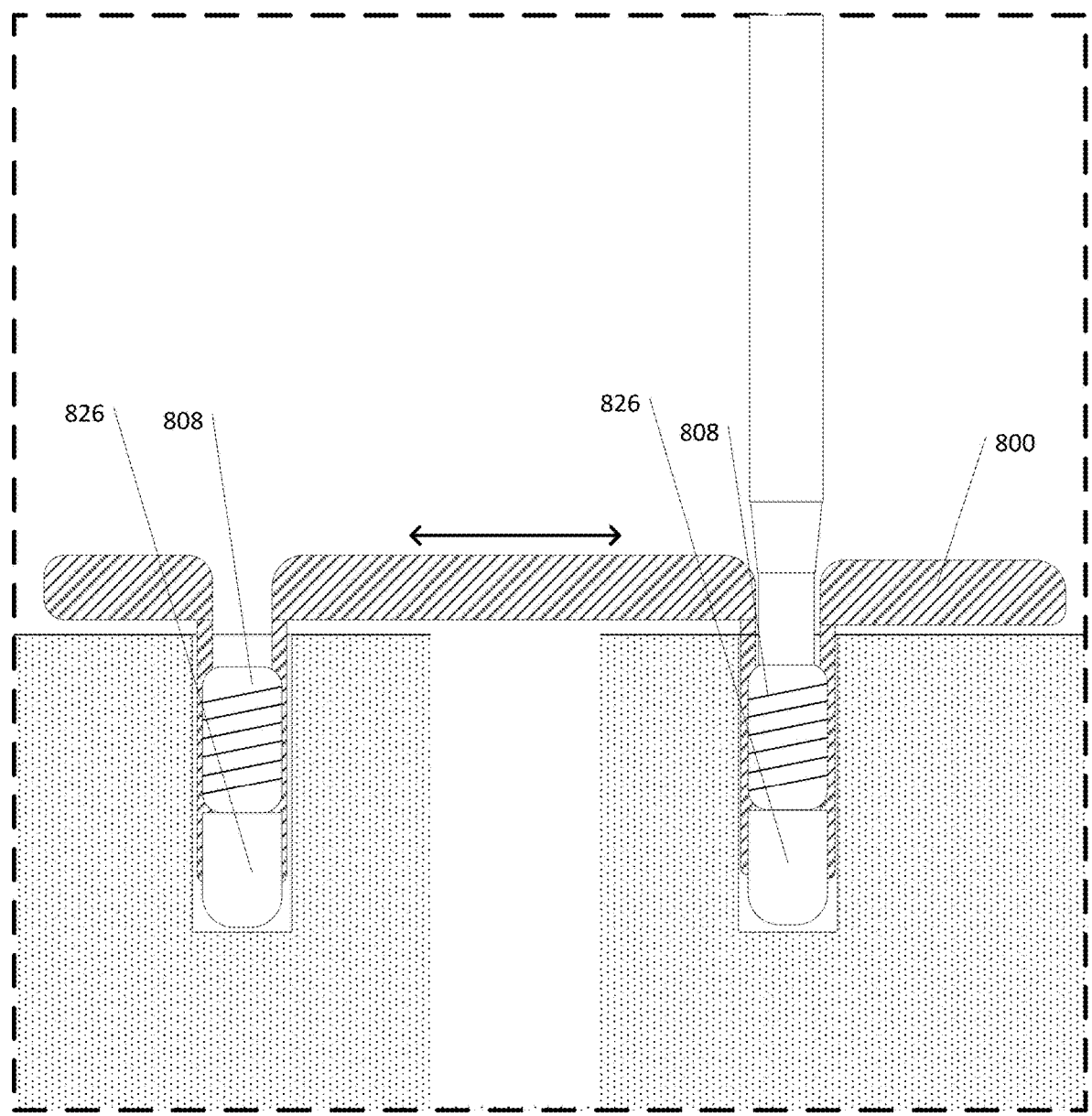
Figure 82:
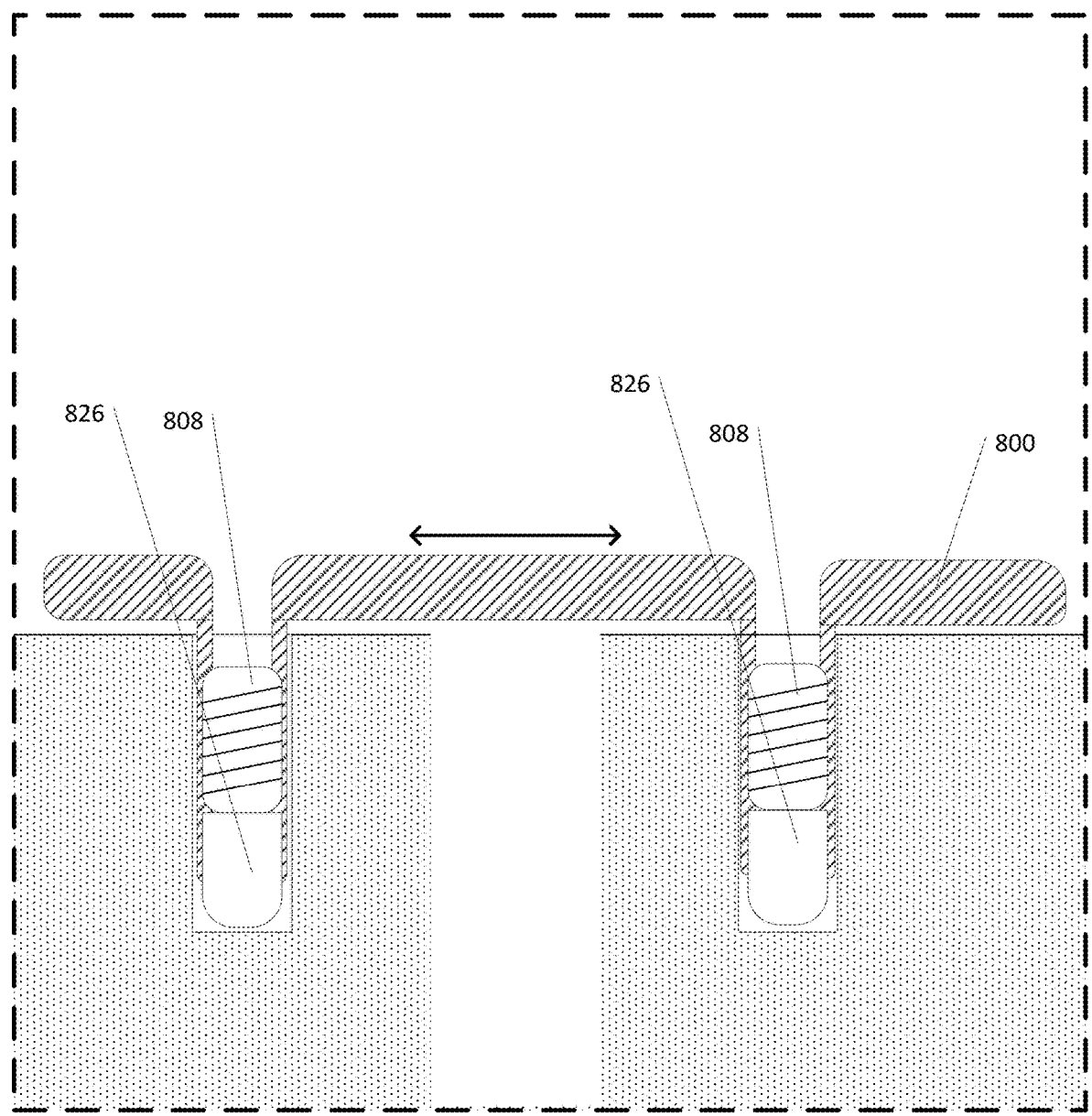

If the elastomeric device 800 tension is sufficient, a fixation component may be installed into the second bone opening, thereby securing the portion of the elastomeric device 800 and the insertion component 826 in the second opening, as shown in FIGS. 81 and 82.

Figure 79:
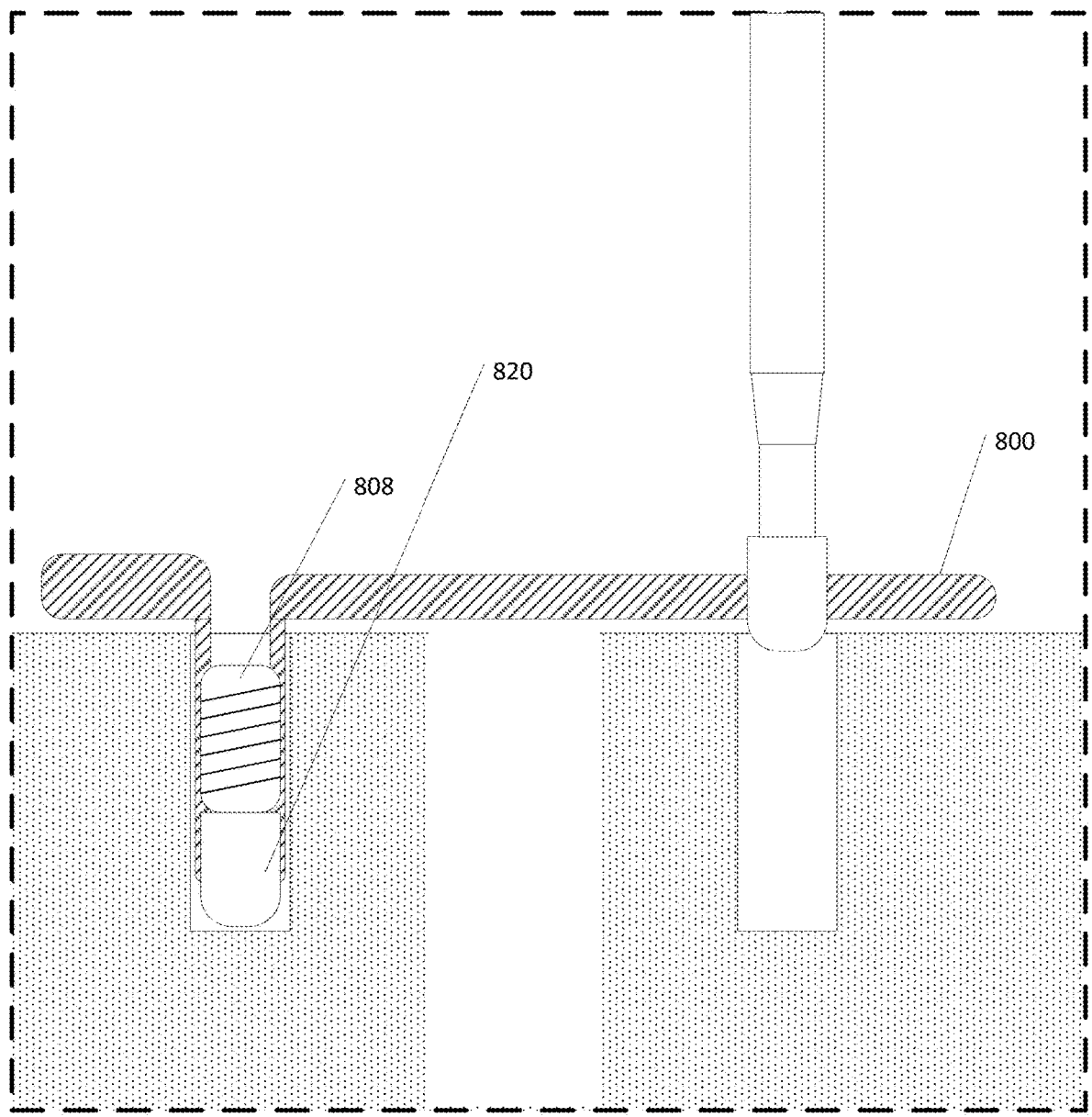
Figure 80:
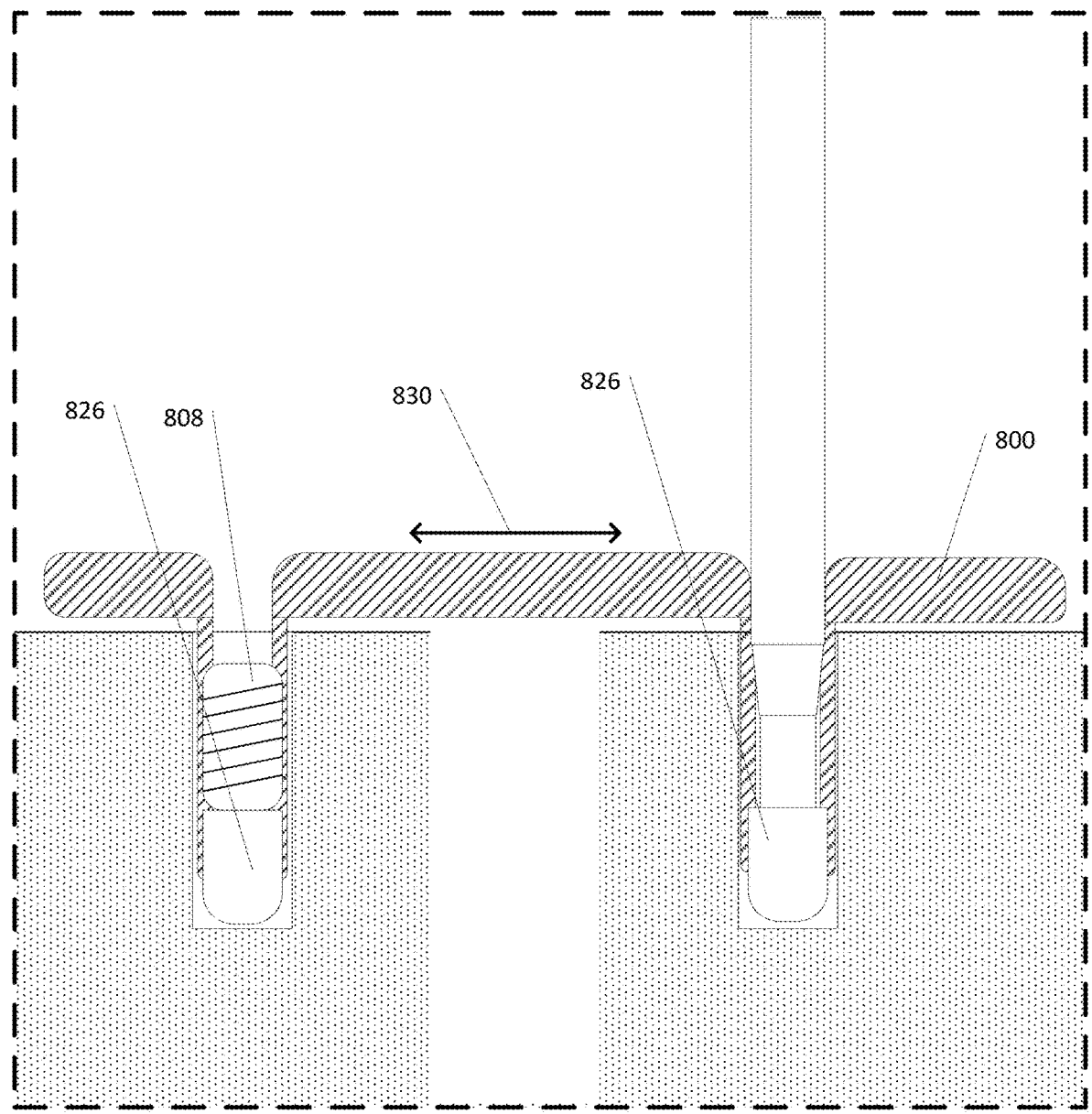

If the elastomeric device 800 tension is not sufficient, the elastomeric device's tension may be adjusted. As shown in FIGS. 79-80, tension may be adjusted by removing the insertion component 826 and the portion of the elastomeric device 800 from the second bone opening, repositioning the elastomeric device 800 relative to the insertion component 826, and reinserting the elastomeric device 800 and insertion component 826 into the second bone opening. In this way, the tension of the elastomeric device 800 can be adjusted to a second tension 830 that is different from the first tension 828. For example, to reduce the tension, the elastomeric device 800 may be repositioned relative to the insertion component 826 by increasing the length of the portion of the elastomeric device 800 that is between the two insertion components 826. For example, for eyelet type insertion components, sliding the eyelet along the elastomeric device 800 to increase the length of the elastomeric device 800 between the two insertion components 826.

In some implementations, it may be desirable to provide a visual or other indication for quantitatively assessing the repositioning of the elastomeric device 800 relative to the insertion component 826. For instance, prior to repositioning, the elastomeric device 800 could be marked to indicate the current position of the elastomeric device 800 relative to the insertion component 826. As another example, the elastomeric device 800 may include a series of indicia along all or a portion of its length.

Figure 56:
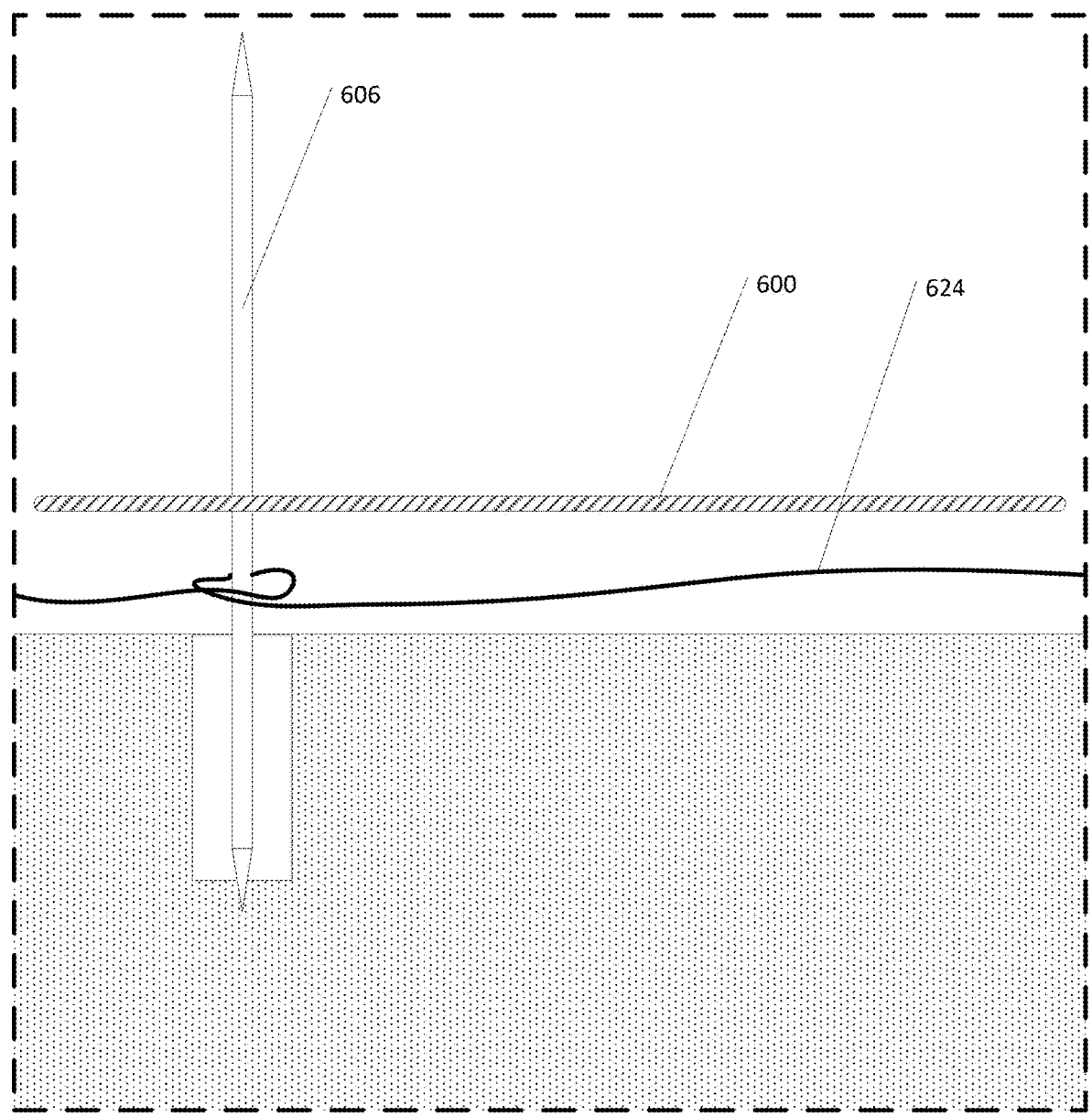
FIGS. 56-58 show another example of a method for securing an elastomeric device and a suture to bone.
Figure 57:
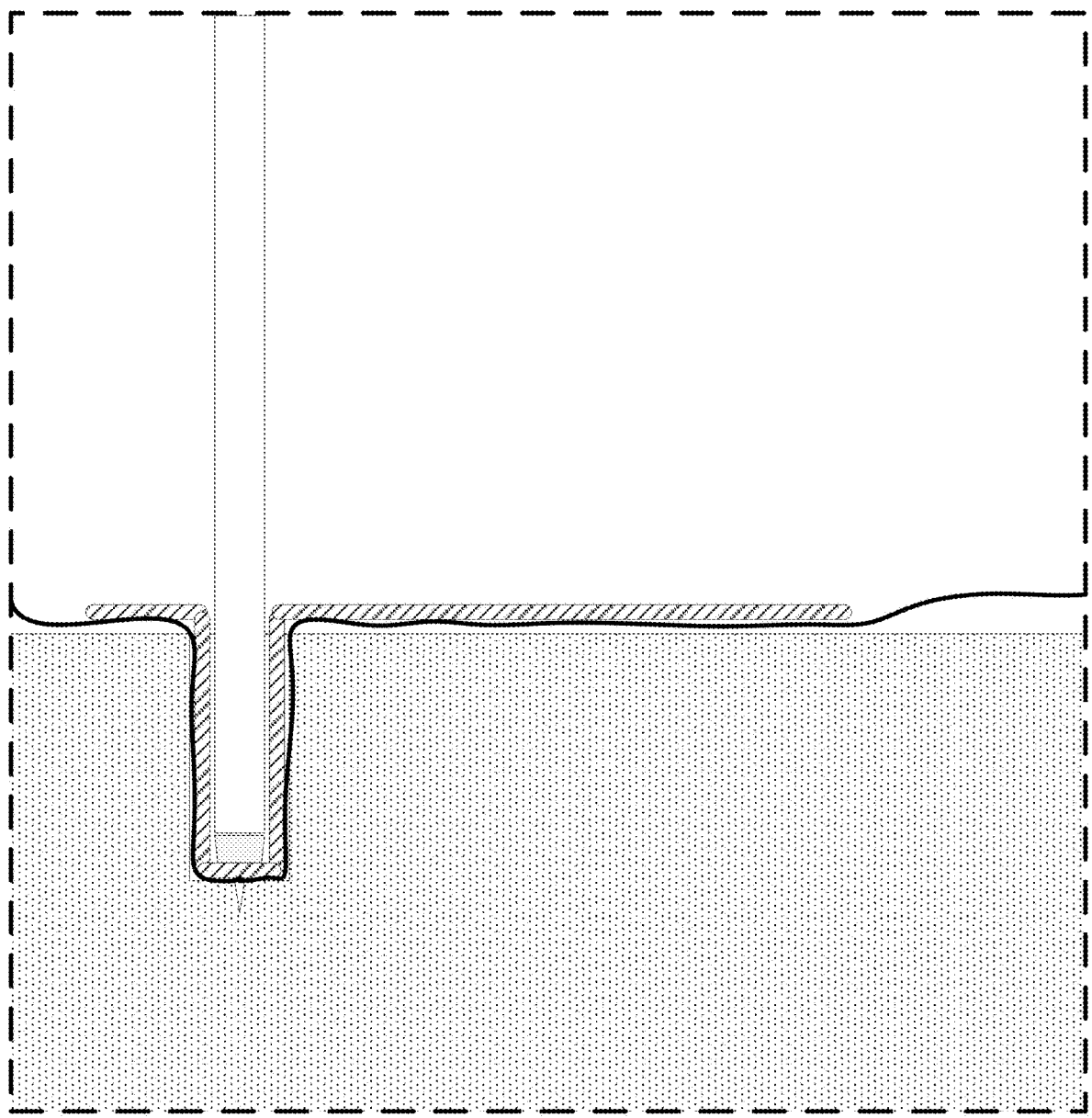
Figure 58:
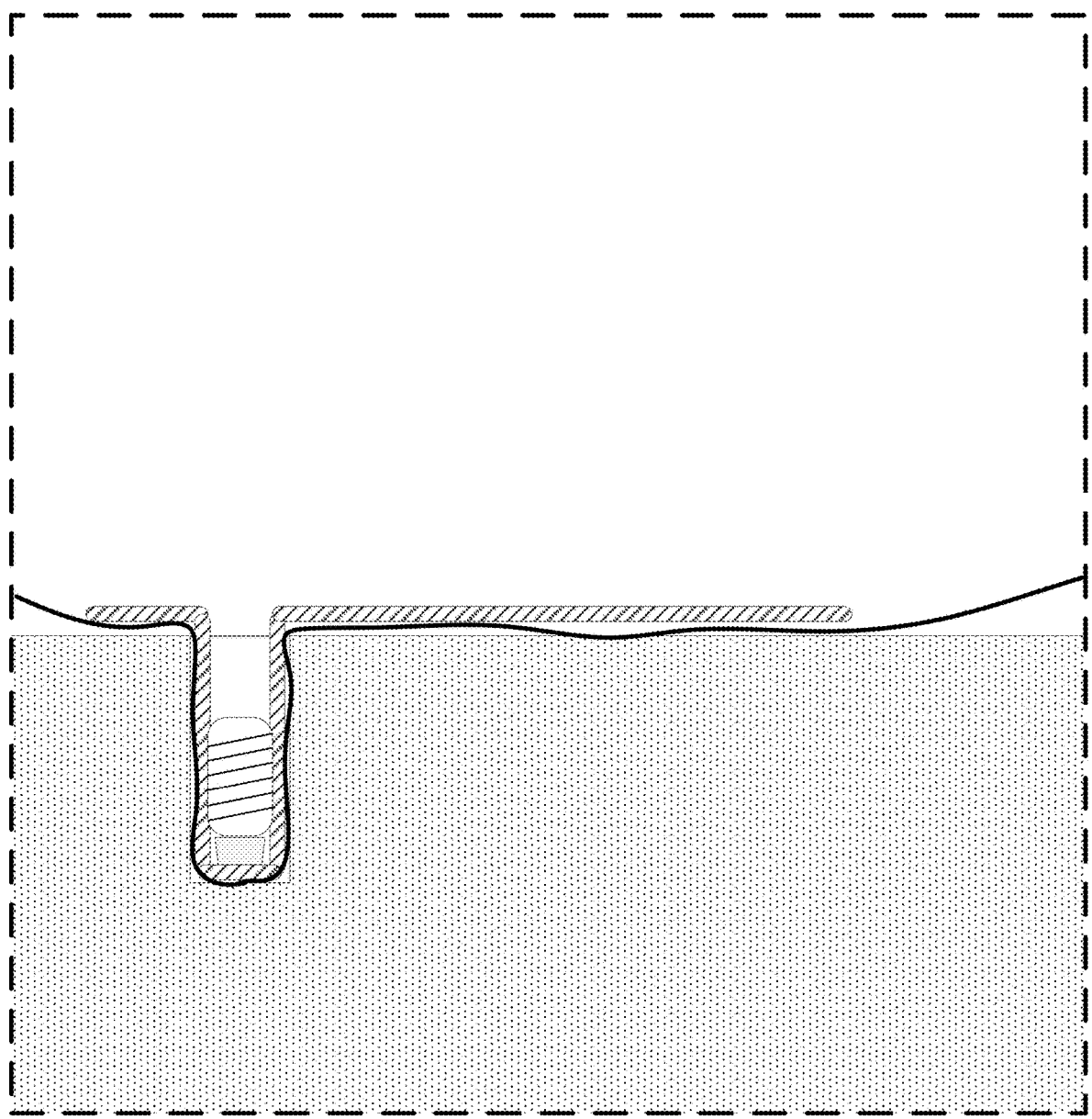

Additional Suture—FIGS. 56-58

FIGS. 56-58 show another example of a method for securing an elastomeric device 600 to bone 602. In this example, a suture 624 is wrapped around the elongated member 606 prior to pushing the elastomeric device 600 into the bone opening 604. The suture 624 is pushed into the bone opening 604 along with the elastomeric device 600 such that the ends of the suture 624 extend out of the bone opening 604 after the elastomeric device 600 and suture 624 are secured in the bone opening 604.

Figure 59:
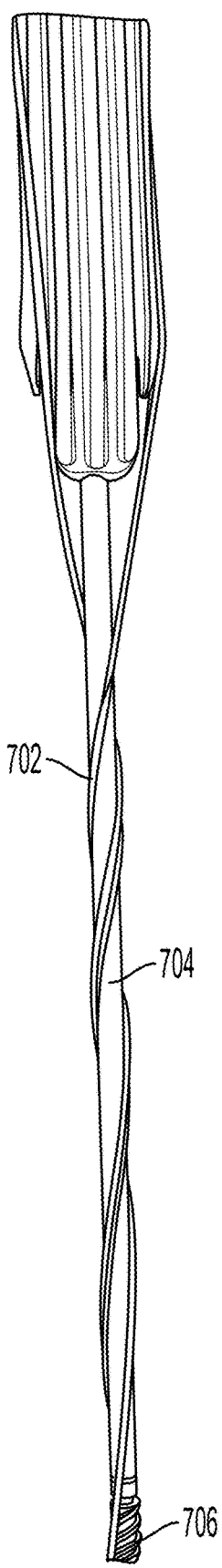
FIG. 59 shows an example of suture wrapping around the shaft of an instrument.

Suture Wrapping—FIG. 59

FIG. 59 shows a suture configuration that may optionally be incorporated into any of the instruments, systems, and methods described above.

FIG. 59 shows an example in which the suture 702 is wrapped around the shaft 704 of the instrument. In this example, the suture 702 is wrapped around the instrument shaft 704 in the opposite direction to which the instrument is rotated during insertion of the fixation component 706. For instance, if the fixation component 706 has threads for a clockwise rotation during insertion, the suture 702 may be wrapped in a counter-clockwise direction around the shaft 704 of the instrument. In this manner, the suture 702 may unwind from the instrument shaft 704 during insertion of the fixation component 706, leaving the suture 702 completely untwisted or at least less twisted than suture that has been inserted in conventional fashions.

Figure 60:
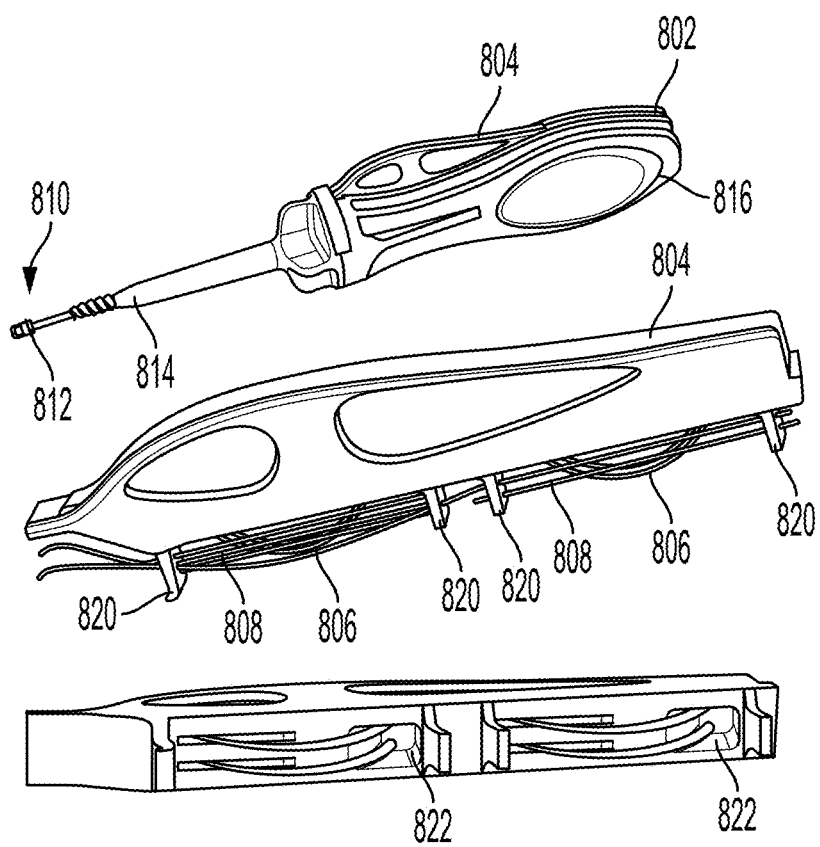
FIGS. 60-61 show an example of a suture cartridge for an instrument.
Figure 61:
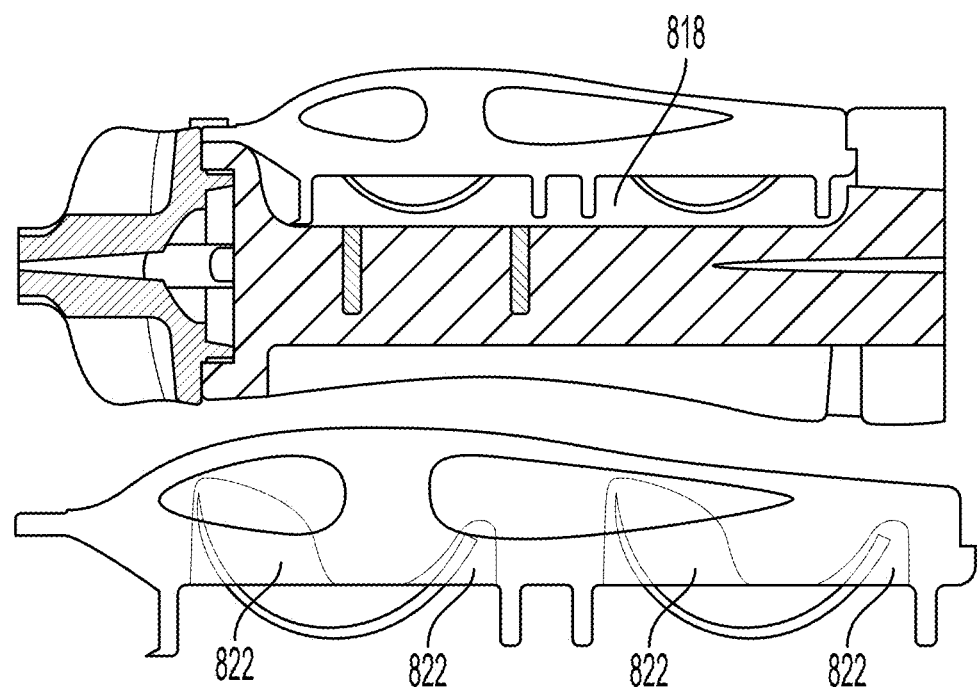

Removable Suture Cartridge—FIGS. 60-61

FIGS. 60-61 show a suture cartridge that may optionally be incorporated into the instruments, systems, and methods described above. The suture cartridge is configured to be retained in an instrument's handle in a removable fashion. The suture cartridge holds coiled portions of the suture (in this example wrapped around spaced posts) and suture needles (in this example held in cavities in the cartridge) until they are needed.

When the suture cartridge is retained in the instrument's handle, the portion of the cartridge including the coiled portions of the suture and the needles is in a cavity in the handle and out of the way. When needed (for example, after the suture is anchored) the cartridge may be disconnected from the instrument so that the instrument can be moved away from the operative site and the coiled portions of suture and the suture needles may be conveniently accessed.

In the example of FIGS. 60-61 a surgical instrument system includes a surgical instrument 802, a suture cartridge 804, needles 806, and suture 808. While not shown in FIGS. 60-61, the suture 808 extends proximally from a distal end 810 of the surgical instrument 802 to ends that connect to the needles 806. In some implementations a single length of suture can wrap around the distal end 810 of the surgical instrument and connect at its two ends to two needles 806. In the particular implementation shown in FIGS. 60-61, there are four needles 806 and two suture strands 808, with each strand 808 connected to two needles 806 at its ends.

The suture cartridge 804 receives the needles 806 and part of the sutures 808 and the suture cartridge 804 is removably connected to the surgical instrument 802 so that the needles 806 and portions of the sutures 808 can be out of the way during use of the surgical instrument 802. Removal of the suture cartridge 804 from the surgical instrument 802 (e.g. by operation of a catch mechanism or in another fashion) allows access to and use of the needles 806 and suture 808 at the desired time in a surgical procedure.

In the particular example shown in FIGS. 60-61 the surgical instrument 802 is connected to an anchor 812 at its distal end 810. Anchor 812 may be similar to the insertion member described in another examples above or may be configured in a different manner. Although not specifically shown in FIGS. 60-61, the suture 808 may be connected to the anchor 812 by looping through an eyelet or other structure of the anchor 812.

In the particular example shown in FIGS. 60-61 the surgical instrument 802 includes an elongated shaft 814 and a handle 816, with the suture cartridge 804 removably connecting to the handle 816. As shown the handle 816 may include a cavity 818 such that the suture cartridge 804 is at least partially insertable into the cavity 818 to removably connect the suture cartridge 804 to the handle 816. When the suture cartridge 804 is connected to the handle 816 the needles 806 and part of the sutures 808 are located inside the cavity 818, so that they are out of the way during use and manipulation of the surgical instrument 802.

In this example the suture cartridge 804 includes posts 820 extending from an inner surface, allowing the suture 808 to be wrapped around the posts 820 in a coiled configuration. In this example the inner surface of the suture cartridge 804 also includes needle cavities 822. The needles 806 are insertable into the needle cavities 822 for storage.

Figure 62:
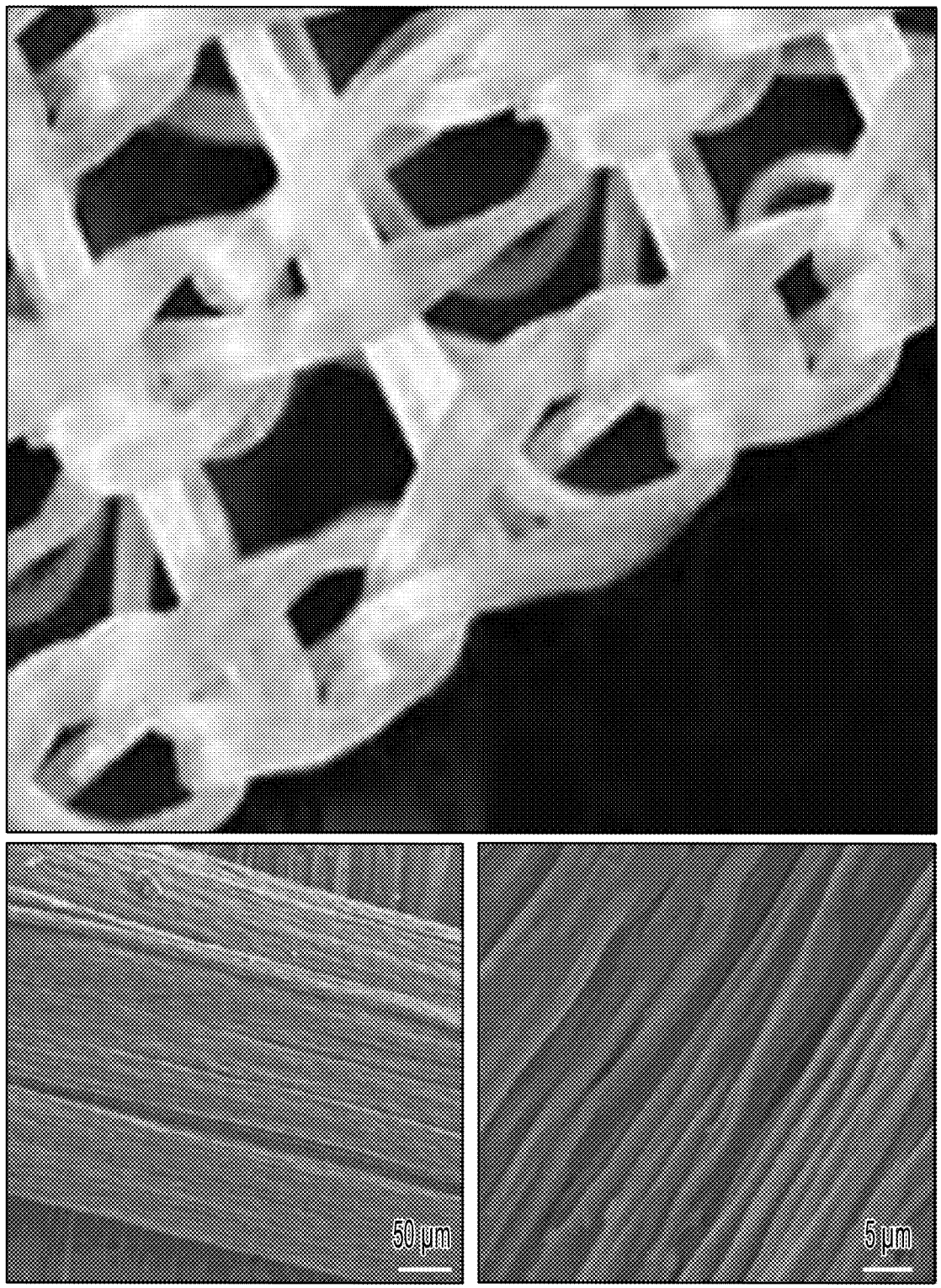
FIG. 62 shows close up views of an example elastomeric device.

Elastomeric Device—FIG. 62

As noted earlier, the instruments, systems, and methods described above may be used in some instances for fixation of an elastomeric device (e.g. a soft tissue augmentation/joint stabilization device) to one or more bones. In some embodiments, the elastomeric device may be an Artelon® FlexBand.® The elastomeric device may be an elongated, flexible, elastic strip of material. The elastomeric device may be a degradable biomaterial matrix woven from wet-spun fibers of polycaprolactone based-polyurethane urea (PUUR) that have been knitted into textile strips for optimal mechanical properties and ease of use as reinforcement for numerous orthopaedic soft tissue reconstructive applications. The clinical efficacy of the elastomeric device may be generated from the combination of the chemical composition, fiber spinning, and the textile manufacturing process. The PUUR multiblock based copolymer of biomaterial matrix may leverage the well-established biocompatibility of polyurethane biomaterials with the ability to specifically calibrate matrix biodegradation kinetics post-implantation.

In one example of use, the elastomeric device may be used as a reinforcement device for soft tissue repair where weaknesses exist during tendon or ligament reconstructive procedures. The device's woven matrix may act as a porous tissue scaffold to promote soft tissue support while also encouraging healing. FIG. 62 are magnified views of one example of such an elastomeric device, showing the knitted fibers and pores of the matrix. In some embodiments, the matrix has a porosity range of approximately 8 um-600 um, with the majority of the pores concentrated in the smaller subrange, and a texture capable of accommodating matrix producing cells to form a functional tissue.

Historically, soft tissue augmentation devices were designed to have a strong rigid structure and thus, the mechanical properties were not properly matched to the musculoskeletal tissues targeted for reconstruction. This high stiffness profile transfers most of the mechanical load to the augmentation device, which often results in clinical failure due to stress-shielding or device fatigue. In order to prevent the biological breakdown in healing associated with stress shielding, the elastomeric device may be designed to have an original tensile stiffness measuring at least 50% lower than that of the tissue to be reconstructed. The ranges of elasto-mechanical loading profiles of the augmentation device may approximate human ligaments and tendons and yet be more adaptable to deformation than the native tissue. In some implementations, this ensures matrix continuity even if the healing target tissue is overstretched, in which case the damaged target tissue can persist in the healing process while continuing to be supported by the augmentation device. In addition, in some implementations, the generous elastomeric characteristics enable the graft to resist long-term stress relaxation and creep thus, providing the augmentation device with the ability to template the healing tissue to its desired dimension and ensure ultimate functional kinetics.

In some implementations, in addition to the enhanced graft flexibility, the post-implantation endurance profile may ensure that the graft maintains 90% of its original strength and tensile properties for the first year. This ensures that during the acute phase of healing, when the mechanical properties of the regenerating tissue are compromised, the augmentation device will help share loading of the healing tissue, but the tissue itself is still offered adequate mechanical stimuli to induce cells to secrete paracrine factors by the process of mechanotransduction for further cell recruitment, differentiation, and matrix deposition to generate a functional tissue. Simultaneous with maturation of the new tissue, the augmentation device may be configured to gradually and benignly degrades by hydrolysis.

The selection of the proper graft polymer chemistry (i.e., polyurethane urea) and textile manufacturing method of the augmentation device may, in some implementations, enable the biodegradation rate to be advantageously adapted to the expected healing rate and to coincide with the increasing biomechanical properties of the tissue to be reconstructed. In some embodiments, the favorable high strength, load sharing, and elasticity of the augmentation device combined with the unique ability to custom design the graft's biomechanical and biodegradation properties to specifically align with different anatomical locations/tissue types provides an advantage over other non-degradable synthetic grafts.

Studies analyzing the early in vitro degradation kinetics of Artelon fibers and fiber-based devices demonstrated the original gross mass, stiffness, compressibility, and tensile properties are maintained to a minimum of 90% at one year, and 50% out to three years, again emphasizing the endurance of the matrix through the critical acute healing phase.

CONCLUSION

The foregoing is provided by way of example only. Additions, deletions, substitutions, modifications, and other changes may be made to the instruments, systems, and methods described above without departing from the scope or spirit of our inventions.

The invention claimed is:

1. A method for securing an elastomeric device to anatomy, the method comprising:
    (a) securing a first portion of the elastomeric device to a person's anatomy;
    (b) positioning a second portion of the elastomeric device in a bone opening such that the elastomeric device is at a first tension;
    (c) evaluating the elastomeric device at the first tension while the elastomeric device is in the bone opening;
    (d) based on the evaluation of the elastomeric device at the first tension, adjusting the elastomeric device such that the elastomeric device is at a second tension different from the first tension; and
    (e) after adjusting the elastomeric device to the second tension, inserting a fixation component into the bone opening to secure the elastomeric device in the bone opening.

2. The method of claim 1, wherein securing the first portion of the elastomeric device to a person's anatomy comprises securing the first portion of the elastomeric device relative to a tendon or ligament of the person.

3. The method of claim 1, wherein:
    (i) securing the first portion of the elastomeric device to the person's anatomy comprises securing the first portion of the elastomeric device into a first bone opening; and
    (ii) positioning the second portion of the elastomeric device into the bone opening comprises securing the second portion of the elastomeric device into a second bone opening.

4. The method of claim 3, wherein securing the first portion of the elastomeric device into the first bone opening comprises: (i) pushing the first portion of the elastomeric device into the first bone opening with an insertion component mounted on an insertion instrument; and (ii) inserting a fixation component into the first bone opening to fix the first portion of the elastomeric device and the insertion component in the first bone opening.

5. The method of claim 1, wherein positioning the second portion of the elastomeric device in the bone opening comprises pushing the second portion of the elastomeric device into the bone opening using an insertion component mounted on an insertion instrument.

6. The method of claim 5, wherein the insertion component comprises an eyelet, wherein the elastomeric device extends through the eyelet prior to being pushed into the bone opening, and wherein the fixation component secures the eyelet and the elastomeric device in the bone opening.

7. The method of claim 5, wherein the insertion component comprises a plug, and wherein the elastomeric device is wrapped around a portion of the plug prior to being pushed into the bone opening, and wherein the fixation component secures the plug and the elastomeric device in the bone opening.

8. The method of claim 5, wherein adjusting the elastomeric device such that the elastomeric device is at the second tension comprises: (i) removing the second portion of the elastomeric device and the insertion component from the bone opening; (ii) repositioning the elastomeric device relative to the insertion component; and (iii) reinserting the elastomeric device and the insertion component into the bone opening.

9. The method of claim 8, wherein evaluating the elastomeric device at the first tension comprises evaluating the elastomeric device at the first tension while the insertion component remains mounted on the insertion instrument.

10. The method of claim 9, wherein the insertion instrument is used to remove the second portion of the elastomeric device and the insertion component from the bone opening.

11. The method of claim 8, wherein evaluating the elastomeric device at the first tension comprises evaluating the elastomeric device at the first tension after disconnecting the insertion instrument from the insertion component.

12. The method of claim 11, wherein removing the second portion of the elastomeric device and the insertion component from the bone opening comprises pulling on the elastomeric device to draw the elastomeric device and the insertion component out of the bone opening.

13. The method of claim 11, wherein at least one of the elastomeric device and the insertion component sufficiently engage the bone opening such that the elastomeric device and the insertion component remain in the bone opening during evaluation of the elastomeric device.

* * * * *